(12) United States Patent
Hirano et al.

(10) Patent No.: US 11,960,096 B2
(45) Date of Patent: Apr. 16, 2024

(54) HEAD-MOUNTED DISPLAY DEVICE CONTAINING RELAY OPTICAL SYSTEM BETWEEN IMAGE DISPLAY UNIT AND LIGHT GUIDE MEMBER AND DISPLAY SYSTEM

(71) Applicant: Ricoh Company, Ltd., Tokyo (JP)

(72) Inventors: Shigenobu Hirano, Kanagawa (JP); Yasuo Katano, Kanagawa (JP); Kenji Kameyama, Kanagawa (JP); Norikazu Igarashi, Kanagawa (JP); Satomi Tanaka, Kanagawa (JP); Naoki Nakamura, Saitama (JP)

(73) Assignee: RICOH COMPANY, LTD., Tokyo (JP)

( * ) Notice: Subject to any disclaimer, the term of this patent is extended or adjusted under 35 U.S.C. 154(b) by 204 days.

(21) Appl. No.: 16/957,228

(22) PCT Filed: Dec. 25, 2018

(86) PCT No.: PCT/JP2018/047687
§ 371 (c)(1),
(2) Date: Jun. 23, 2020

(87) PCT Pub. No.: WO2019/131689
PCT Pub. Date: Jul. 4, 2019

(65) Prior Publication Data
US 2020/0400962 A1    Dec. 24, 2020

(30) Foreign Application Priority Data

Dec. 25, 2017  (JP) ................................ 2017-248510
Dec. 4, 2018   (JP) ................................ 2018-227627

(51) Int. Cl.
*G09G 5/00*    (2006.01)
*F21V 8/00*    (2006.01)
(Continued)

(52) U.S. Cl.
CPC ....... *G02B 27/0176* (2013.01); *G02B 3/0087* (2013.01); *G02B 6/0028* (2013.01);
(Continued)

(58) Field of Classification Search
CPC .............. G02B 27/0176; G02B 3/0087; G02B 6/0028; G02B 6/003
(Continued)

(56) References Cited

U.S. PATENT DOCUMENTS 5,646,783 A     7/1997  Banbury
5,886,822 A *   3/1999  Spitzer ................. G02B 27/145
                                              359/633

(Continued)

FOREIGN PATENT DOCUMENTS

CN       101720445 A      6/2010
CN       102972037 A      3/2013
(Continued)

OTHER PUBLICATIONS

Office Action dated Aug. 24, 2021 in Chinese Patent Application No. 201880086473.4, 17 pages.
(Continued)

*Primary Examiner* — Jonathan M Blancha
(74) *Attorney, Agent, or Firm* — XSENSUS LLP

(57) ABSTRACT

A head-mounted display device includes an image display unit (300a, 300b) configured to emit image light, a light guide member (100a, 100b) configured to guide the image light and emit the image light to eyes of a wearer who wears the head-mounted display device, and a relay optical system (201a, 201b) arranged between the image display unit and the light guide member, and configured to relay the image light from the image display unit to the light guide member, and form an intermediate image at least once before the image light enters the light guide member.

18 Claims, 31 Drawing Sheets

(51) Int. Cl.
  *G02B 3/00* (2006.01)
  *G02B 13/00* (2006.01)
  *G02B 27/01* (2006.01)
  *G02B 27/30* (2006.01)
  *G02C 3/00* (2006.01)
  *G02C 11/06* (2006.01)
  *G06F 3/14* (2006.01)
  *H04R 1/10* (2006.01)

(52) U.S. Cl.
  CPC ......... *G02B 6/003* (2013.01); *G02B 13/0095* (2013.01); *G02B 27/0172* (2013.01); *G02B 27/30* (2013.01); *G02C 3/003* (2013.01); *G02C 11/06* (2013.01); *G06F 3/14* (2013.01); *G02B 2027/0145* (2013.01); *G02B 2027/0152* (2013.01); *G02B 2027/0169* (2013.01); *G02B 2027/0178* (2013.01); *H04R 1/10* (2013.01)

(58) Field of Classification Search
  USPC .......................................................... 345/8
  See application file for complete search history.

(56) References Cited

U.S. PATENT DOCUMENTS

| | | | |
|---|---|---|---|
| 6,310,736 B1 | 10/2001 | Togino | |
| 6,538,624 B1 | 3/2003 | Karasawa et al. | |
| 8,319,762 B2 | 11/2012 | Kurozuka | |
| 9,091,852 B2 | 7/2015 | Olsson et al. | |
| 9,316,836 B2 | 4/2016 | Olsson et al. | |
| 9,529,197 B2 | 12/2016 | Olsson et al. | |
| 9,904,053 B2 | 2/2018 | Sato | |
| 10,139,630 B2 | 11/2018 | Yokoyama et al. | |
| 10,495,883 B2 | 12/2019 | Yokoyama et al. | |
| 2003/0086135 A1 | 5/2003 | Takeyama | |
| 2003/0165017 A1 | 9/2003 | Amitai | |
| 2004/0212776 A1 | 10/2004 | Spitzer et al. | |
| 2005/0174651 A1 | 8/2005 | Spitzer et al. | |
| 2007/0070504 A1 | 3/2007 | Akutsu et al. | |
| 2010/0046070 A1 | 2/2010 | Mukawa | |
| 2010/0110368 A1 | 5/2010 | Chaum | |
| 2011/0012874 A1 | 1/2011 | Kurozuka | |
| 2012/0206816 A1 | 8/2012 | Yoshida | |
| 2012/0212400 A1* | 8/2012 | Border | G02B 27/0172 345/8 |
| 2013/0120706 A1 | 5/2013 | Kakinuma et al. | |
| 2013/0169513 A1* | 7/2013 | Heinrich | G06F 1/163 381/151 |
| 2013/0222214 A1 | 8/2013 | Takeda et al. | |
| 2013/0222384 A1 | 8/2013 | Futterer | |
| 2013/0222896 A1 | 8/2013 | Komatsu et al. | |
| 2013/0235440 A1* | 9/2013 | Takeda | G02B 27/0172 359/197.1 |
| 2013/0249776 A1 | 9/2013 | Olsson et al. | |
| 2014/0028968 A1 | 1/2014 | Olsson et al. | |
| 2014/0327603 A1* | 11/2014 | Hiraide | G02B 27/0172 345/8 |
| 2015/0146300 A1 | 5/2015 | Olsson et al. | |
| 2015/0331243 A1 | 11/2015 | Sawada et al. | |
| 2016/0116745 A1* | 4/2016 | Osterhout | G06F 3/013 359/614 |
| 2016/0187662 A1 | 6/2016 | Sato | |
| 2016/0313556 A1 | 10/2016 | Futterer | |
| 2017/0017085 A1 | 1/2017 | Araki et al. | |
| 2017/0142392 A1* | 5/2017 | Peterson | H04N 13/156 |
| 2017/0192239 A1 | 7/2017 | Nakamura et al. | |
| 2017/0227776 A1 | 8/2017 | Yokoyama et al. | |
| 2017/0242252 A1 | 8/2017 | Ide et al. | |
| 2017/0276946 A1 | 9/2017 | Yokoyama | |
| 2017/0299860 A1* | 10/2017 | Wall | G02B 3/04 |
| 2017/0307886 A1 | 10/2017 | Stenberg et al. | |
| 2018/0031843 A1* | 2/2018 | Pan | G02B 27/0172 |
| 2018/0095281 A1* | 4/2018 | Takeda | G02B 27/0172 |
| 2018/0321736 A1* | 11/2018 | Masson | G02B 30/36 |
| 2019/0049735 A1 | 2/2019 | Yokoyama et al. | |
| 2019/0353908 A1 | 11/2019 | Igarashi et al. | |

FOREIGN PATENT DOCUMENTS

| | | |
|---|---|---|
| CN | 103364950 A | 10/2013 |
| CN | 104321684 A | 1/2015 |
| CN | 105700149 A | 6/2016 |
| CN | 105739095 A | 7/2016 |
| CN | 106716230 A | 5/2017 |
| JP | H3-101709 A | 4/1991 |
| JP | H05-134208 | 5/1993 |
| JP | H06-308423 | 11/1994 |
| JP | H07-064014 | 3/1995 |
| JP | 2000-511306 A | 8/2000 |
| JP | 2002-311379 | 10/2002 |
| JP | 2005-221888 | 8/2005 |
| JP | 4810949 | 9/2011 |
| JP | 2011-227379 | 11/2011 |
| JP | 2013-200553 | 10/2013 |
| JP | 2014-78868 A | 5/2014 |
| JP | 2014-130204 | 7/2014 |
| JP | 5698297 | 2/2015 |
| JP | 2015-219405 | 12/2015 |
| JP | 2015-222891 A | 12/2015 |
| JP | 2016-131270 | 7/2016 |
| JP | 2016-180939 A | 10/2016 |
| JP | 2016-200686 | 12/2016 |
| JP | 2017-44717 A | 3/2017 |
| JP | 2017-90561 A | 5/2017 |
| JP | 2017-097306 | 6/2017 |
| JP | 2017-103767 | 6/2017 |
| JP | 2017-122771 | 7/2017 |
| JP | 2017-518532 A | 7/2017 |
| JP | 2017-146448 | 8/2017 |
| JP | 2017-183857 A | 10/2017 |
| JP | 2017-194680 A | 10/2017 |
| JP | 2017-198962 | 11/2017 |
| JP | 2017-215501 | 12/2017 |
| JP | 2018-036358 | 3/2018 |
| JP | 2018-132762 | 8/2018 |
| WO | WO 2015/137165 | 9/2015 |

OTHER PUBLICATIONS

Chinese Office Action dated Apr. 21, 2022, in corresponding Chinese Patent Application 201880086473.4.
Office Action dated Aug. 30, 2022 in Japanese Patent Application No. 2018-227627, 3 pages.
International Search Report and Written Opinion dated Apr. 5, 2019 in PCT/JP2018/47687 filed on Dec. 25, 2018.

* cited by examiner

[Fig. 1]
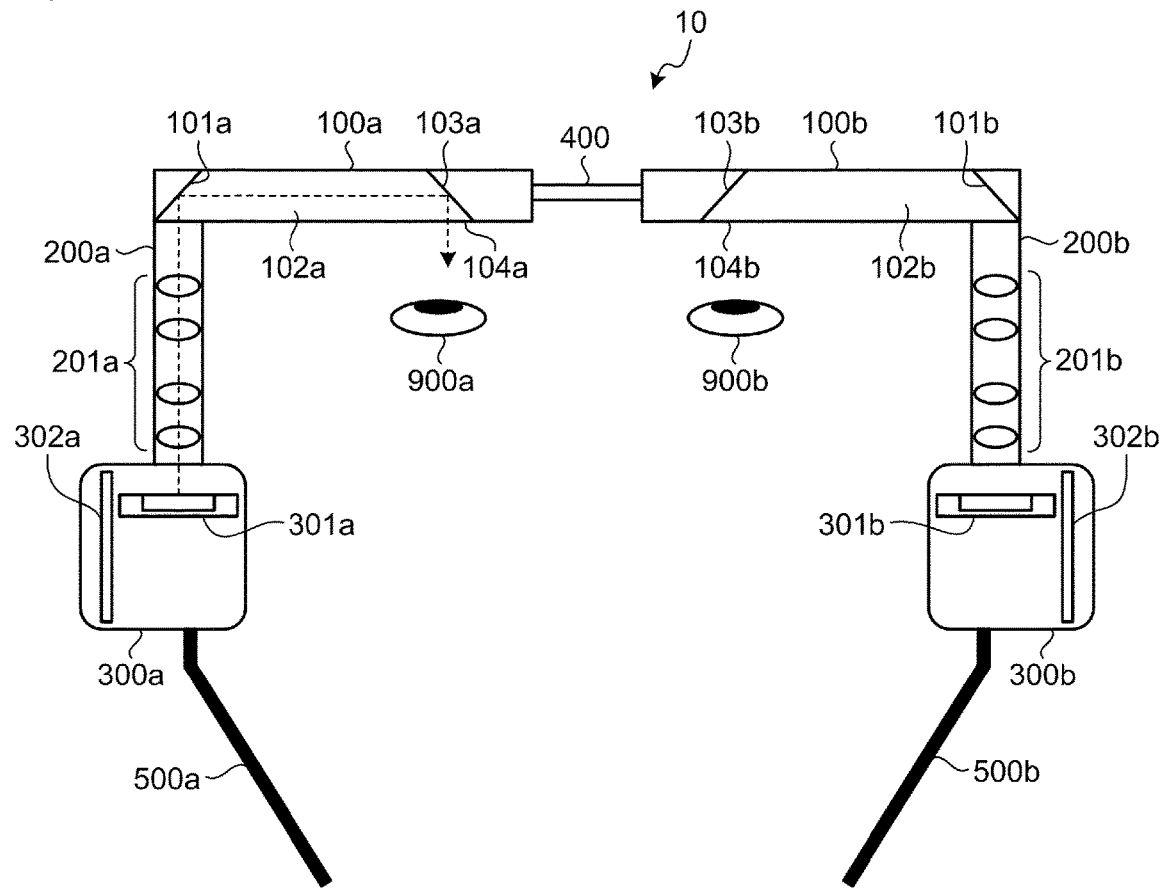
[Fig. 2]
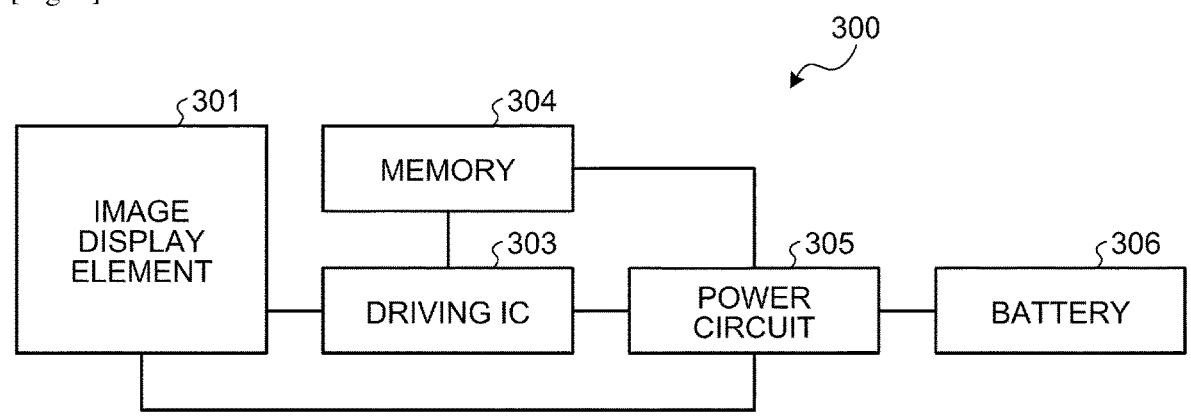

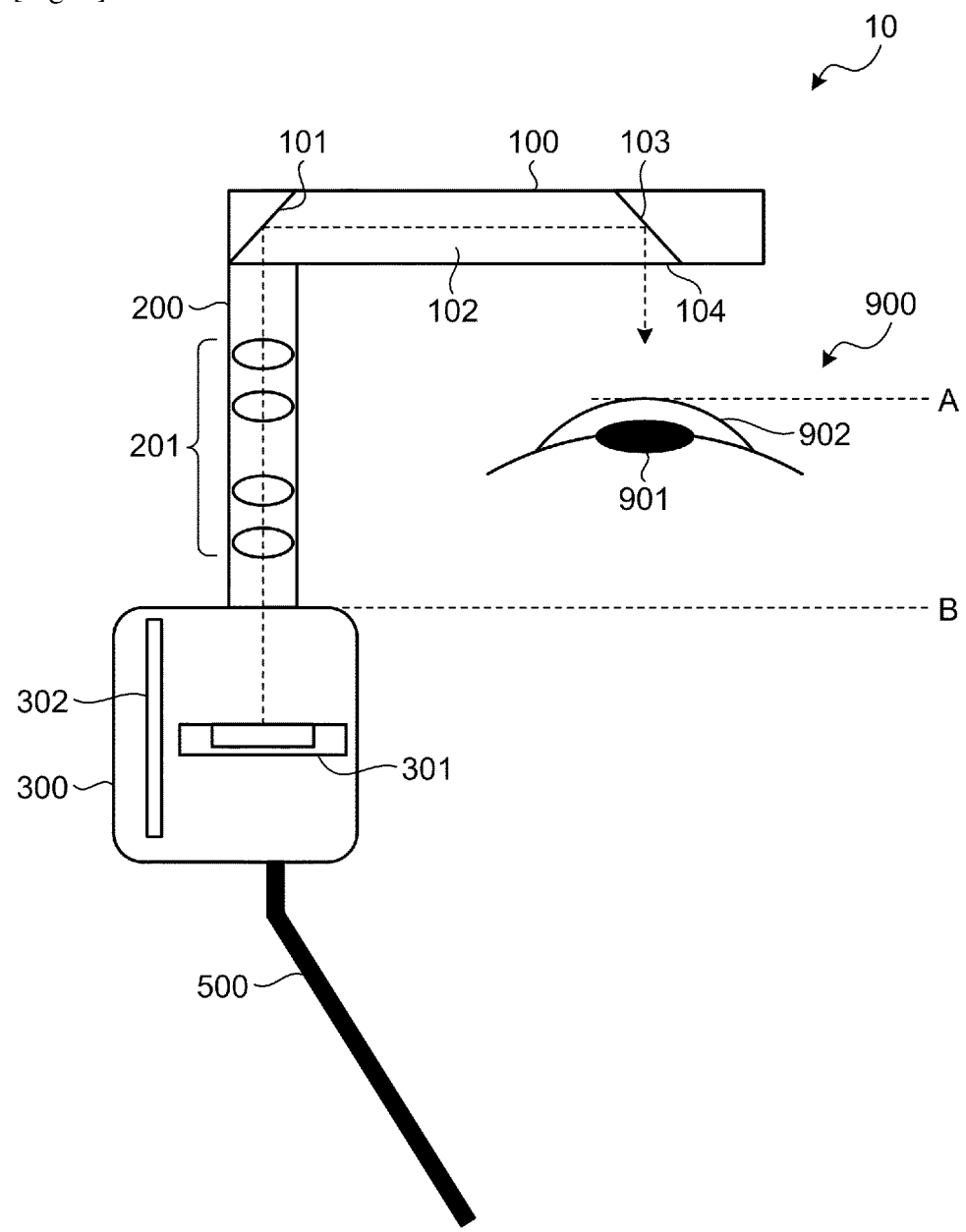
[Fig. 3]

[Fig. 4]
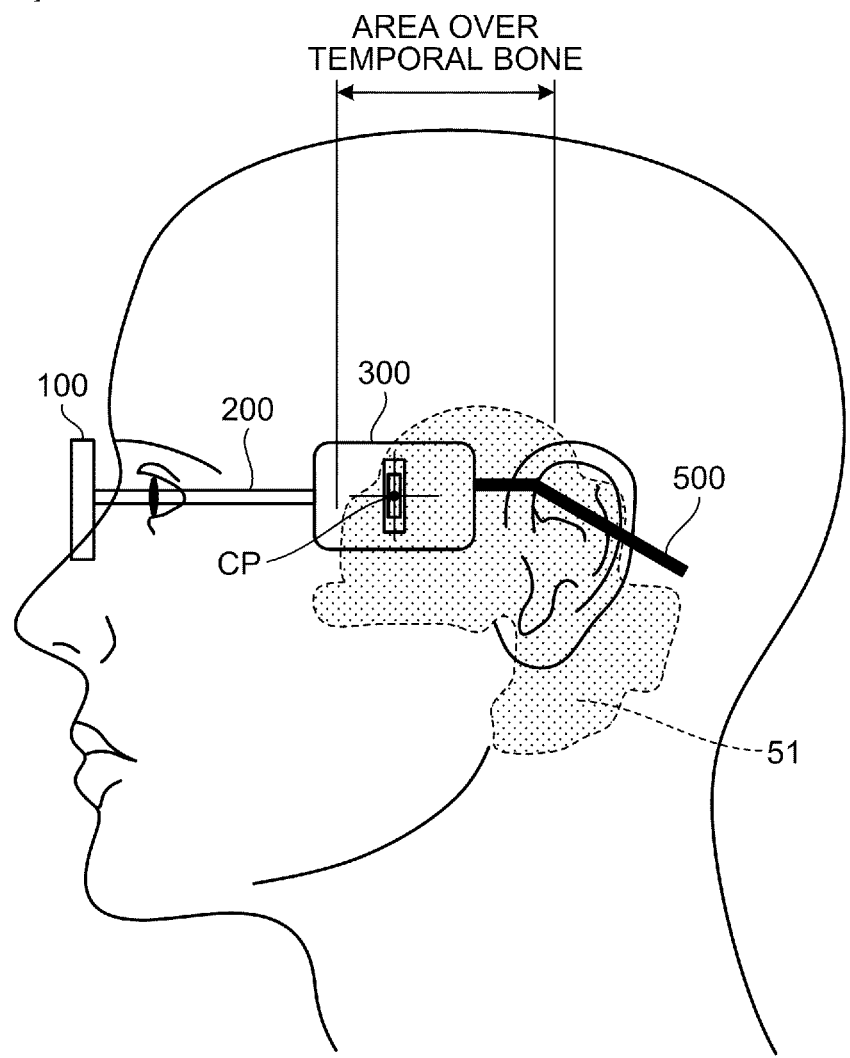

[Fig. 5]
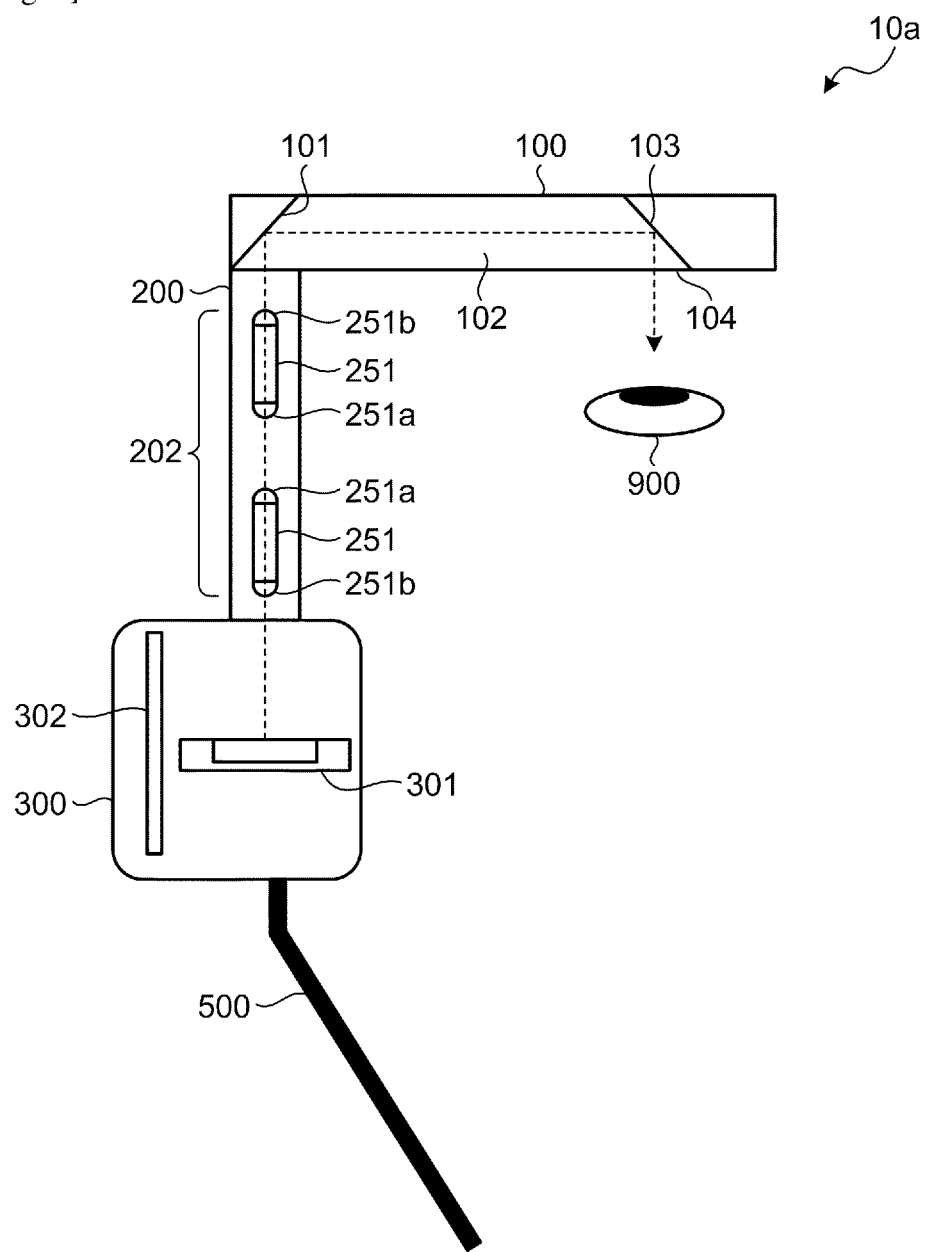

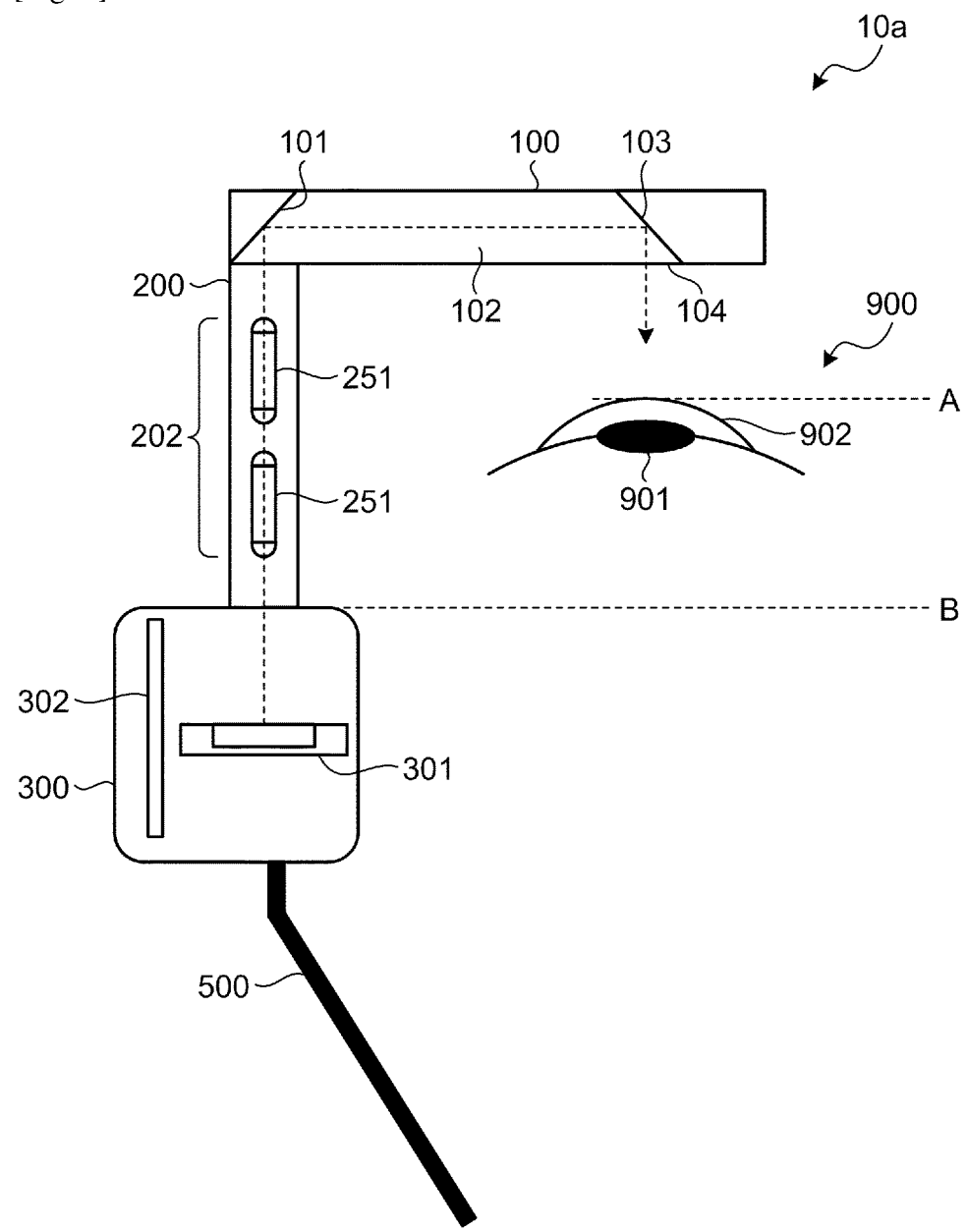
[Fig. 6]

[Fig. 7]
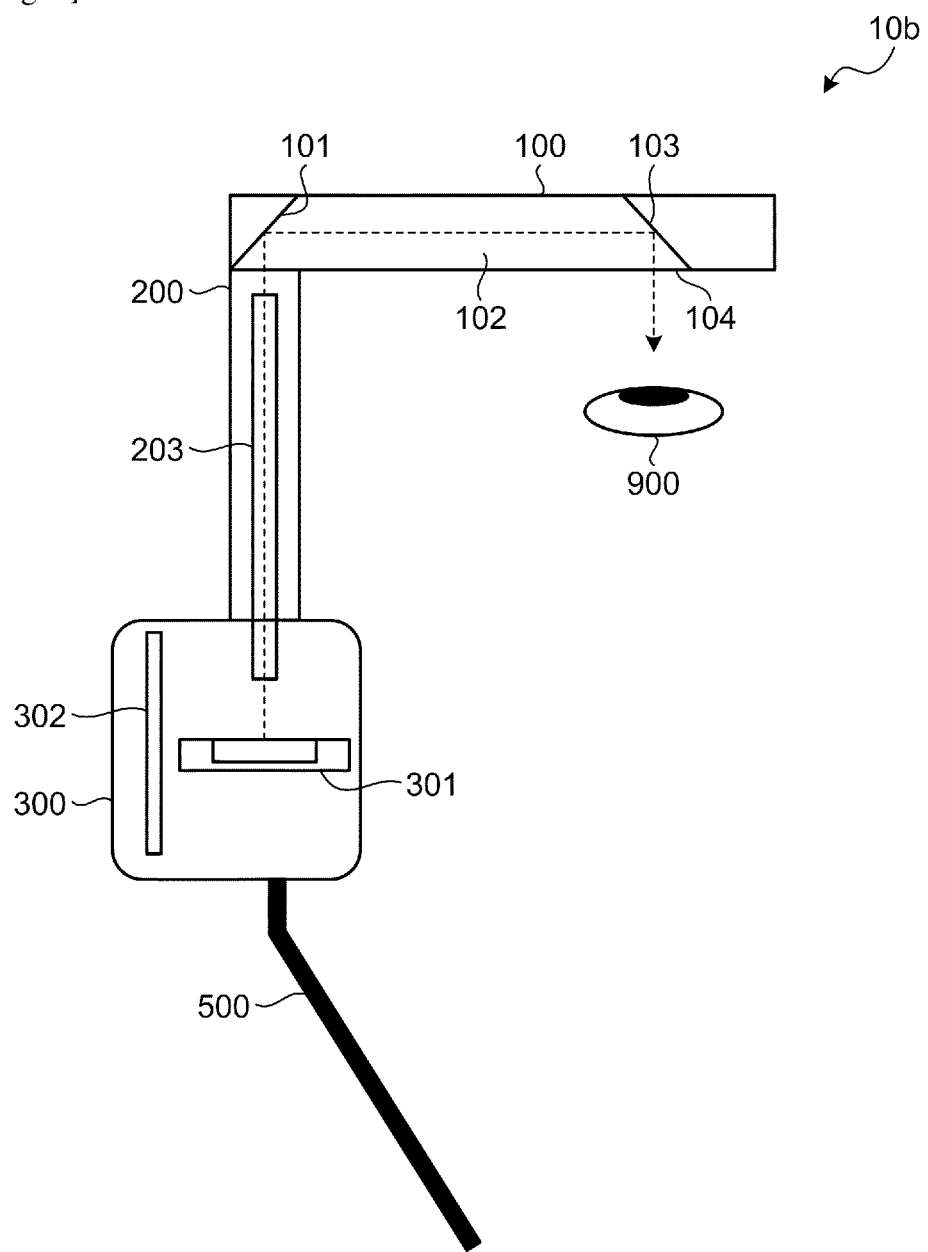

[Fig. 8]
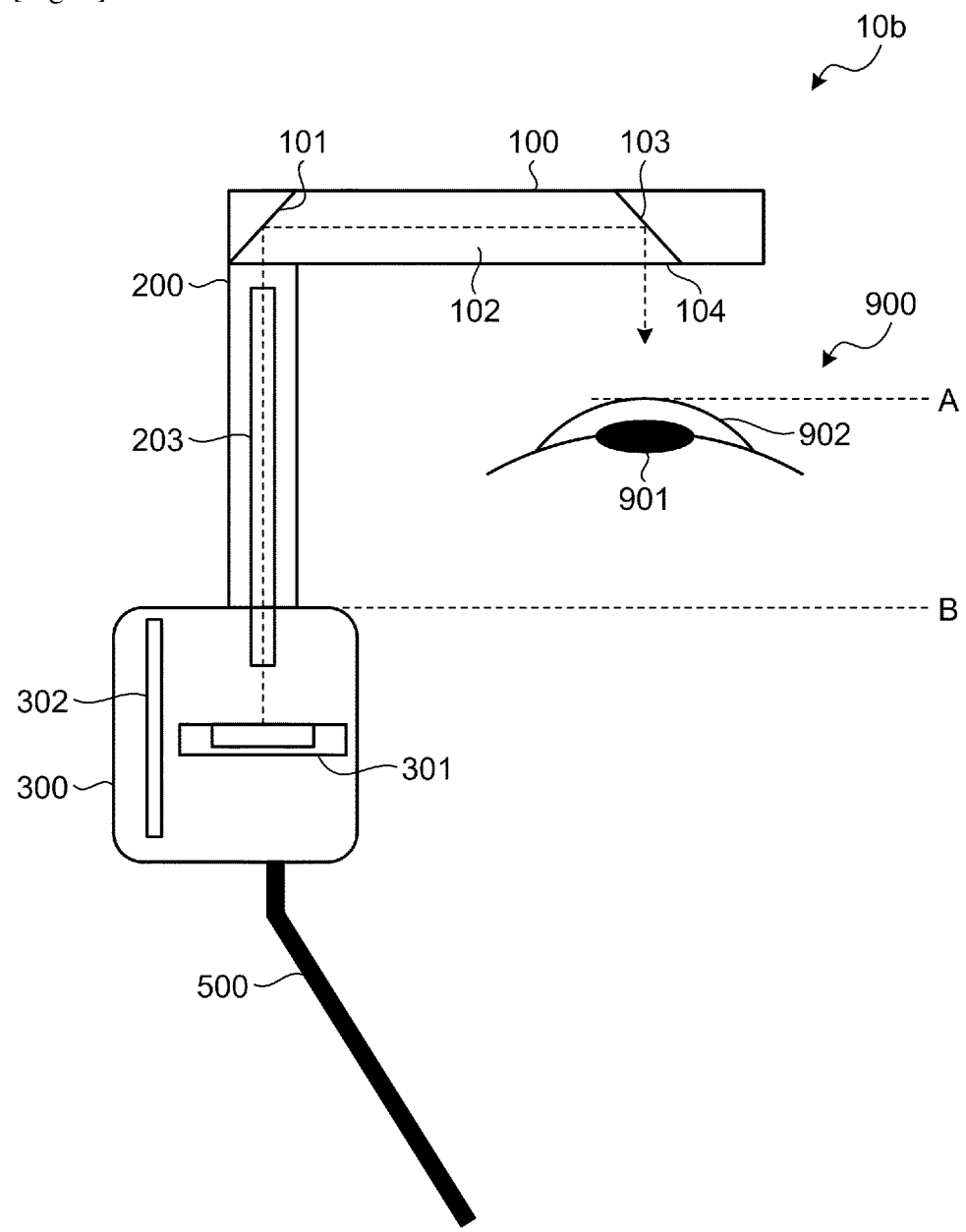

[Fig. 9]
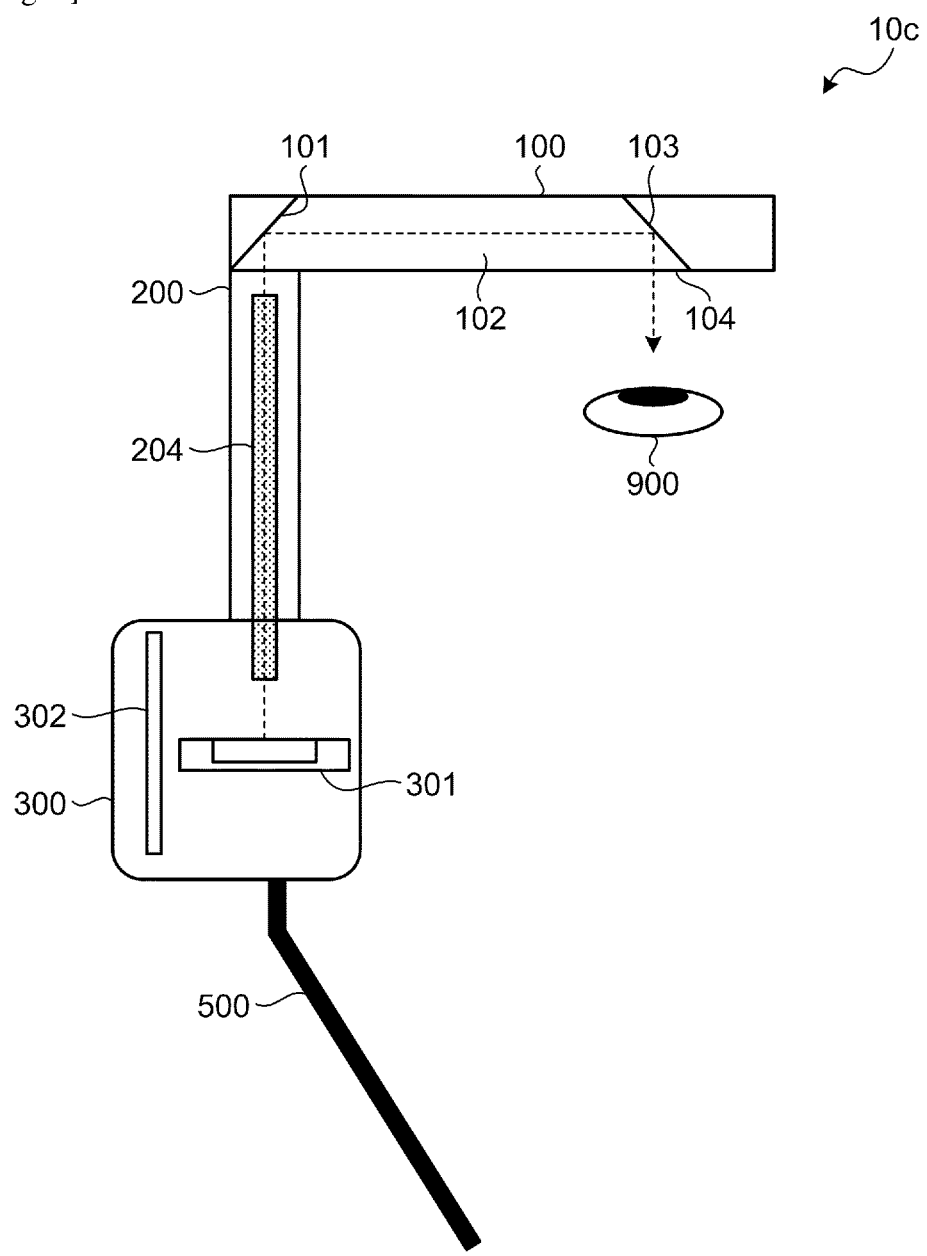

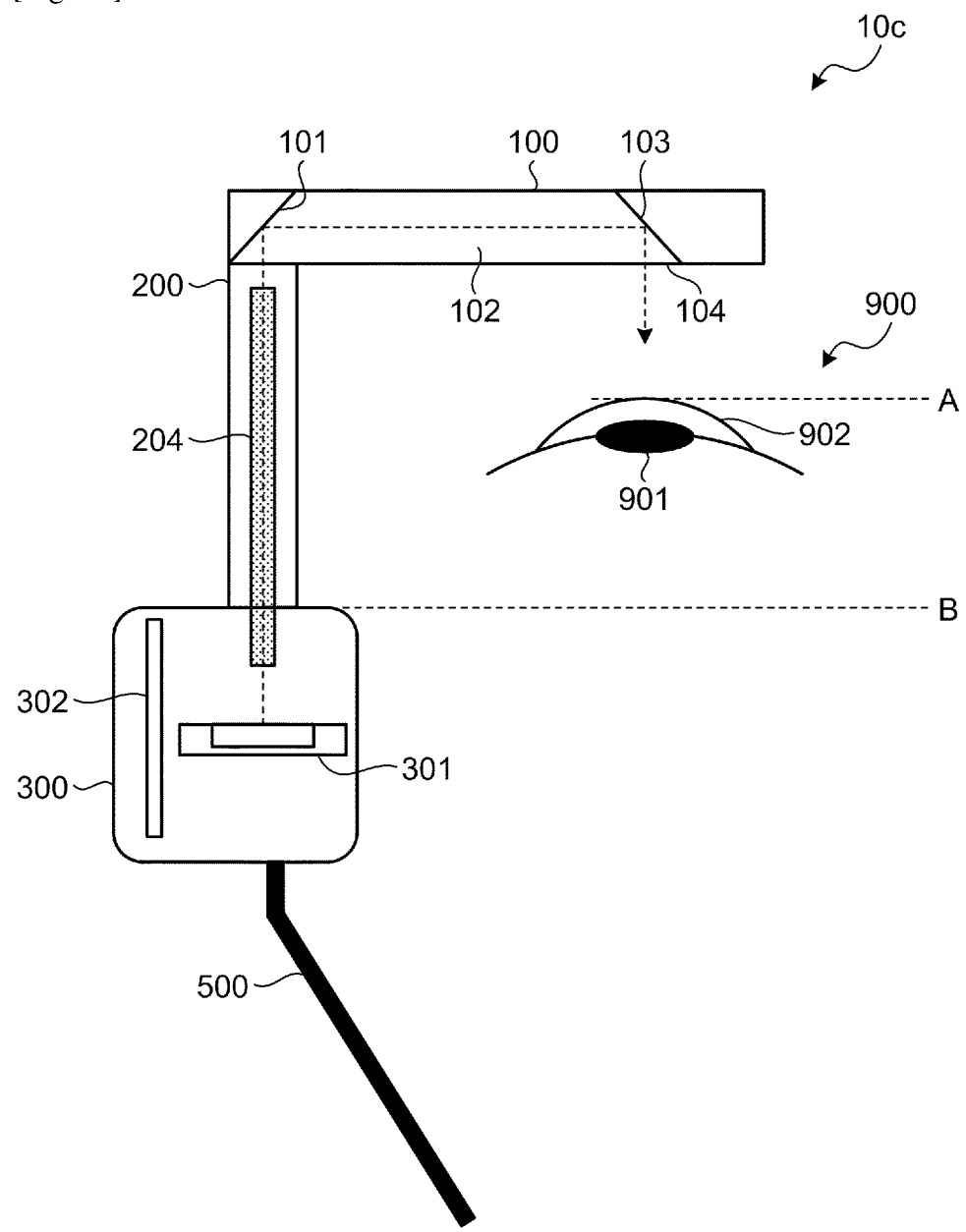
[Fig. 10]

[Fig. 11]
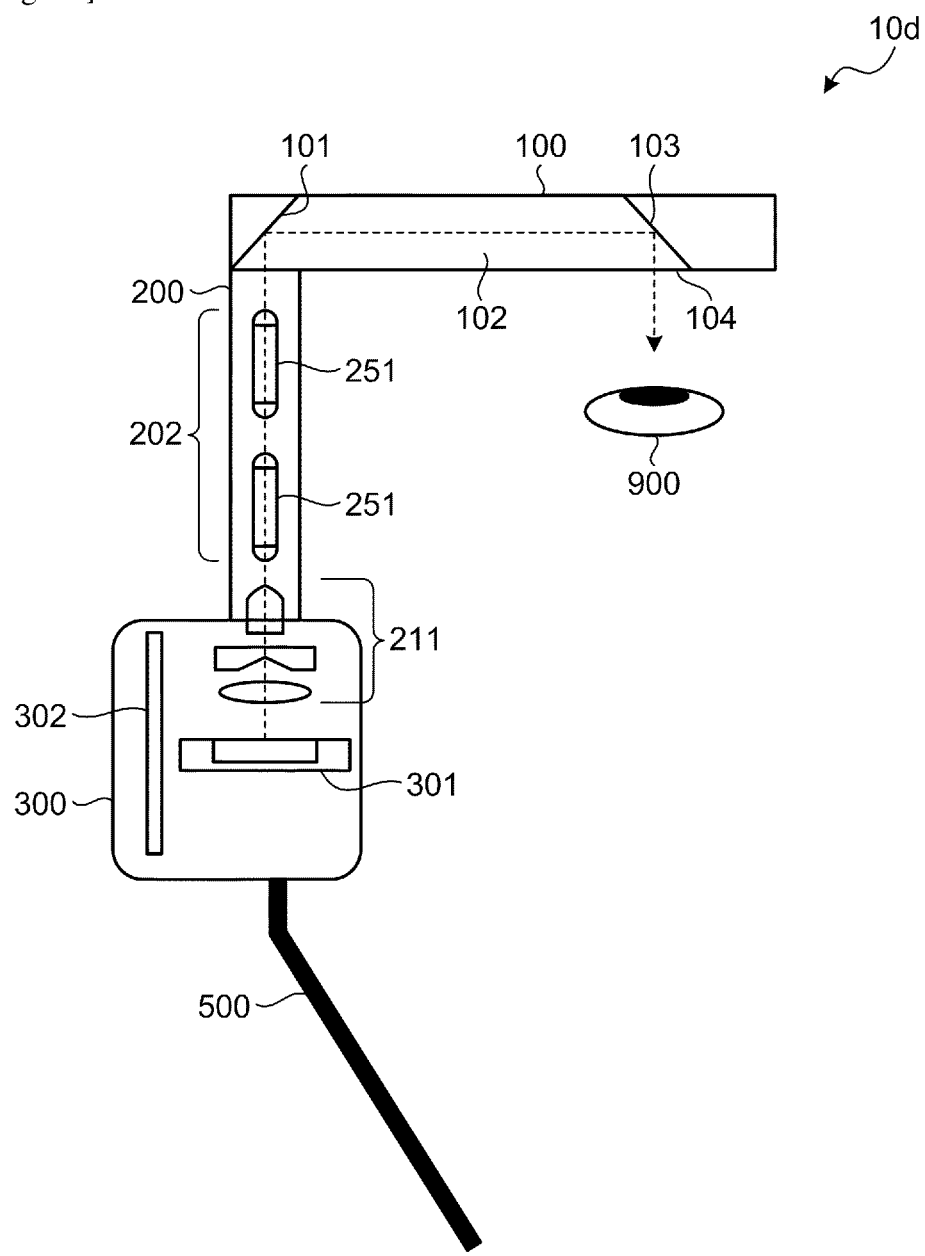

[Fig. 12]
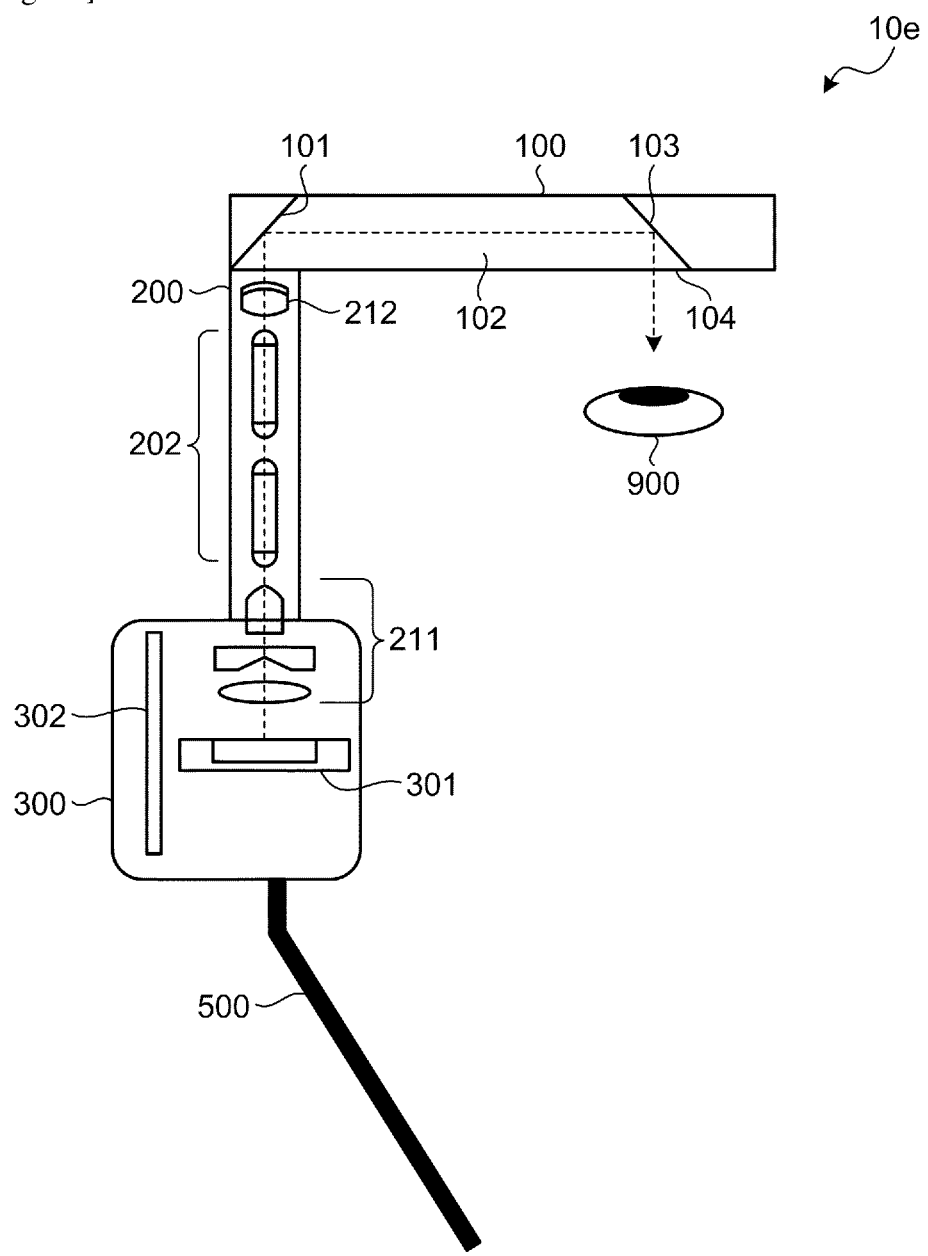

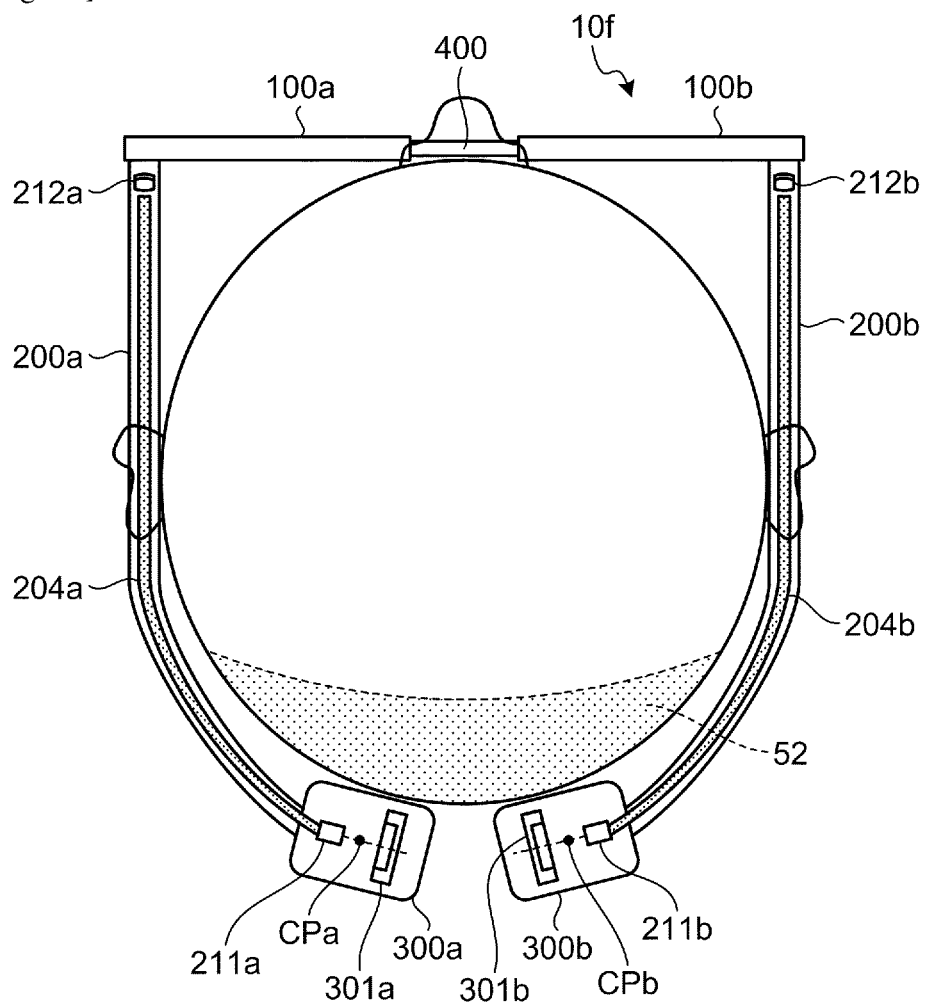
[Fig. 13]

[Fig. 14]
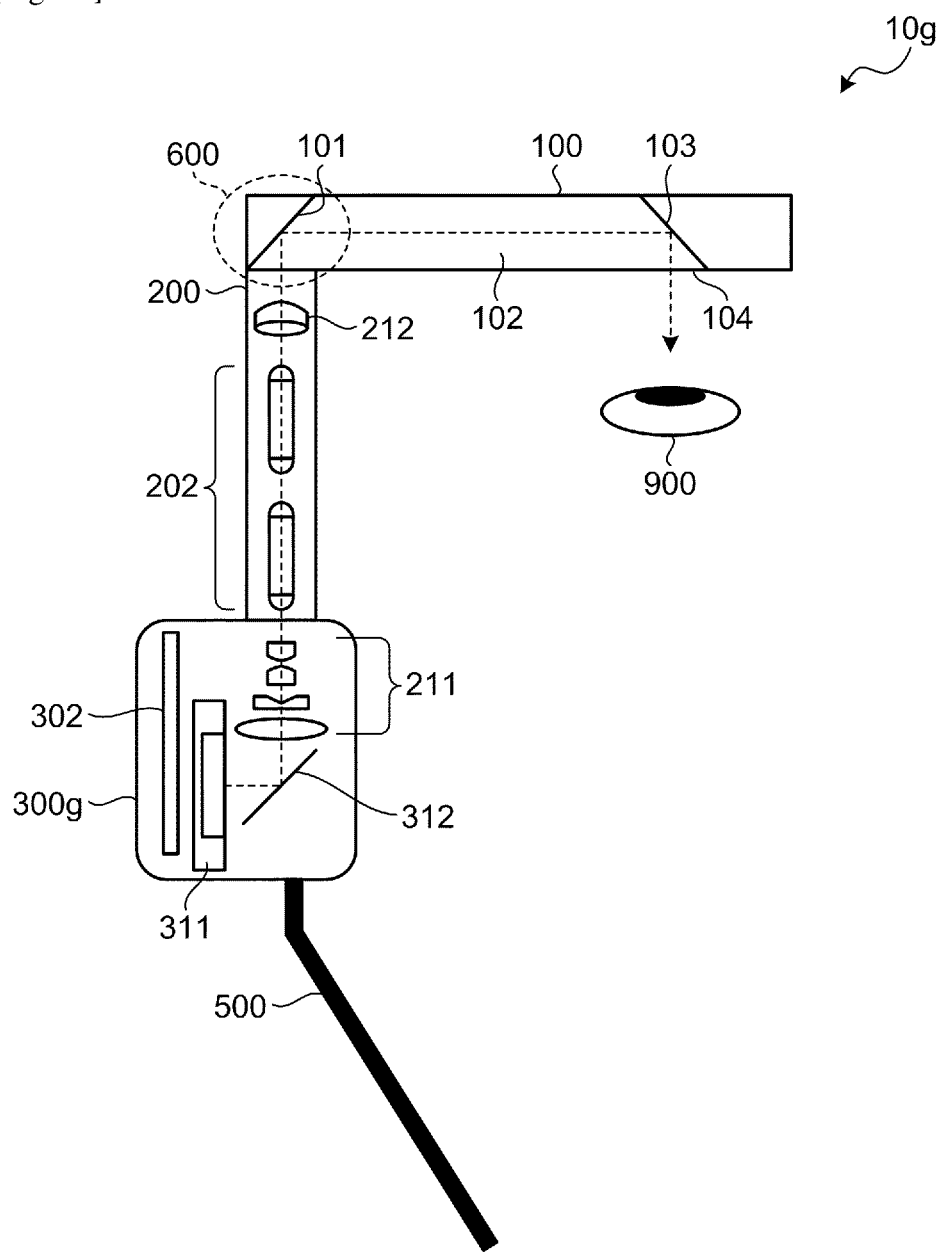

[Fig. 15]
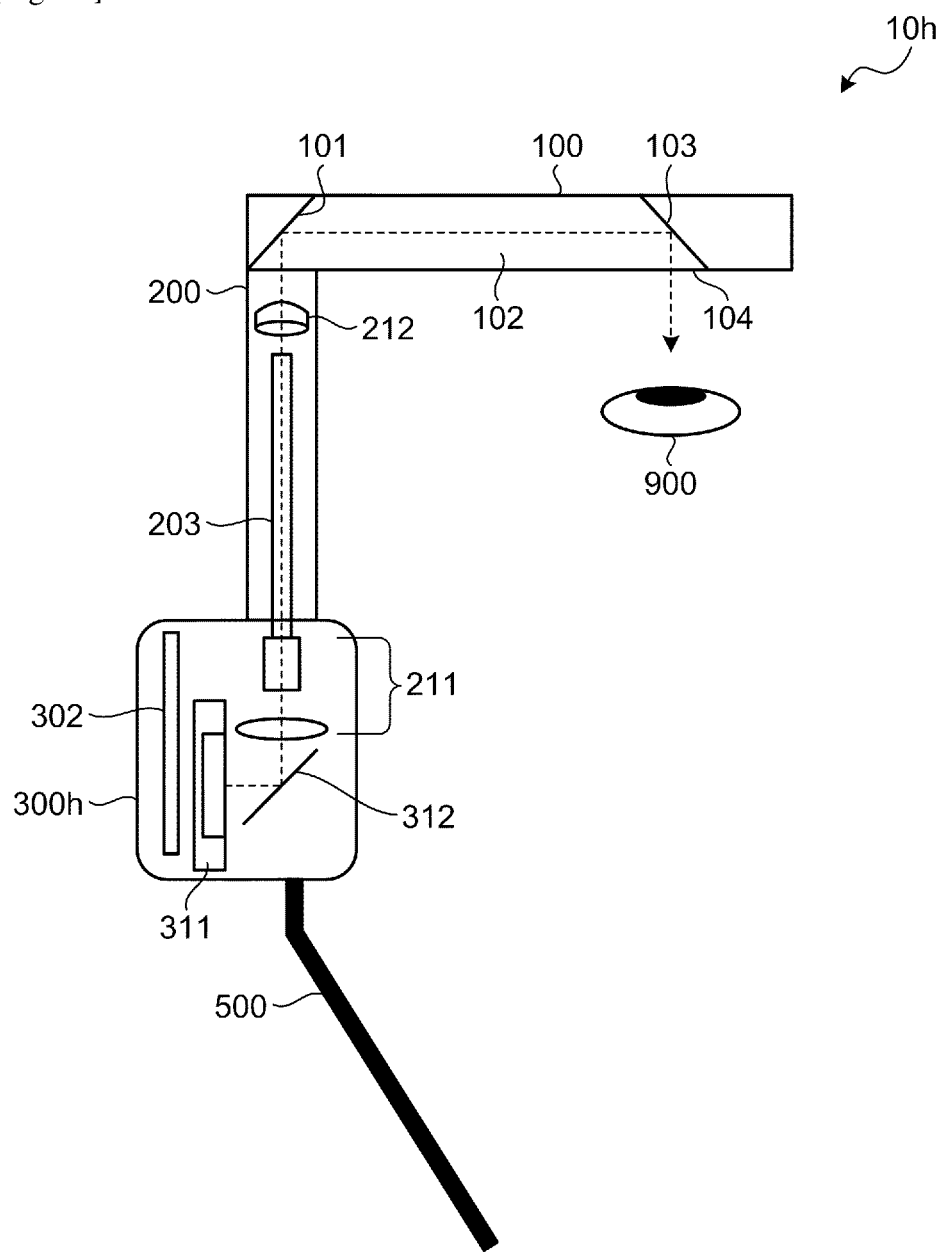

[Fig. 16]
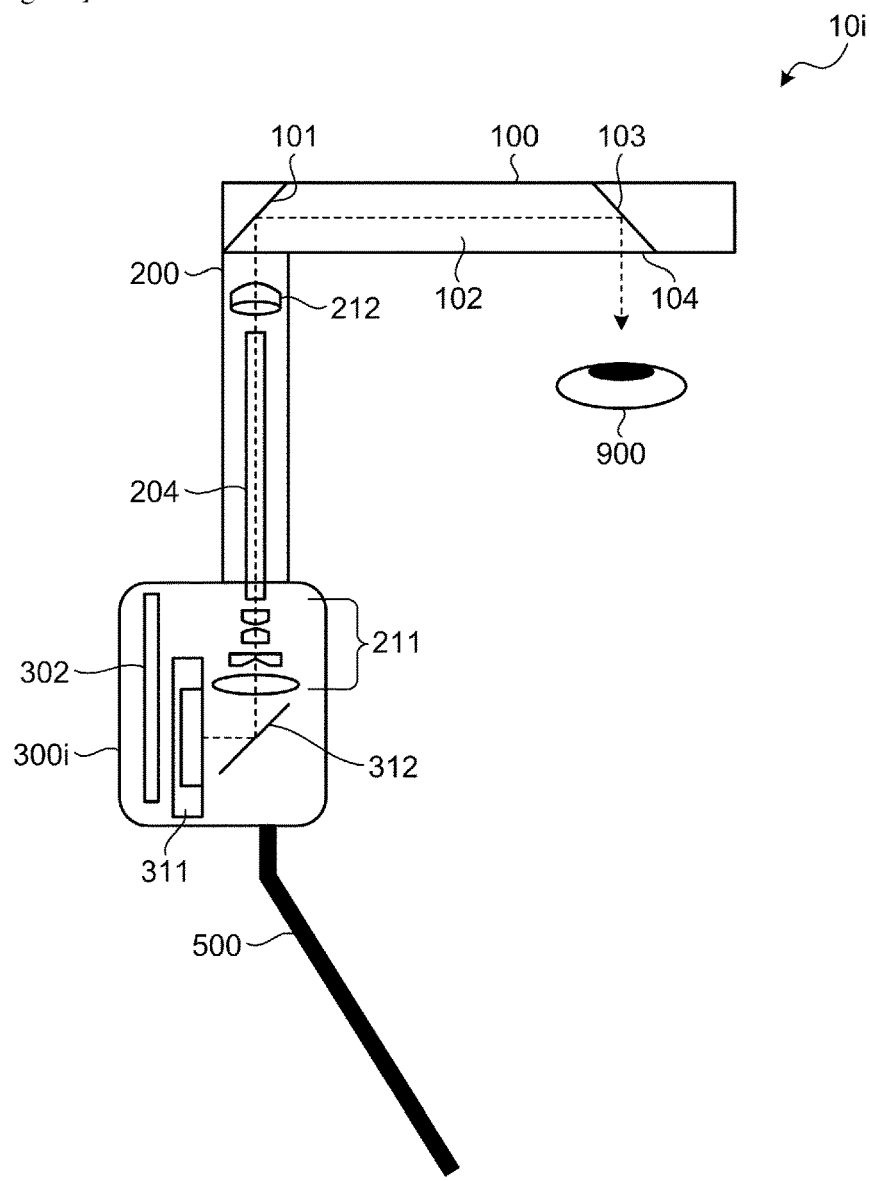
[Fig. 17]
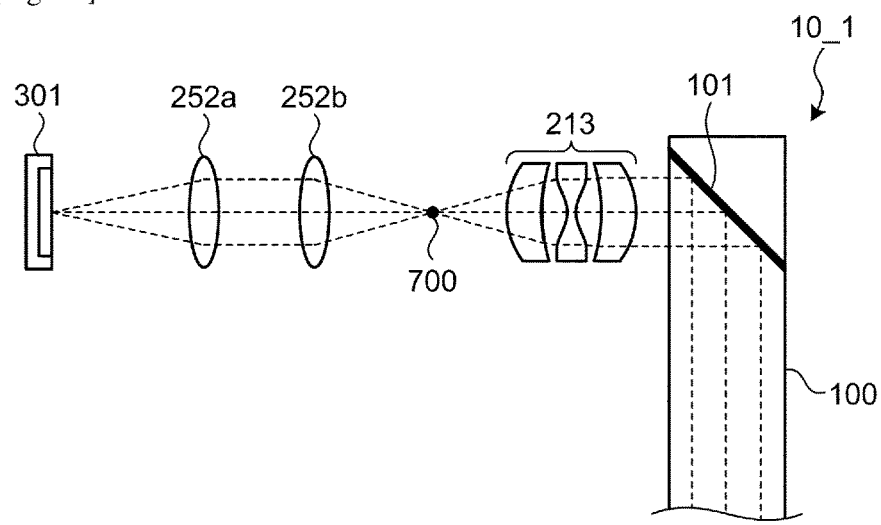

[Fig. 18]
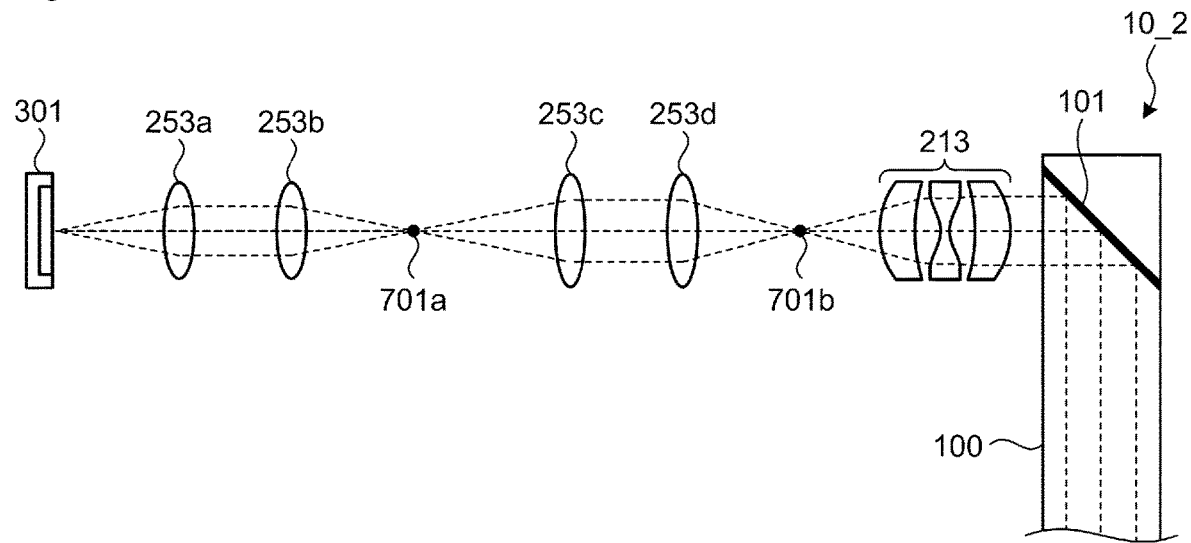
[Fig. 19]
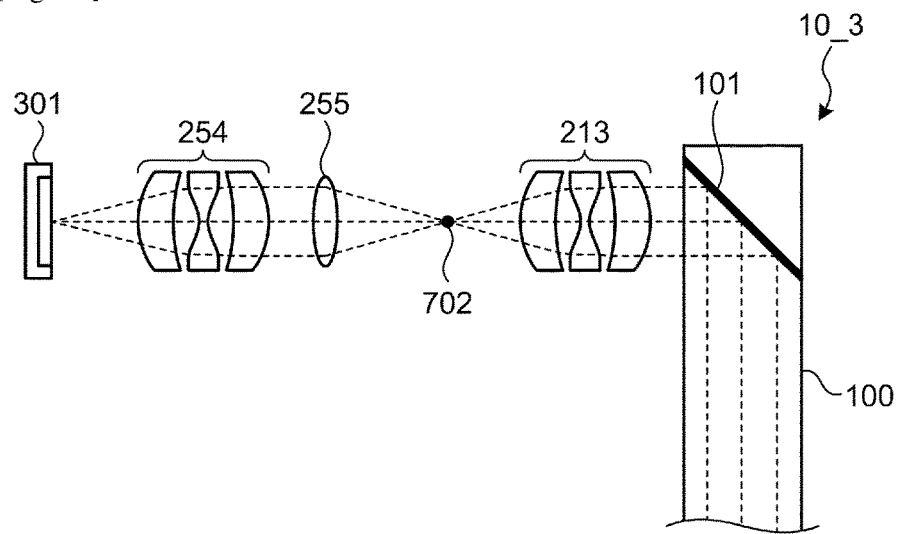
[Fig. 20]
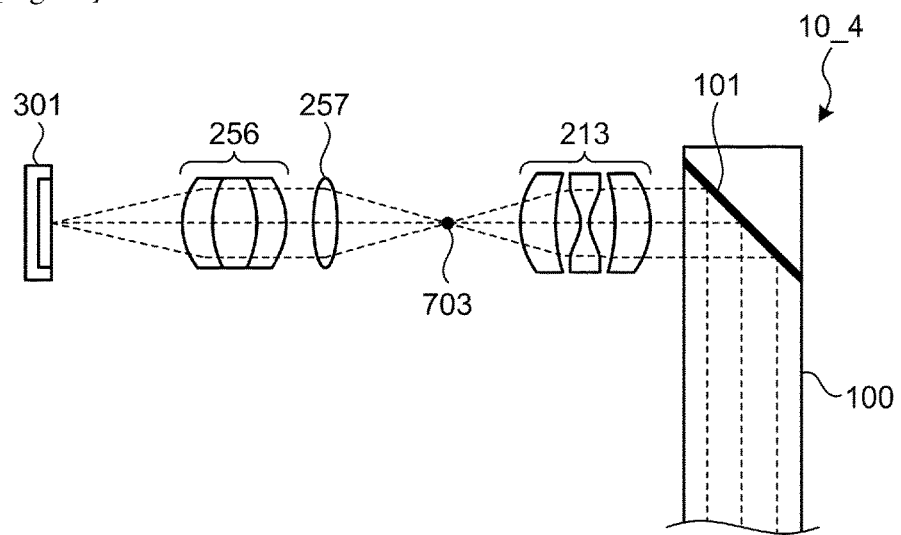

[Fig. 21]
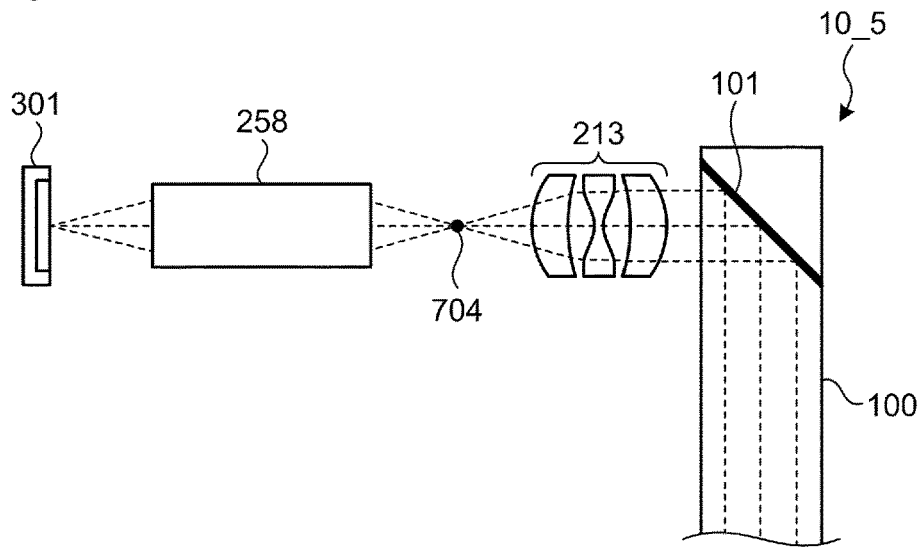
[Fig. 22]
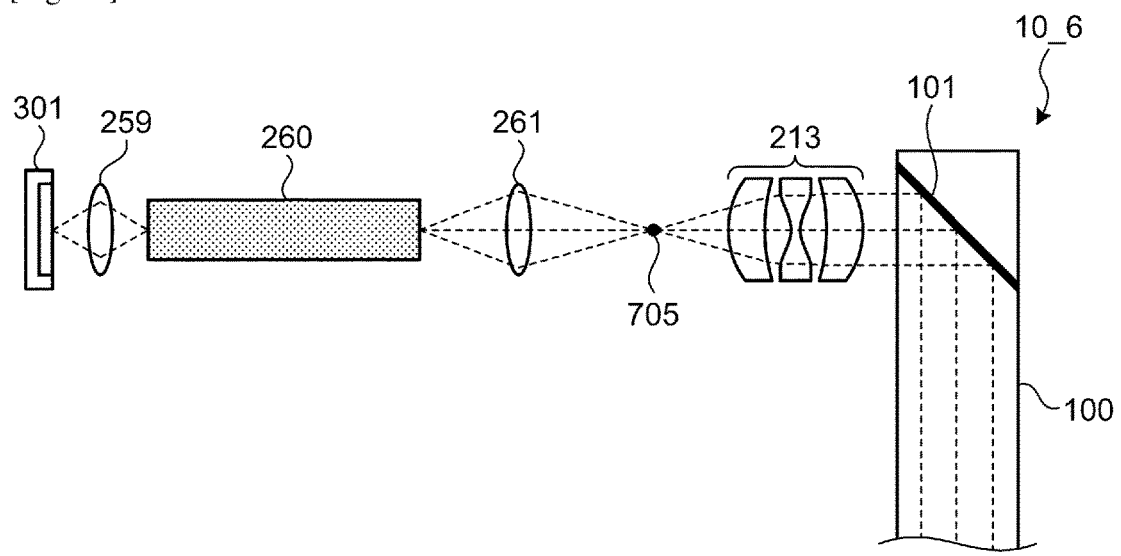
[Fig. 23]
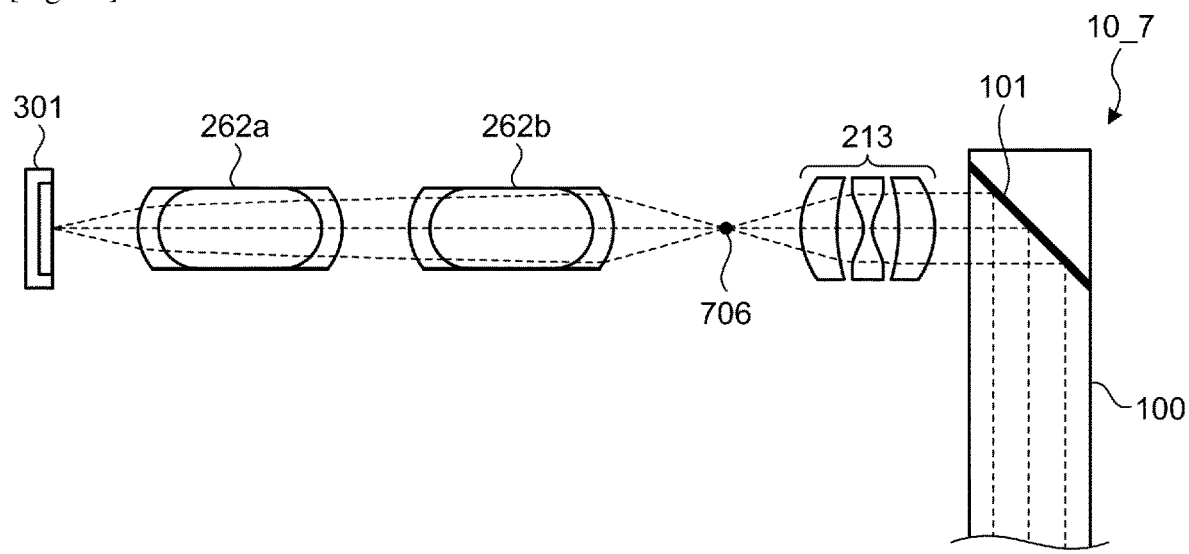

[Fig. 24]
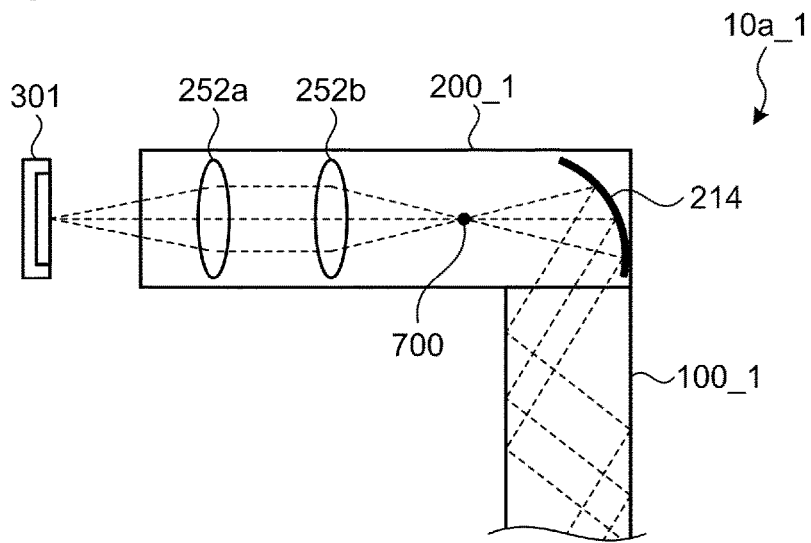
[Fig. 25]
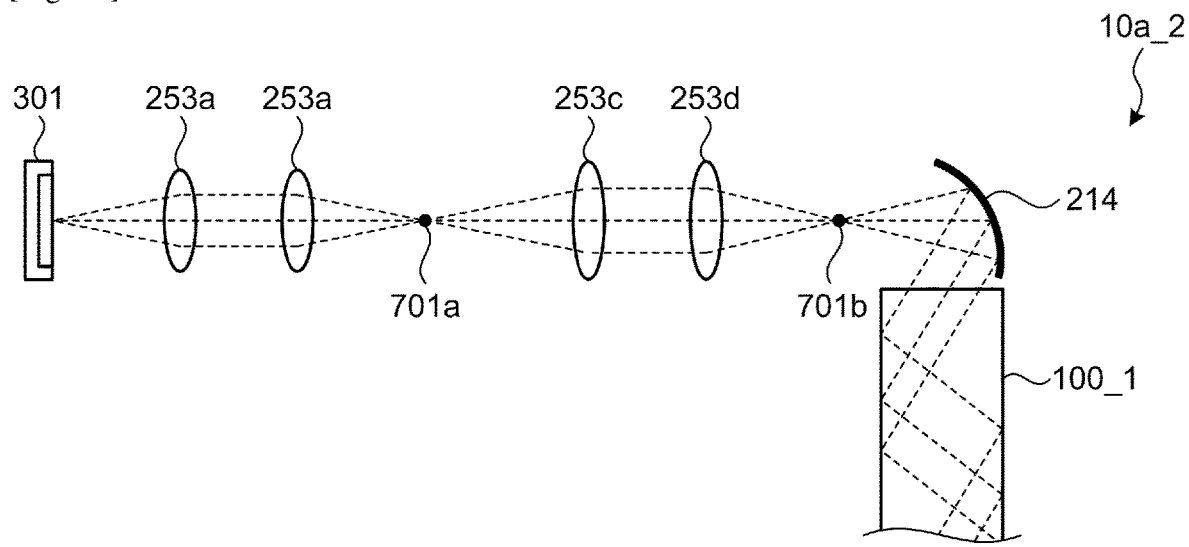
[Fig. 26]
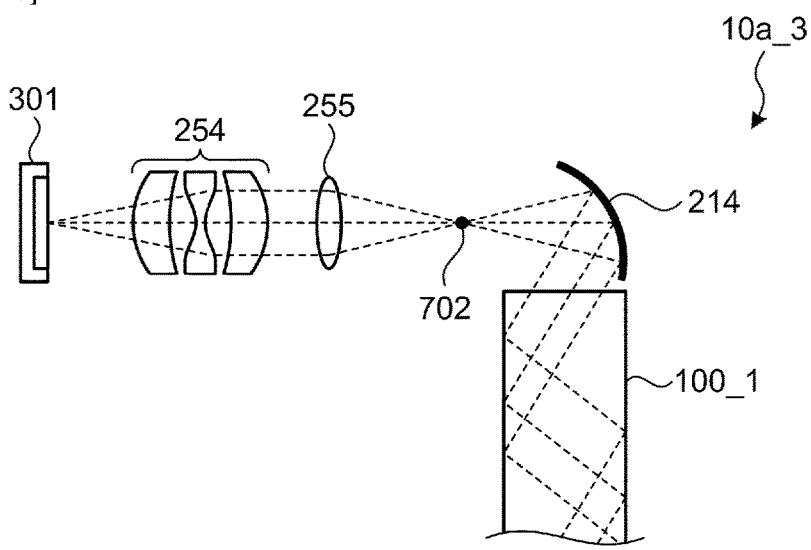

[Fig. 27]
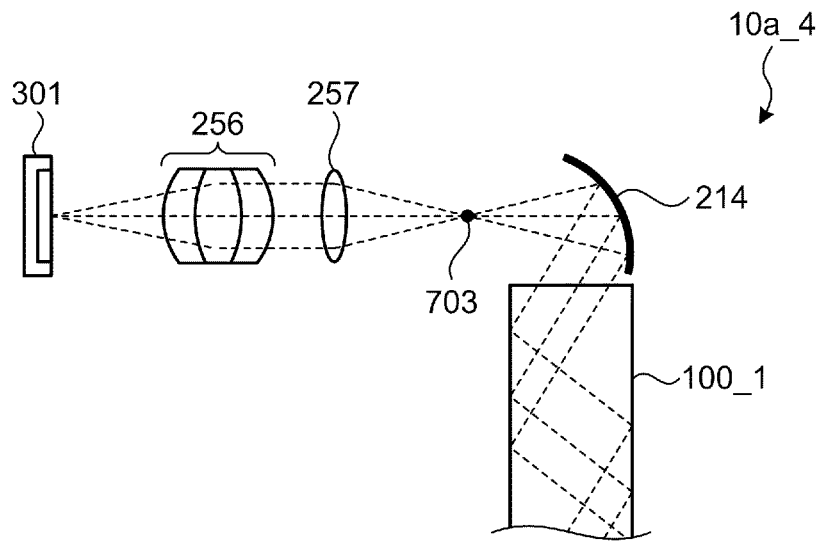
[Fig. 28]
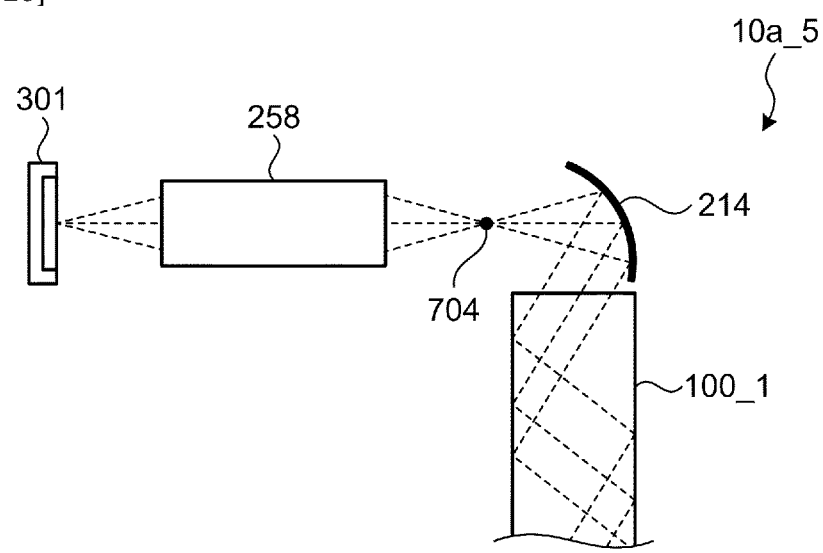
[Fig. 29]
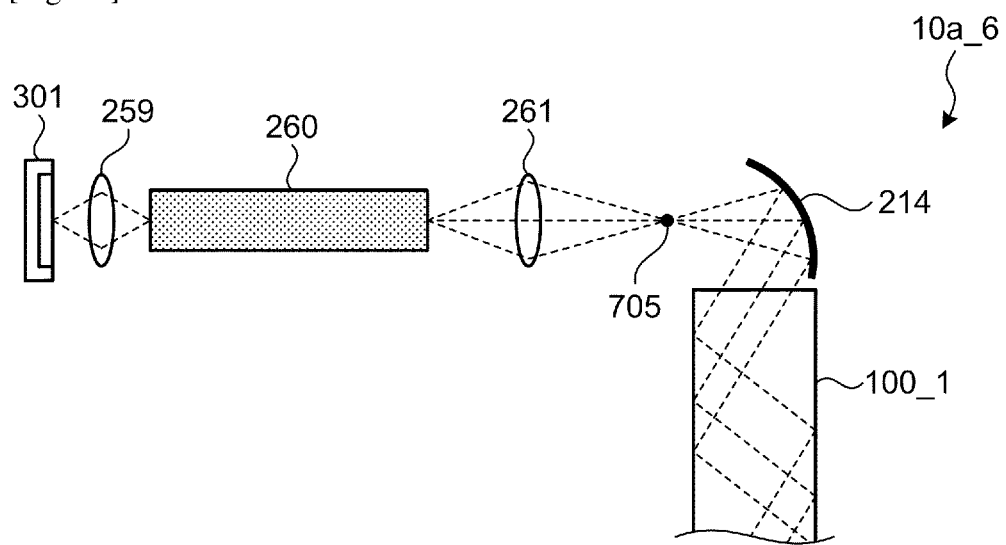

[Fig. 30]
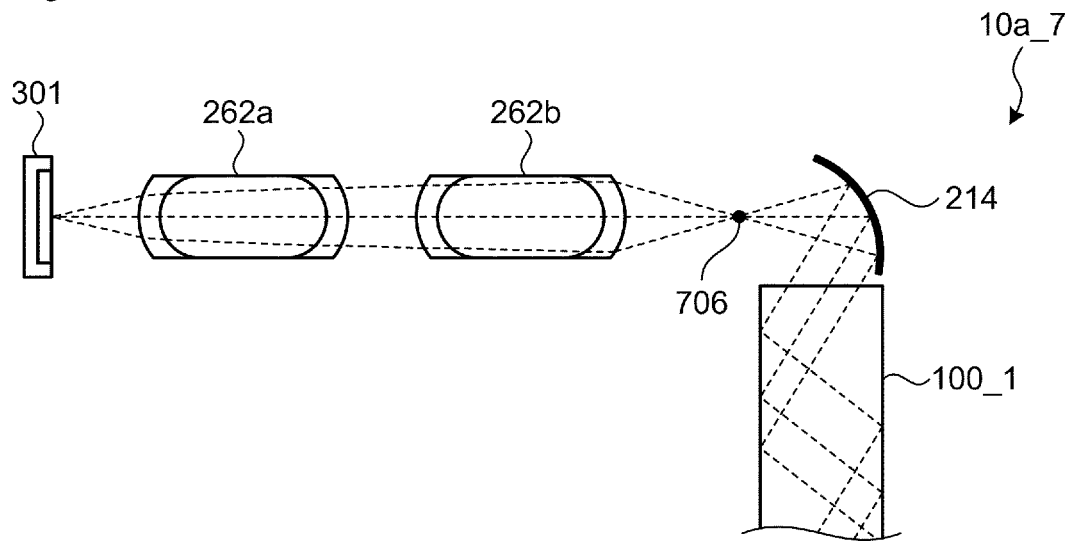
[Fig. 31A]
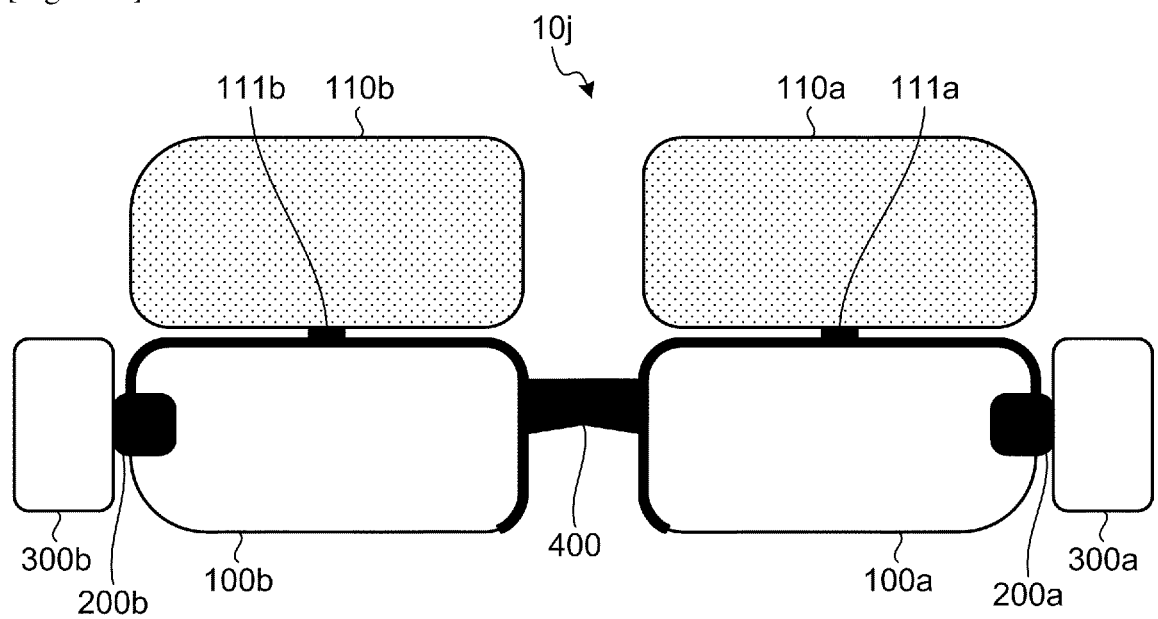
[Fig. 31B]
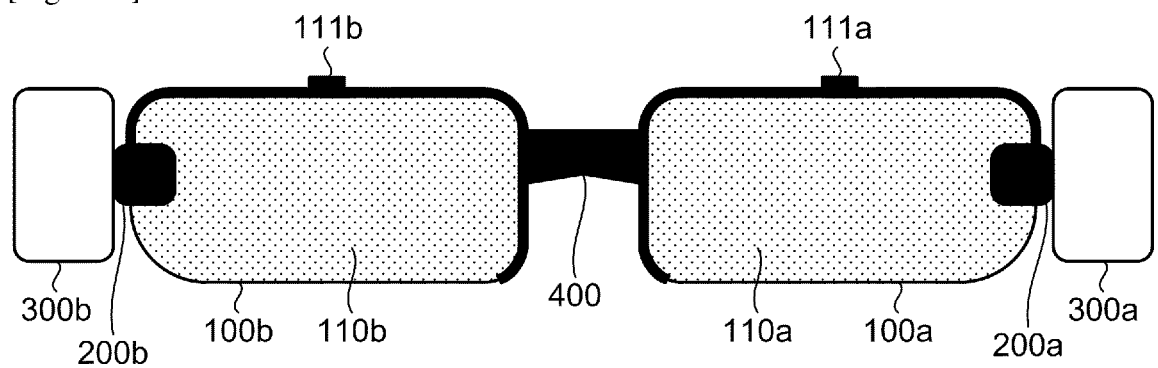

[Fig. 32]
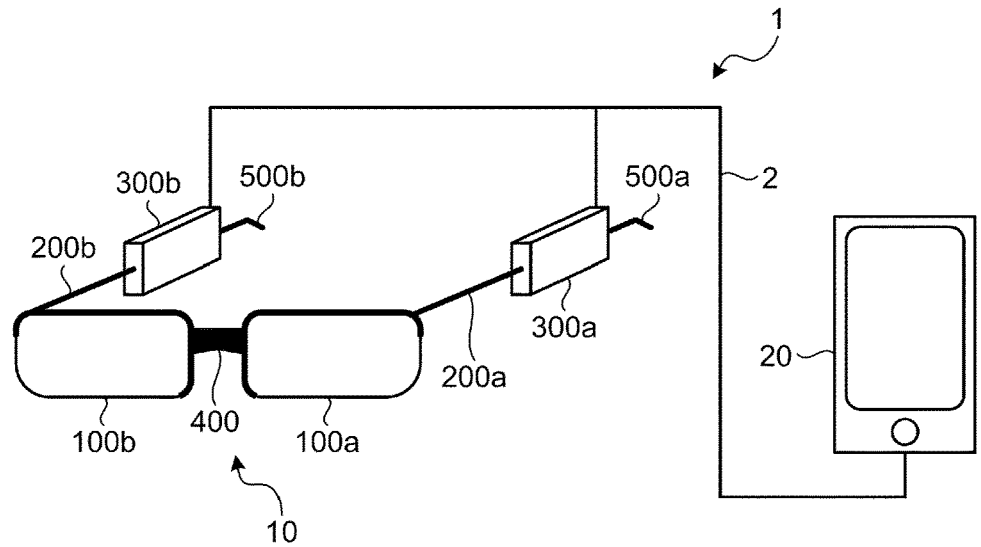
[Fig. 33]
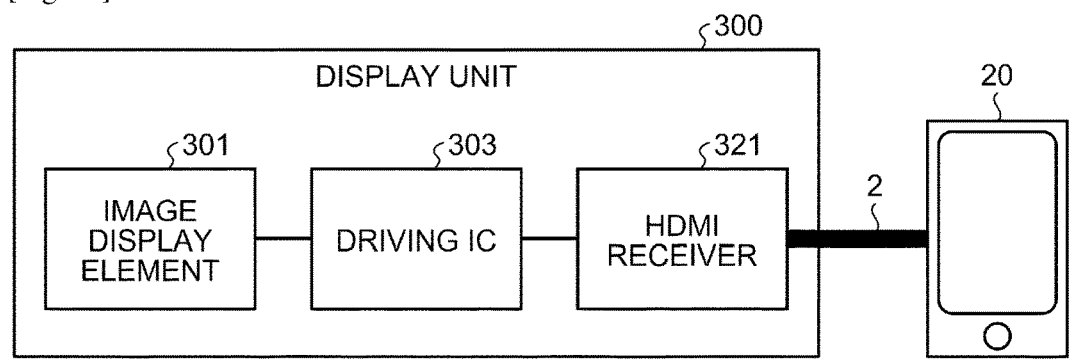
[Fig. 34]
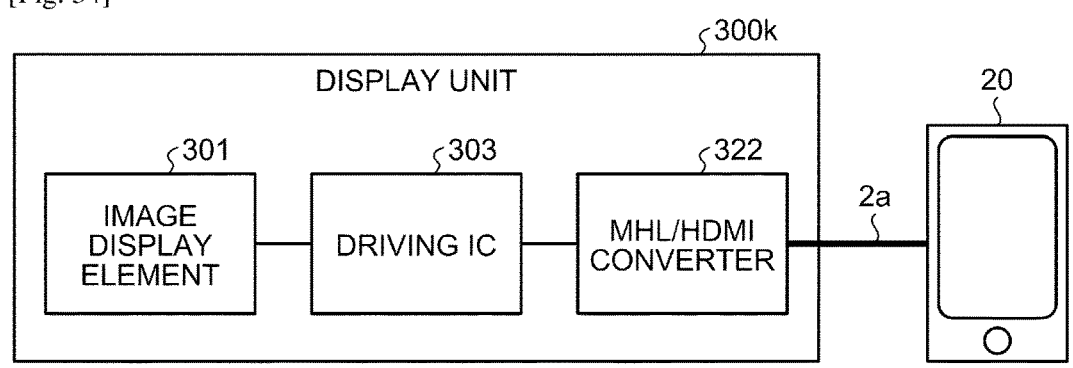
[Fig. 35]
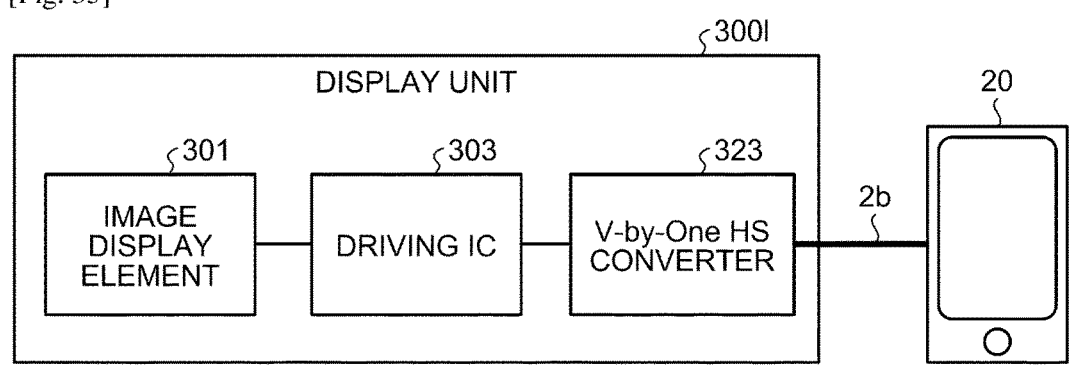

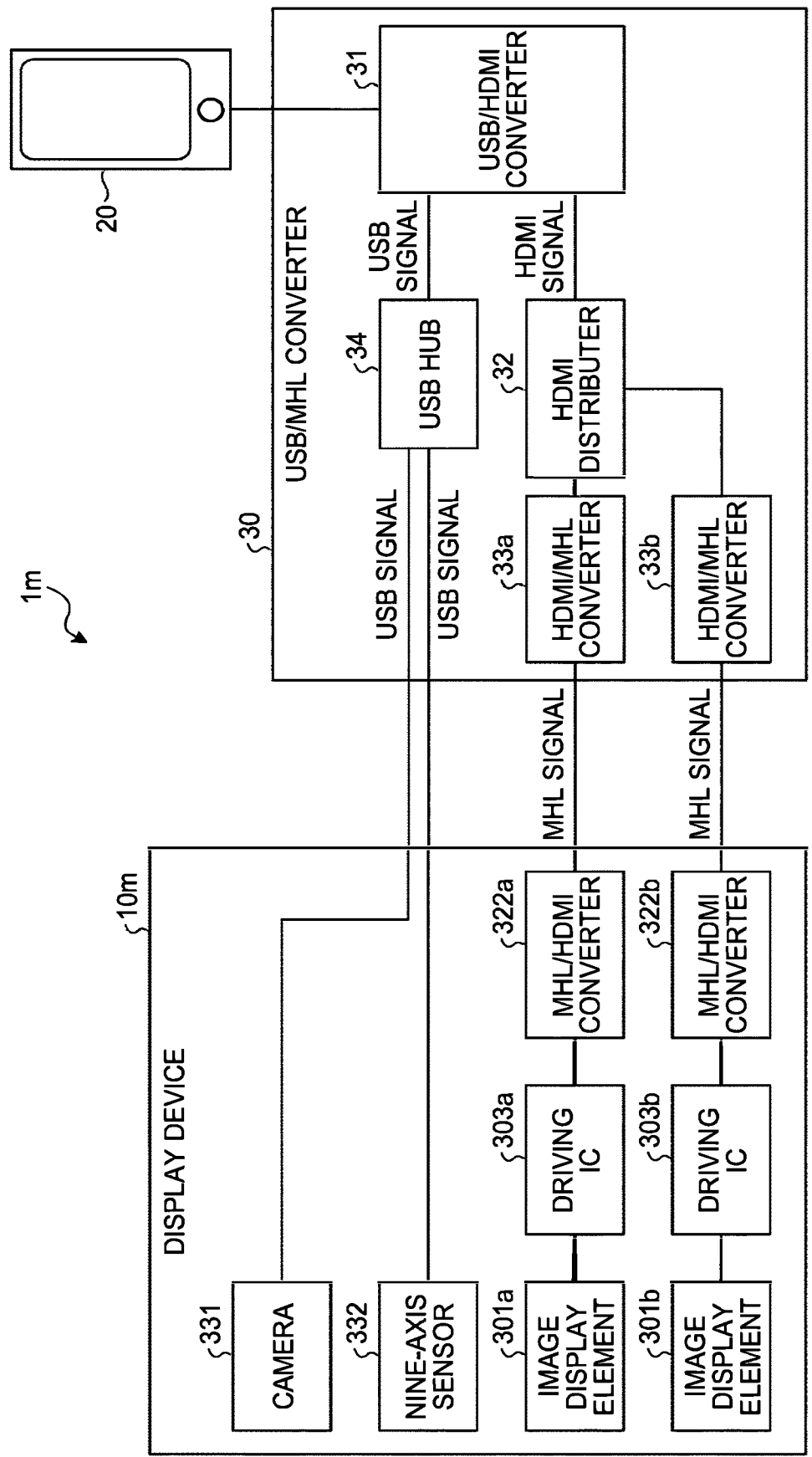
[Fig. 36]

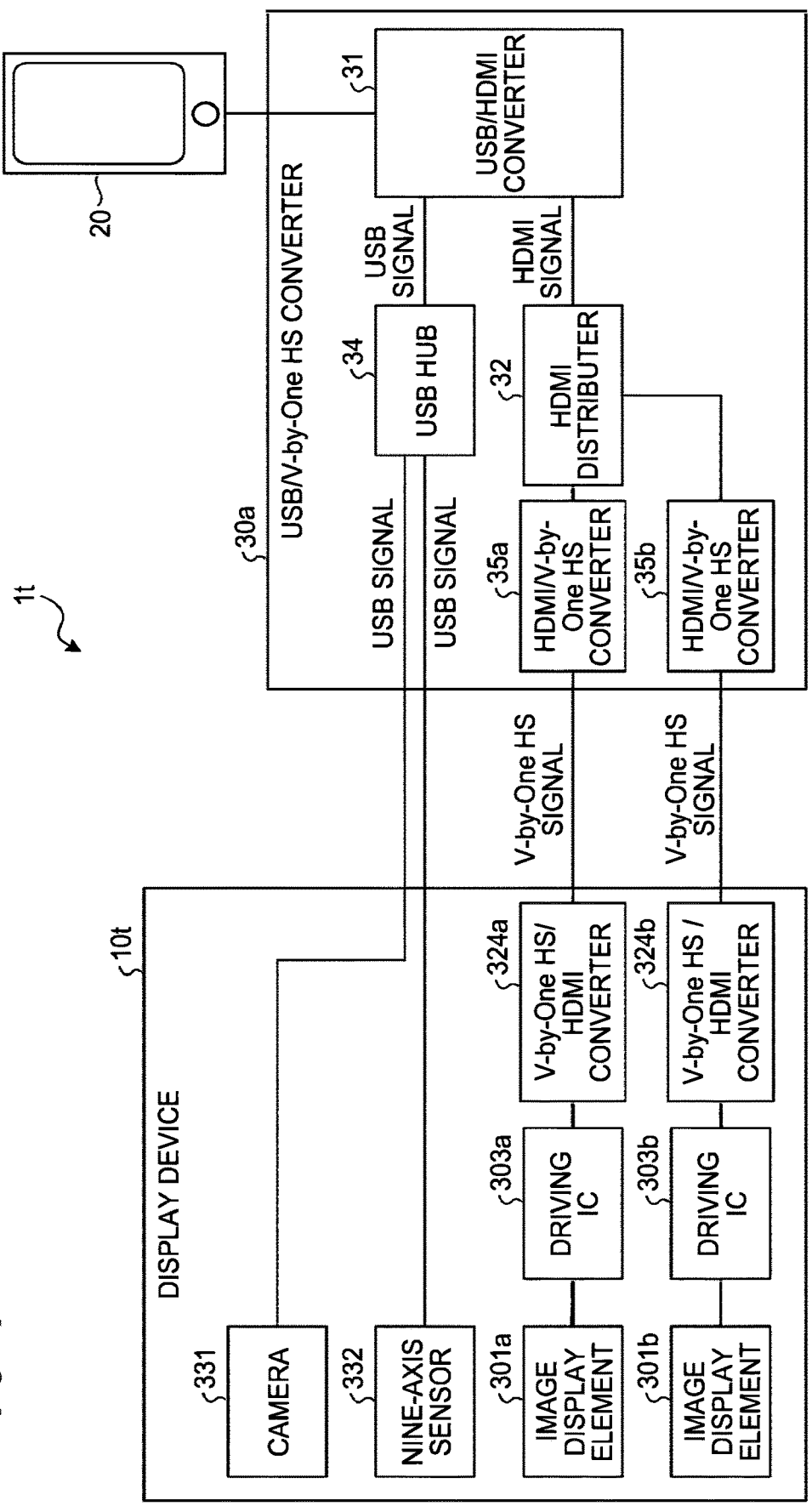
[Fig. 37]

[Fig. 38]
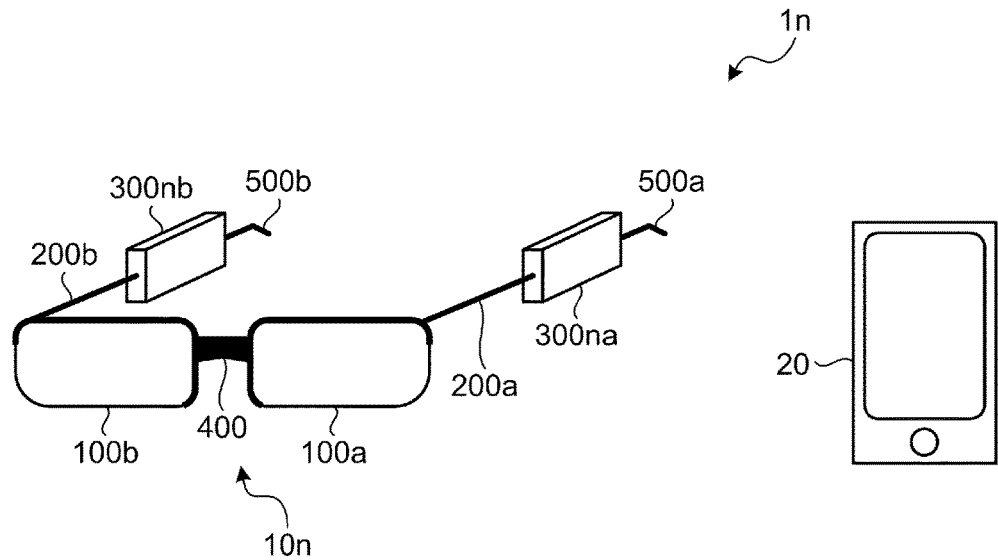
[Fig. 39]
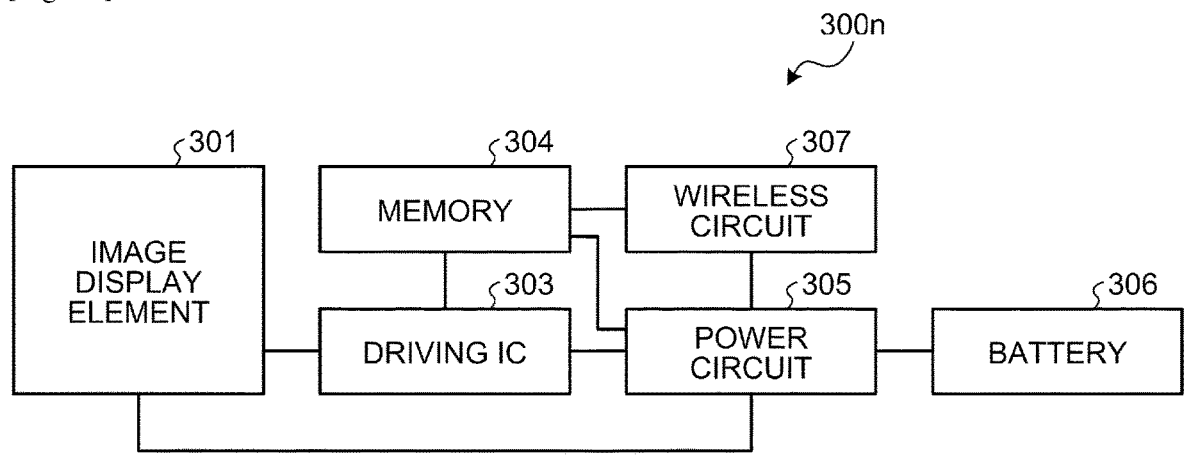
[Fig. 40]
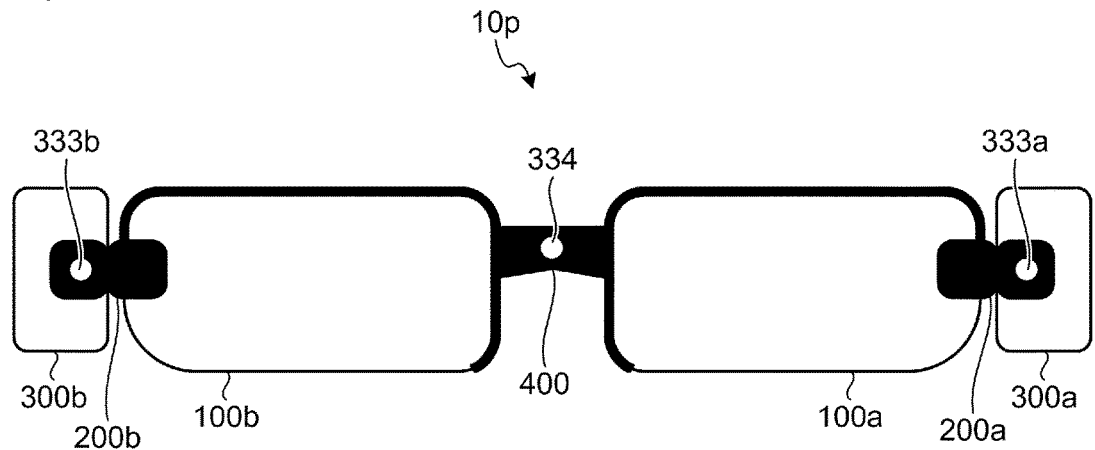

[Fig. 41]
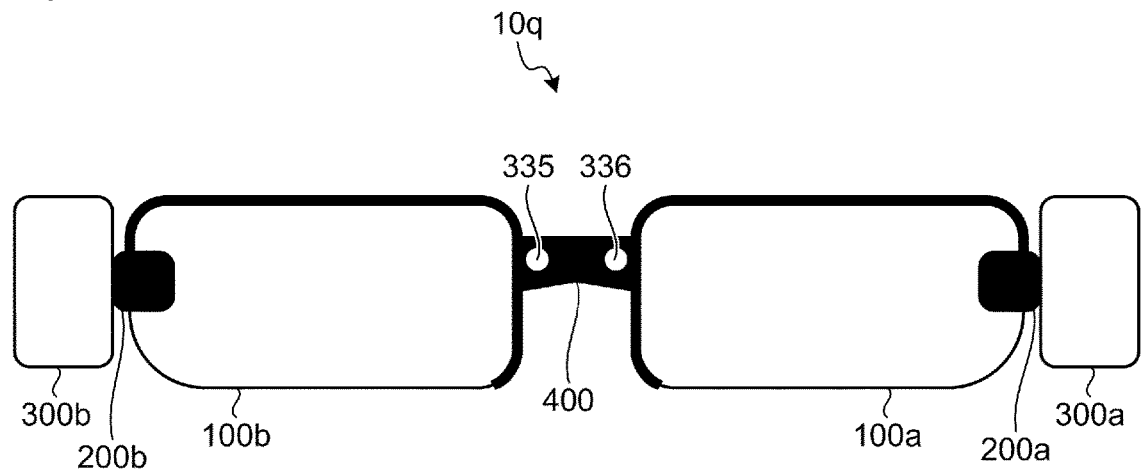
[Fig. 42]
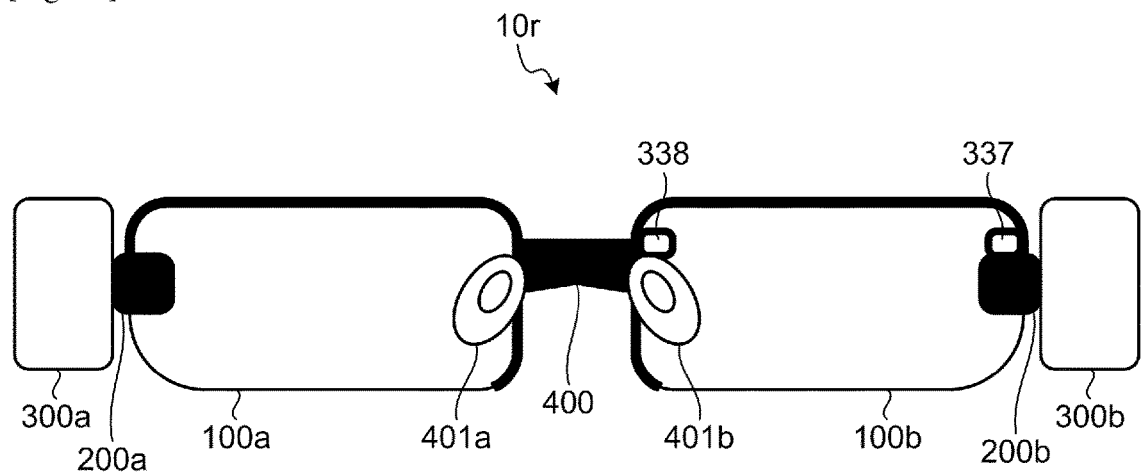
[Fig. 43]
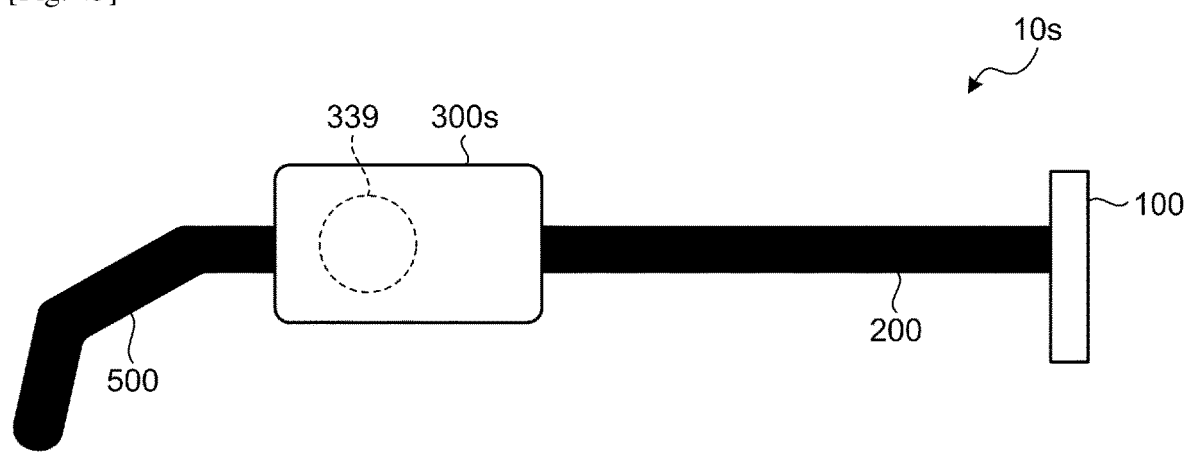

[Fig. 44A]
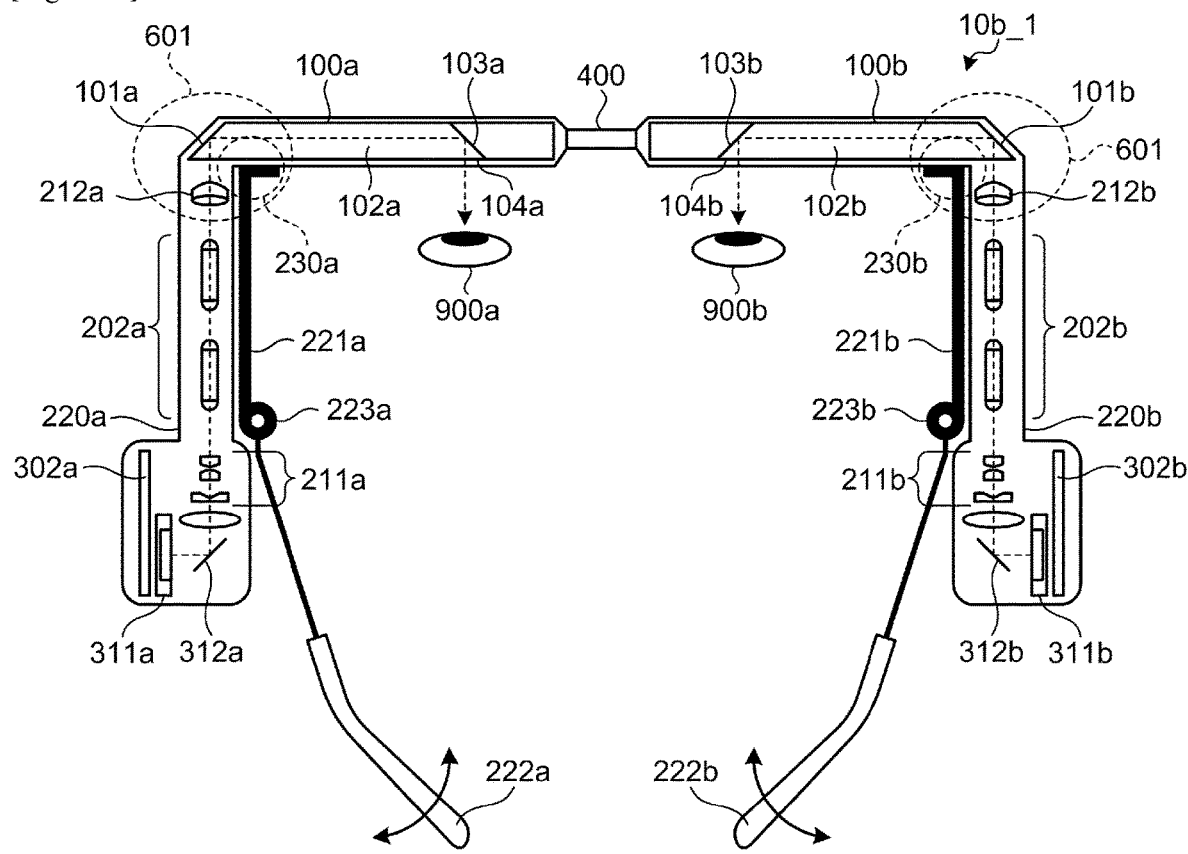
[Fig. 44B]
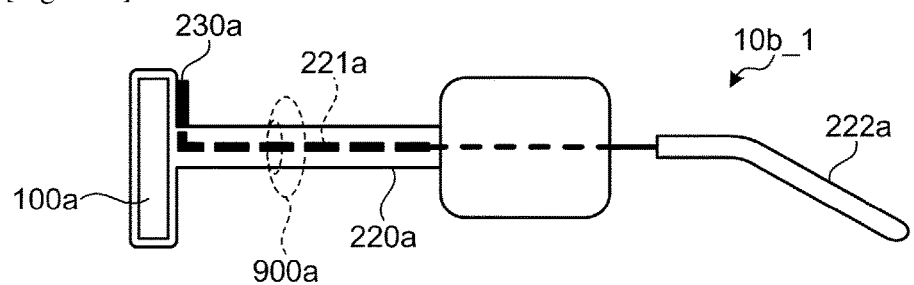
[Fig. 44C]
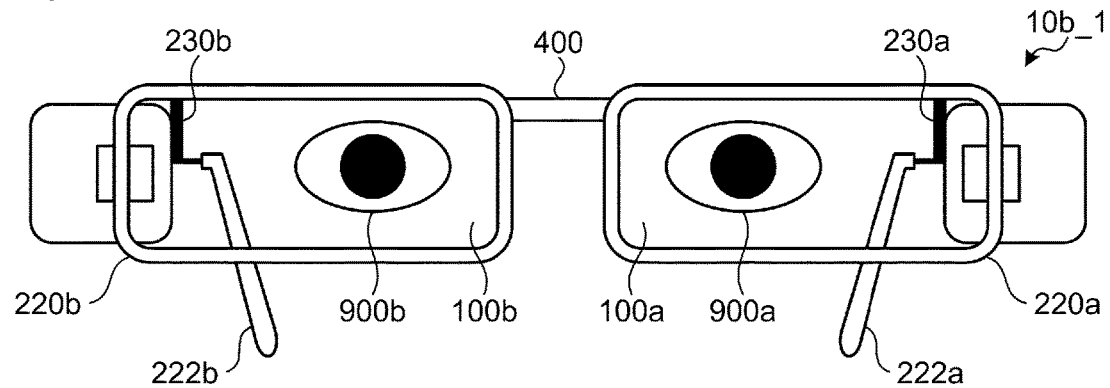

[Fig. 45A]
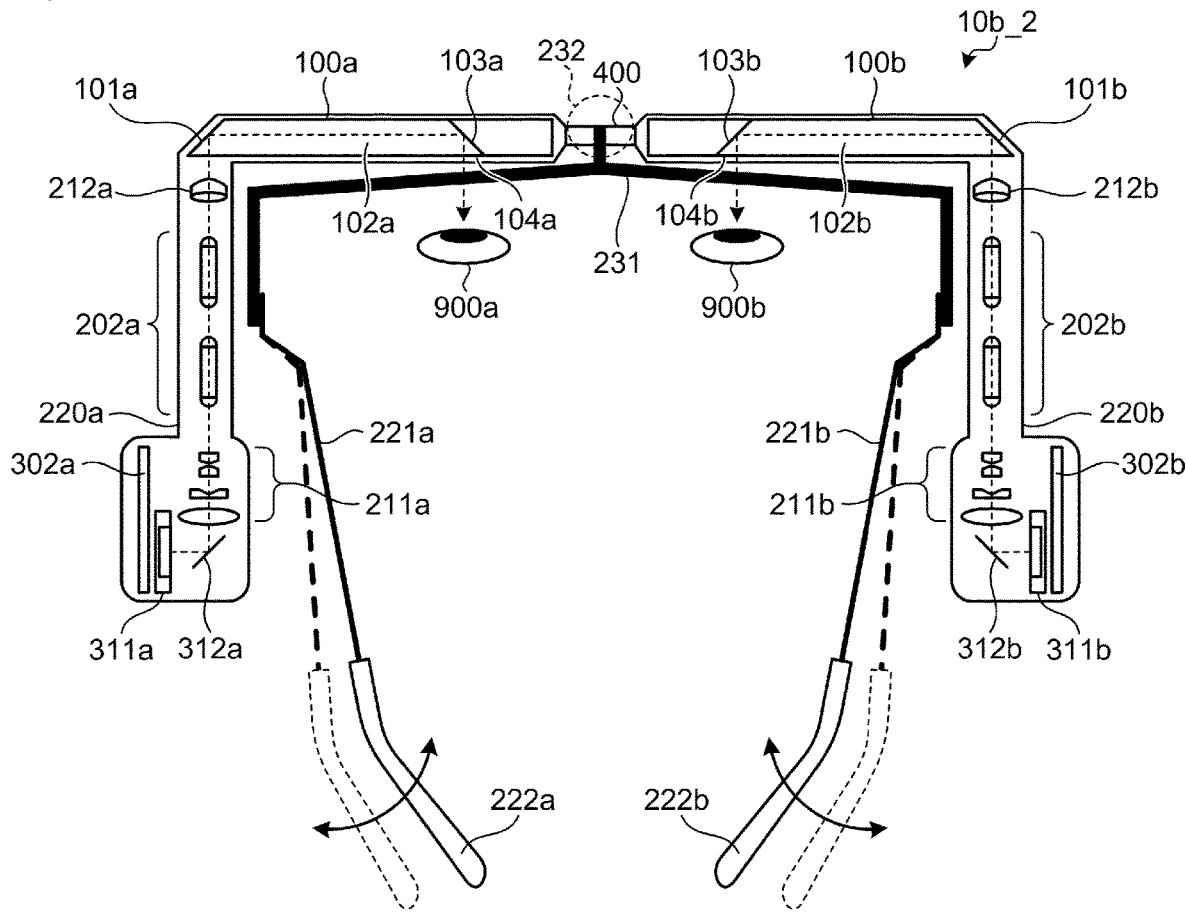
[Fig. 45B]
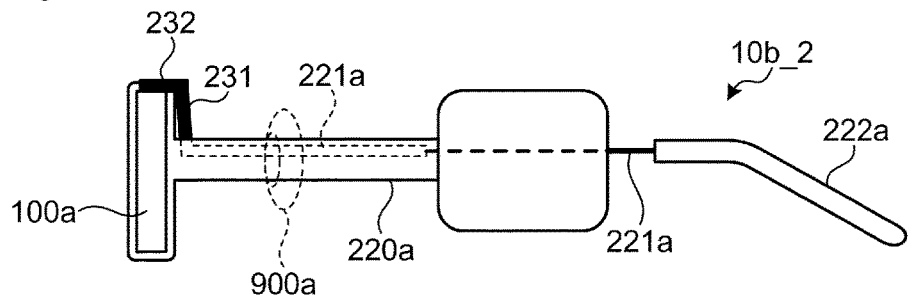
[Fig. 45C]
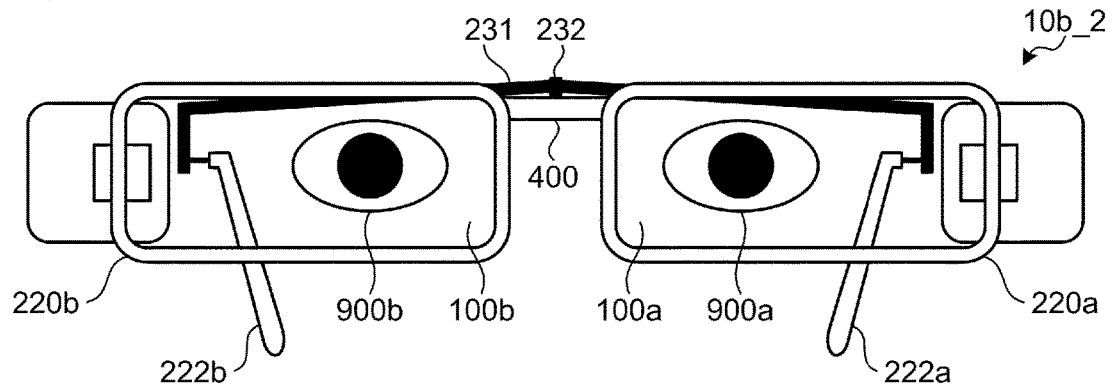

[Fig. 46A]
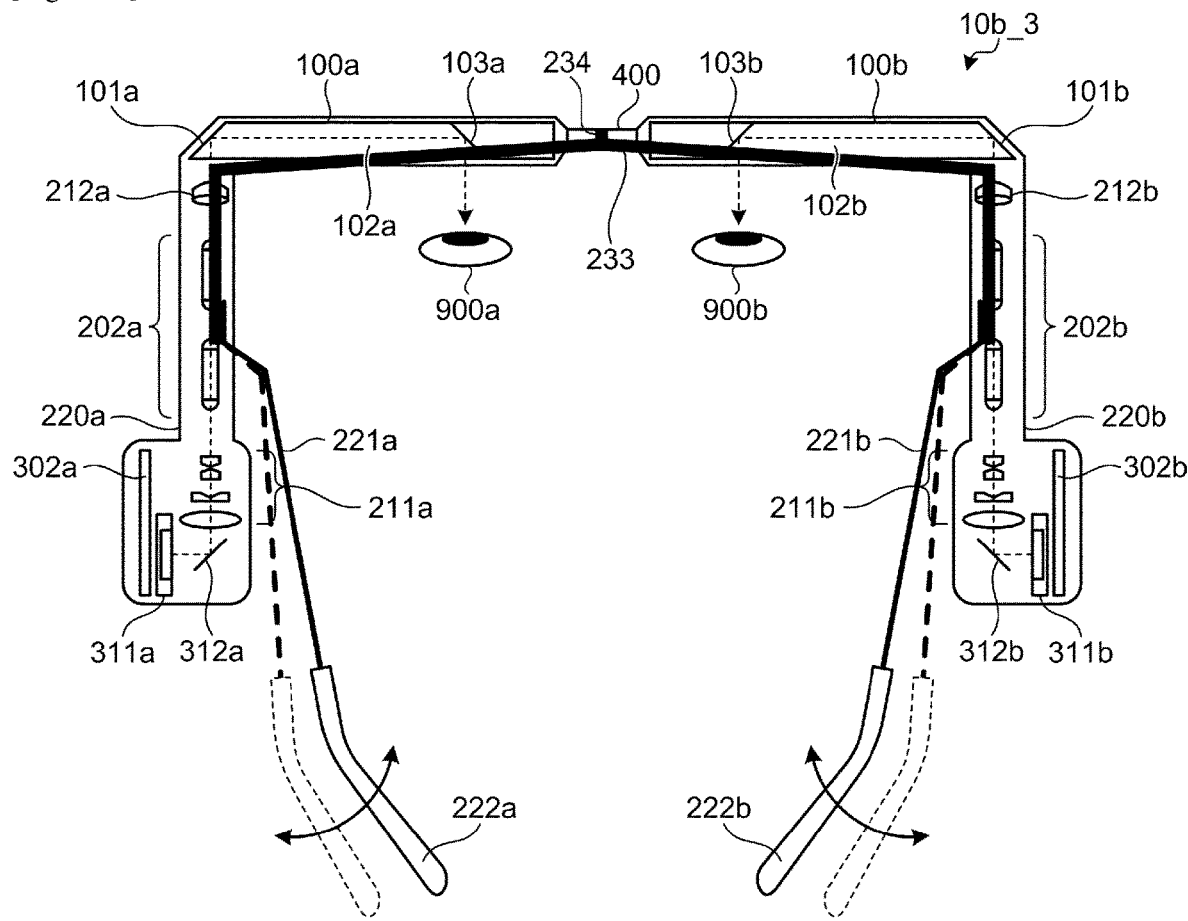
[Fig. 46B]
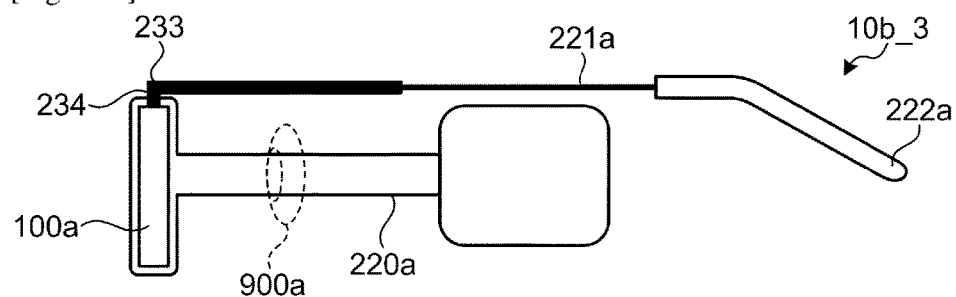
[Fig. 46C]
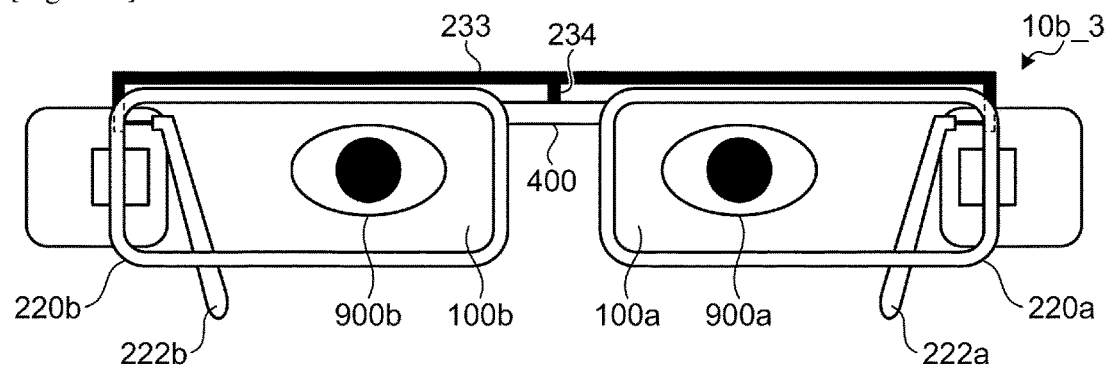

[Fig. 47A]
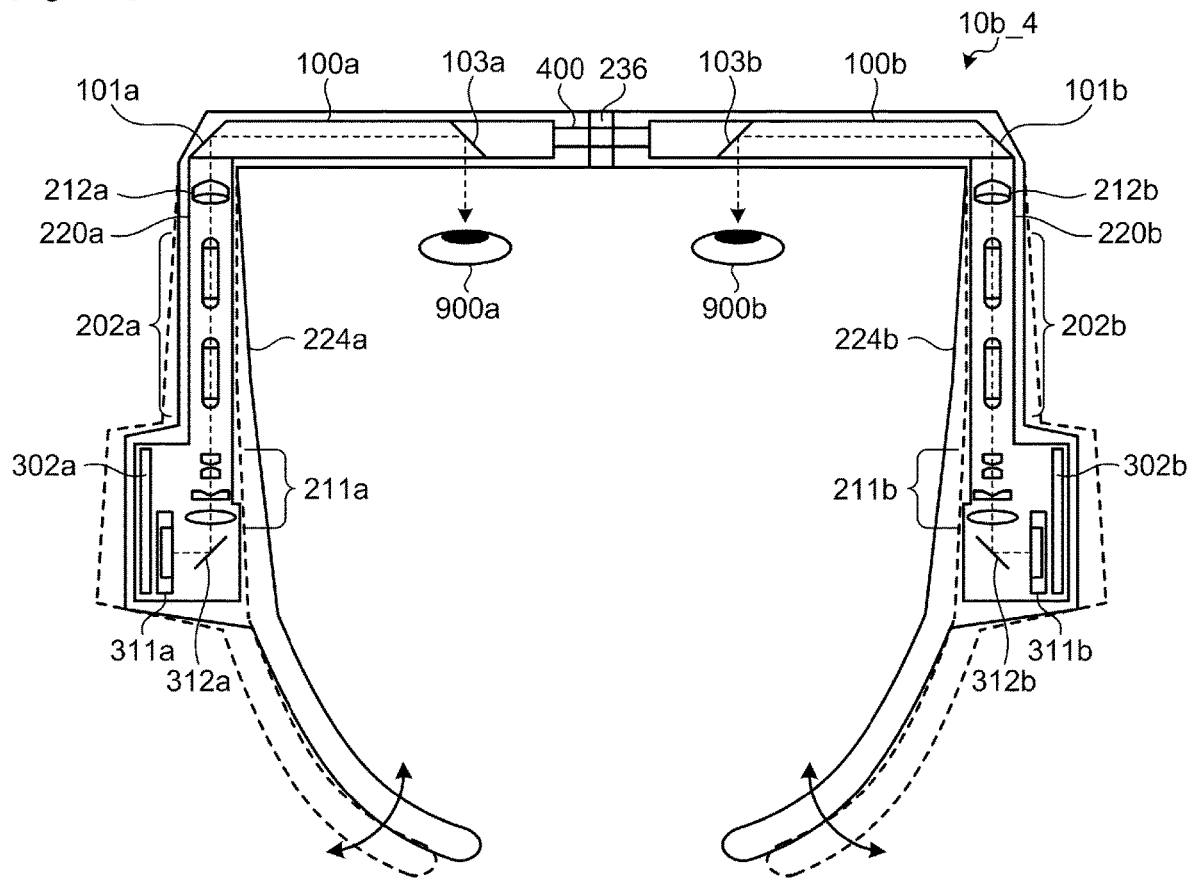
[Fig. 47B]
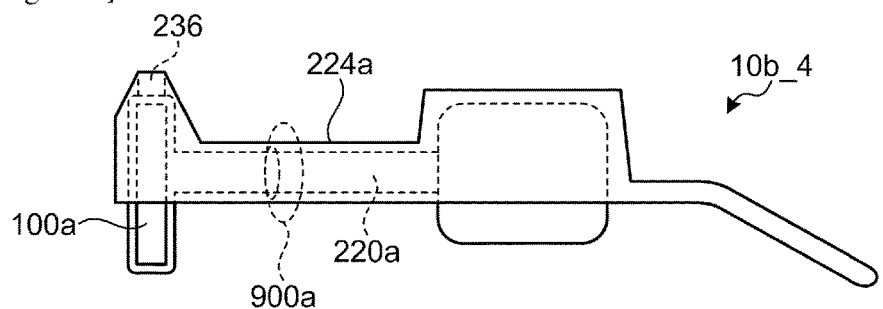
[Fig. 47C]
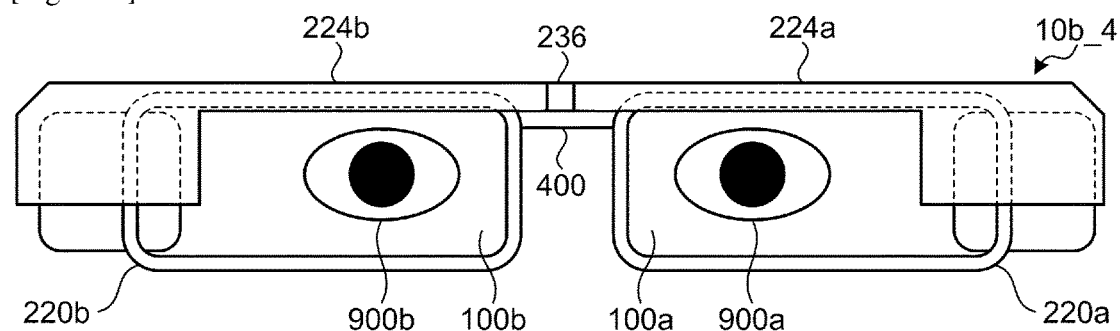

[Fig. 48]
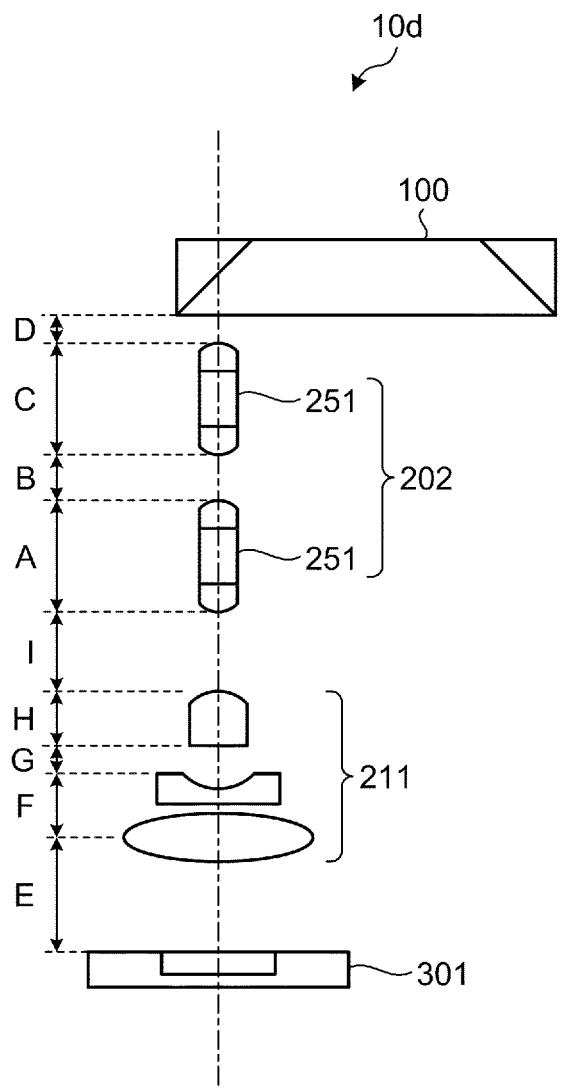

[Fig. 49]
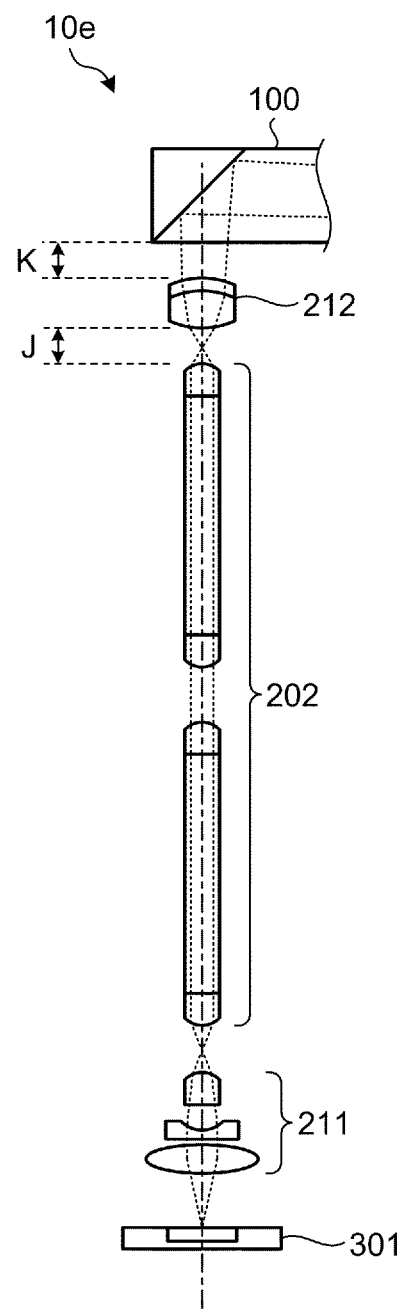

HEAD-MOUNTED DISPLAY DEVICE CONTAINING RELAY OPTICAL SYSTEM BETWEEN IMAGE DISPLAY UNIT AND LIGHT GUIDE MEMBER AND DISPLAY SYSTEM

TECHNICAL FIELD

The present invention relates to a head-mounted display device and a display system.

BACKGROUND ART

In recent years, a number of glasses-type head-mounted display devices (referred to as a head-mounted display (HMD), virtual reality (VR) goggles, VR glasses, smart glasses, augmented reality (AR) glasses, a glasses-type display, a glasses device, or the like depending on a shape) have been developed. By displaying a virtual video on a display in front of eyes or displaying a virtual video in the background of the real world in an overlaid manner, it is possible to provide an experience that is totally different from those provided by conventional desktop displays, smartphones, and tablet terminals.

The head-mounted display device is divided into three major types as described below. The first type is one in which a display is arranged in front of eyes and is viewed directly or via a lens. This type is used in a binocular non-transparent head-mounted display that realizes VR display, a small monocular head-mounted display, and the like.

The second type is one in which image light emitted from an image display element is viewed by being projected and then reflected by a semi-transparent element, such as a mirror or a half mirror, that is arranged in front of eyes. In this type, it is possible to arrange the image display element and the semi-transparent element, such as a mirror or a half mirror, separately from each other, so that it is possible to arrange the image display element posterior to the surface of eyeballs and thus it is possible to reduce the weight of a part that is located anterior to the surface of eyeballs and reduce a load on a nose.

The third type is one in which image light emitted from an image display element is viewed through a light guide member. This type is used in, for example, a binocular transparent head-mounted display that realizes AR display, and the like. In this type, image light emitted from the image display element is guided to the light guide member by a collimator lens or a mirror and caused to enter eyes through the light guide member. In this manner, by causing the image light to pass through the light guide member, it is possible to display an image with a viewing angle of 20 degrees or larger, and, it may be possible to display a large image with a viewing angle of about 60 degrees depending on a structure of the light guide member.

Among the head-mounted display devices as described above, a binocular non-transparent head-mounted display has been disclosed as the first type as described above, in which two left and right image display devices, driving circuits, and optical systems are arranged in front of eyes to realize large screen display with a viewing angle of 90 degrees or larger (see Patent Literature 1). Further, as the second type as described above, a display device in which image light is projected from the sides of a face to semi-transparent elements, such as mirrors or half mirrors, that are arranged in front of eyes has been disclosed (see Patent Literature 2). Furthermore, as the third type as described above, a virtual image display device that has a structure in which image display devices, collimator lenses, mirrors, and light guide members are integrated, and the center of gravity of the structure is located anterior to the surface of eyeballs has been disclosed (see Patent Literature 3).

SUMMARY OF INVENTION

Technical Problem

However, in the technology described in Patent Literature 1, the two left and right image display devices, the driving circuits, and the optical systems are arranged in front of eyes and a total weight reaches 500 grams (g) or larger in many cases; therefore, it may be difficult to wear such a heavy and large device for a long time. Further, in the technology described in Patent Literature 2, it is difficult to display a large screen because image light is projected from the sides of a face to the semi-transparent elements, such as mirrors or half mirrors, arranged in front of eyes; therefore, it is only possible to display a screen with a small viewing angle. Furthermore, in the technology described in Patent Literature 3, the structure in which the image display devices, the collimator lenses, the mirrors, and the light guide members are integrated is adopted and the center of gravity of the structure is located anterior to the surface of eyeballs; therefore, load application to a nose is large and this may cause inflammation or pain on the skin around nose pads when the device is worn for a long time. Moreover, the structure blocks left and right peripheral visual fields of a wearer. Therefore, while a general person has a visual field of 180 degrees or larger, the visual field may be reduced to 100 degrees or smaller when the person wears the device, so that when the person moves or performs operation with the reduced visual field, safety at the time of wearing the device is reduced.

The present invention has been conceived in view of the foregoing situations, and an object is to provide a head-mounted display device and a display system capable of improving the size of a screen displayed in front of eyes, reducing load application to a nose at the time of wearing the device, and ensuring left and right peripheral visual fields of a wearer.

Solution to Problem

According to one aspect of the present invention, a head-mounted display device includes an image display unit, a light guide member, and a relay optical system. The image display unit is configured to emit image light. The light guide member is configured to guide the image light and emit the image light to eyes of a wearer who wears the head-mounted display device. The relay optical system is arranged between the image display unit and the light guide member, and configured to relay the image light from the image display unit to the light guide member, and form an intermediate image at least once before the image light enters the light guide member.

Advantageous Effects of Invention

According to the present invention, it is possible to improve the size of a screen displayed in front of eyes, reduce load application to a nose at the time of wearing the device, and secure left and right peripheral visual fields of a wearer.

BRIEF DESCRIPTION OF DRAWINGS

FIG. 1 is a diagram illustrating an example of an overall configuration of a display device according to a first embodiment.

FIG. 2 is a diagram illustrating an example of a hardware configuration of a display unit of the first embodiment.

FIG. 3 is a diagram illustrating a positional relationship between an eye and a relay-optical-system-side end surface of the display unit in the first embodiment.

FIG. 4 is a diagram illustrating a positional relationship between the display unit of the first embodiment and a temporal bone.

FIG. 5 is a diagram illustrating an example of a configuration of a display device according to a first modification of the first embodiment.

FIG. 6 is a diagram illustrating a positional relationship between an eye and a relay-optical-system-side end surface of a display unit according to the first modification of the first embodiment.

FIG. 7 is a diagram illustrating an example of a configuration of a display device according to a second modification of the first embodiment.

FIG. 8 is a diagram illustrating a positional relationship between an eye and a relay-optical-system-side end surface of a display unit according to the second modification of the first embodiment.

FIG. 9 is a diagram illustrating an example of a configuration of a display device according to a third modification of the first embodiment.

FIG. 10 is a diagram illustrating a positional relationship between an eye and a relay-optical-system-side end surface of a display unit according to the third modification of the first embodiment.

FIG. 11 is a diagram illustrating an example of a configuration of a display device according to a second embodiment.

FIG. 12 is a diagram illustrating an example of a configuration of a display device according to a third embodiment.

FIG. 13 is a diagram illustrating an example of an overall configuration of a display device according to a fourth embodiment and a positional relationship between a display unit and an occipital bone.

FIG. 14 is a diagram illustrating an example of a configuration of a display device according to a fifth embodiment.

FIG. 15 is a diagram illustrating an example of a configuration of a display device according to a first modification of the fifth embodiment.

FIG. 16 is a diagram illustrating an example of a configuration of a display device according to a second modification of the fifth embodiment.

FIG. 17 is a diagram illustrating an example of a configuration of a main part of a display device according to a sixth embodiment.

FIG. 18 is a diagram illustrating an example of a configuration of a main part of a display device according to a first modification of the sixth embodiment.

FIG. 19 is a diagram illustrating an example of a configuration of a main part of a display device according to a second modification of the sixth embodiment.

FIG. 20 is a diagram illustrating an example of a configuration of a main part of a display device according to a third modification of the sixth embodiment.

FIG. 21 is a diagram illustrating an example of a configuration of a main part of a display device according to a fourth modification of the sixth embodiment.

FIG. 22 is a diagram illustrating an example of a configuration of a main part of a display device according to a fifth modification of the sixth embodiment.

FIG. 23 is a diagram illustrating an example of a configuration of a main part of a display device according to a sixth modification of the sixth embodiment.

FIG. 24 is a diagram illustrating an example of a configuration of a main part of a display device according to a seventh embodiment.

FIG. 25 is a diagram illustrating an example of a configuration of a main part of a display device according to a first modification of the seventh embodiment.

FIG. 26 is a diagram illustrating an example of a configuration of a main part of a display device according to a second modification of the seventh embodiment.

FIG. 27 is a diagram illustrating an example of a configuration of a main part of a display device according to a third modification of the seventh embodiment.

FIG. 28 is a diagram illustrating an example of a configuration of a main part of a display device according to a fourth modification of the seventh embodiment.

FIG. 29 is a diagram illustrating an example of a configuration of a main part of a display device according to a fifth modification of the seventh embodiment.

FIG. 30 is a diagram illustrating an example of a configuration of a main part of a display device according to a sixth modification of the seventh embodiment.

FIG. 31A is a diagram illustrating an example of a configuration of a display device according to an eighth embodiment.

FIG. 31B is a diagram illustrating the example of the configuration of the display device according to the eighth embodiment.

FIG. 32 is a diagram illustrating an example of a configuration of a display system according to a ninth embodiment.

FIG. 33 is a diagram illustrating an example of a hardware configuration of a main part of a display unit according to the ninth embodiment.

FIG. 34 is a diagram illustrating an example of a hardware configuration of a main part of a display unit according to a first modification of the ninth embodiment.

FIG. 35 is a diagram illustrating an example of a hardware configuration of a main part of a display unit according to a second modification of the ninth embodiment.

FIG. 36 is a diagram illustrating an example of a hardware configuration of a display system according to a tenth embodiment.

FIG. 37 is a diagram illustrating an example of a hardware configuration of a display system according to a modification of the tenth embodiment.

FIG. 38 is a diagram illustrating an example of a configuration of a display system according to an eleventh embodiment.

FIG. 39 is a diagram illustrating an example of a hardware configuration of a display unit of the eleventh embodiment.

FIG. 40 is a diagram illustrating an example of a configuration of a display device according to a twelfth embodiment.

FIG. 41 is a diagram illustrating an example of a configuration of a display device according to a thirteenth embodiment.

FIG. 42 is a diagram illustrating an example of a configuration of a display device according to a fourteenth embodiment.

FIG. 43 is a diagram illustrating an example of a configuration of a display device according to a fifteenth embodiment.

FIG. 44A is a diagram illustrating an example of a configuration of a display device according to a sixteenth embodiment.

FIG. 44B is a diagram illustrating the example of the configuration of the display device according to the sixteenth embodiment.

FIG. 44C is a diagram illustrating the example of the configuration of the display device according to the sixteenth embodiment.

FIG. 45A is a diagram illustrating an example of a configuration of a display device according to a first modification of the sixteenth embodiment.

FIG. 45B is a diagram illustrating the example of the configuration of the display device according to the first modification of the sixteenth embodiment.

FIG. 45C is a diagram illustrating the example of the configuration of the display device according to the first modification of the sixteenth embodiment.

FIG. 46A is a diagram illustrating an example of a configuration of a display device according to a second modification of the sixteenth embodiment.

FIG. 46B is a diagram illustrating the example of the configuration of the display device according to the second modification of the sixteenth embodiment.

FIG. 46C is a diagram illustrating the example of the configuration of the display device according to the second modification of the sixteenth embodiment.

FIG. 47A is a diagram illustrating an example of a configuration of a display device according to a third modification of the sixteenth embodiment.

FIG. 47B is a diagram illustrating the example of the configuration of the display device according to the third modification of the sixteenth embodiment.

FIG. 47C is a diagram illustrating the example of the configuration of the display device according to the third modification of the sixteenth embodiment.

FIG. 48 is a diagram for explaining intervals between units of a display device in a fifth example.

FIG. 49 is a diagram for explaining intervals between units of a display device in a sixth example.

DESCRIPTION OF EMBODIMENTS

Exemplary embodiments of a head-mounted display device and a display system according to the present invention will be described in detail below with reference to FIG. 1 to FIG. 49. The present invention is not limited by the embodiments below, and constituent elements in the embodiments below include one that can be easily thought of by a person skilled in the art, one that is practically identical, and one that is within an equivalent range. Furthermore, within the scope not departing from the gist of the following embodiments, various omission, replacement, and modifications of the components may be made.

First Embodiment

Overall Configuration of Display Device

FIG. 1 is a diagram illustrating an example of an overall configuration of a display device according to a first embodiment. An overall configuration of a display device 10 according to the first embodiment will be described below with reference to FIG. 1. The display device 10 illustrated in FIG. 1 has a shape that is similar to normal glasses, but is not limited to this shape.

The display device 10 according to the first embodiment is a head-mounted display device that causes image light projected by an image display element to enter eyes of a wearer via a relay optical system that relays the image light to a light guide member and via the light guide member. The wearer is able to view an image when the image light that is emitted from the light guide member enters his/her eyes.

Here, the "relay optical system" indicates an optical system element group that relays image light projected (emitted) by the image display element to the light guide member that is separated from the image display element, and generates one or more intermediate images on an optical path between the image display element and the light guide member. Therefore, the relay optical system is different from, for example, a collimator that causes image light to enter the light guide member simply as parallel light. Further, the intermediate image indicates an image that is generated by forming an image with the light projected (emitted) by the image display element on the optical path toward the light guide member, and indicates the same image as an image that is projected by the image display element. However, the image generated as the intermediate image may have a different size from the image projected by the image display element. Further, the concepts of the relay optical system and the intermediate image are the same in other embodiments to be described later.

As illustrated in FIG. 1, the display device 10 includes light guide members 100a and 100b, housing frames 200a and 200b, display units 300a and 300b, a bridge 400, and temples 500a and 500b.

The light guide members 100a and 100b are light guides that guide image light, which is emitted from image display elements 301a and 301b (image display unit) of the display units 300a and 300b to be described later and relayed by relay optical systems 201a and 201b in the housing frames 200a and 200b, and output the image light to eyes 900a and 900b of a person. The light guide member 100a is a light guide for the eye 900a that is the left eye of a wearer, and includes a reflection part 101a, a light guide part 102a, an extraction part 103a, and an emission part 104a. The light guide member 100b is a light guide for the eye 900b that is the right eye of the wearer, and includes a reflection part 101b, a light guide part 102b, an extraction part 103b, and an emission part 104b.

In the following, when an arbitrary one or both of each pair of the light guide members 100a and 100b, the reflection parts 101a and 101b, the light guide parts 102a and 102b, the extraction parts 103a and 103b, and the emission parts 104a and 104b will be singly or collectively referred to, the one or both of them will be simply referred to as a "light guide member 100", a "reflection part 101", a "light guide part 102", an "extraction part 103", and an "emission part 104", and the same applies to the other embodiments to be described later. Further, when an arbitrary one or both of each pair of the housing frames 200a and 200b, the relay optical systems 201a and 201b, the display units 300a and 300b, the image display elements 301a and 301b, and the eyes 900a and 900b will be singly or collectively referred to, the one or both of them will be simply referred to as a "housing frame 200", a "relay optical system 201", a "display unit 300", an "image display element 301", and an "eye 900", and the same applies to the other embodiments to be described later.

Furthermore, the light guide member 100 may be any of the following types: a type using a half mirror, a type using a hologram element, a type using a geometric structure, such as multi-stage reflection, and the like.

The reflection part 101 is a part that reflects light beams of image light, which has been emitted from the relay optical system 201 of the housing frame 200, to the light guide part 102. The light guide part 102 is a part that totally reflects and guides the image light that has been reflected by the reflection part 101. The extraction part 103 is a part that reflects the image light that has been guided by the light guide part 102, in order to extract the image light to the outside of the light guide member 100. The emission part 104 is a part that emits the image light, which has been reflected by the extraction part 103 so as to be extracted to the outside of the light guide member 100, to the outside of the light guide member 100 and causes the image light to enter the eye 900. Meanwhile, the reflection part 101 need not be always configured inside the light guide member 100, but may be configured using a mirror member that is different from the light guide member 100.

The housing frames 200a and 200b are members that correspond to temples of normal glasses, and are members that house the relay optical systems 201a and 201b for relaying image light that is emitted from the image display elements 301a and 301b of the display units 300a and 300b. A conventional head-mounted display device (head-mounted display) is configured such that an image display element is arranged in front of eyes of a wearer or integrated with a light guide member, whereas the display device 10 according to the first embodiment is configured such that the relay optical systems 201a and 201b arranged inside the housing frames 200a and 200b are interposed between the display units 300a and 300b having the built-in image display elements 301a and 301b and the light guide members 100a and 100b, so that the display units 300a and 300b and the light guide members 100a and 100b are placed separately from each other.

When an arbitrary one or both of each pair of the housing frames 200a and 200b and the relay optical systems 201a and 201b will be singly or collectively referred to, the one or both of them will be simply referred to as the "housing frame 200" and the "relay optical system 201", and the same applies to the other embodiments to be described later.

The relay optical system 201 is a relay lens group that includes, for example, a set of four convex lenses. The relay optical system 201 receives image light emitted from the image display element 301 of the display unit 300, forms an intermediate image with the image light at least once on the optical path, and emits the image light to the light guide member 100 almost without degrading an image of the image light. The image light emitted from the relay optical system 201 is substantially parallel light or substantially telecentric light. For example, an intermediate image is generated between the first stage including the two convex lenses among the set of four convex lenses included in the relay optical system 201 and the second stage including the other two convex lenses. In this case, the convex lenses included in the relay optical system 201 are able to relay the image light even when the diameters of the lenses are about 2 millimeters (mm) for example, and the housing frame 200 can be configured as a frame having the same thickness or weight as normal glasses.

Furthermore, one advantage of constructing the relay optical system 201 with a group of lenses is that it has a cost advantage. While a plurality of lenses are combined, each of the lenses is not a special lens, so that if the lenses are mass produced using a mold, it is possible to reduce a unit price. Further, as another advantage of constructing the relay optical system 201 with a group of lenses is that it is possible to relatively flexibly design the diameter of the lenses. As the diameter of the lenses is increased, it is possible to take a larger amount of image light from the image display element 301 and improve light use efficiency. However, if the diameter of the lenses is excessively increased, the thickness of the housing frame 200 increases and an actual visual field of a wearer may be blocked. Therefore, it is preferable to set the diameter of the lenses to be equal to or larger than 2 mm from the viewpoint of ensuring the light use efficiency and it is preferable to set the diameter to be equal to or smaller than 8 mm to secure the actual visual field of the wearer. By using the lens group as described above as the relay optical system 201, it is possible to easily design the diameter between 2 mm and 8 mm.

The display units 300a and 300b are devices that emit image light toward the relay optical systems 201a and 201b of the housing frames 200a and 200b. The display unit 300a includes the image display element 301a and a control substrate 302a in a housing. The display unit 300b includes the image display element 301b and a control substrate 302b in a housing.

When an arbitrary one or both of the control substrates 302a and 302b will be singly or collectively referred to, the one or both of them will be simply referred to as a "control substrate 302", and the same applies to the other embodiments to be described later.

The image display element 301 is a micro display that emits image light that is to be a basis of an image (virtual image) that is displayed through the light guide member 100. The image display element 301 is a part that accounts for most of the weight of the display device 10 as compared to the other parts. For example, a micro display having 1280× 720 pixels and a screen size of 0.5 inch or smaller has about a 15-mm square size including a peripheral circuit. Further, if the micro display and a control substrate are packaged as a housing of a display unit, one side of the housing becomes 20 mm or larger and the weight becomes 20 grams (g) or larger.

Meanwhile, the image display element 301 as a micro display may be any of, for example, transmissive liquid crystal, reflective liquid crystal, organic electro-luminescence (EL), and a micro electro mechanical systems (MEMS) device.

The control substrate 302 is a circuit substrate that controls display operation of the image display element 301.

The bridge 400 connects the left and right light guide members 100 (100a, 100b) and rests on the nose of a wearer. Further, although not illustrated in FIG. 1, pads (nose pads) for sandwiching the nose of the wearer from both sides and supporting the display device 10 are attached to the bridge 400.

The temples 500a and 500b are members that rest on the ears of the wearer. The temples 500a and 500b support the display device 10 and prevent the display device 10 from coming off from the ears of the wearer. When an arbitrary one or both of the temples 500a and 500b will be singly or collectively referred to, the one or both of them will be simply referred to as a "temple 500", and the same applies to the other embodiments to be described later.

The display device 10 illustrated in FIG. 1 is a binocular glasses type, but is not limited thereto, and may be a monocular device. In this case, for example, the display device may be used by being attached to a helmet, a hat, or the like, or by being incorporated into goggles or the like.

Hardware Configuration of Display Unit of Display Device

FIG. 2 is a diagram illustrating an example of a hardware configuration of the display unit of the first embodiment. A hardware configuration of the display unit 300 of the display device 10 according to the first embodiment will be described with reference to FIG. 2.

As illustrated in FIG. 2, the display unit 300 of the display device 10 according to the first embodiment includes the image display element 301, a driving integrated circuit (IC) 303, a memory 304, a power circuit 305, and a battery 306. The image display element 301 is the same as described above with reference to FIG. 1.

The driving IC 303 is an IC that reads image signals accumulated in the memory 304 and causes the image display element 301 to perform display in accordance with the image signals.

The memory 304 is a storage device that accumulates image signals (video signals) that are received from outside by a receiving unit (not illustrated in FIG. 2), for example.

The power circuit 305 is a circuit that converts a voltage input from the battery 306 to a voltage corresponding to drive of each device and supplies the converted voltage. As illustrated in FIG. 2, the power circuit 305 supplies power (voltage) to each of the image display element 301, the driving IC 303, and the memory 304.

The battery 306 is a storage battery that supplies a voltage to the power circuit 305.

The control substrate 302 illustrated in FIG. 1 as described above may be configured such that the driving IC 303, the memory 304, and the power circuit 305 illustrated in FIG. 2 are mounted thereon for example, but the embodiments are not limited to this example.

The hardware configuration of the display unit 300 illustrated in FIG. 2 is one example, and the embodiments are not limited to this example. For example, it may be possible to include components other than the components illustrated in FIG. 2.

Position of Display Unit of Display Device

FIG. 3 is a diagram illustrating a positional relationship between an eye and a relay-optical-system-side end surface of the display unit in the first embodiment. FIG. 4 is a diagram illustrating a positional relationship between the display unit of the first embodiment and a temporal bone. The position of the display unit 300 in the case where the display device 10 according to the first embodiment is worn will be described with reference to FIG. 3 and FIG. 4.

The display device 10 according to the first embodiment has a similar shape with normal glasses as illustrated in FIG. 1, and is supported with respect to the wearer by the pads of the bridge 400 that sandwich the nose, the temples 500 that rest on the ears, and the housing frame 200 and the display unit 300 that tighten the temples. Even when a device has the same weight, if a weight balance is taken, load is distributed to the nose, the ears, and the temples, so that fatigue and uncomfortable feeling at the time of wearing the device are relieved; however, in a conventional head-mounted display device, the weight of a front part is extremely large and load is concentrated on the nose, so that the nose may hurt. In the display device 10 according to the first embodiment, the display unit 300 that accounts for most of the weight is arranged on the back side, so that it is possible to distribute load and reduce load application to the nose, and thus it is possible to wear the device for a long time. The position of the display unit 300 of the display device 10 will be described in detail below.

As illustrated in FIG. 3, the display device 10 according to the first embodiment is configured to guide image light that is emitted from the image display element 301 to the light guide member 100 via the relay optical system 201 that relays the image light as described above, instead of guiding the image light emitted from the image display element 301 to the light guide member 100 via only an optical member, such as a collimator. Further, the relay optical system 201 housed in the housing frame 200 has optical characteristics of receiving the image light emitted from the image display element 301, forming an intermediate image with the image light at least once on the optical path, and emitting the image light to the light guide member 100, so that the relay optical system 201 inevitably has a predetermined length, and thus, the light guide member 100 and the display unit 300 are placed separately from each other.

Specifically, as illustrated in FIG. 3, in the state in which the light guide member 100 is worn by the wearer, a plane B, which is an incidence side (a side close to the image display element 301) of the relay optical system 201, i.e., an end surface close to the relay optical system 201, of the housing of the display unit 300 (display unit housing), is located posterior to a plane A, which is in contact with both apexes of corneas 902 that cover pupils 901 of the both eyes 900 of the wearer, from the perspective of the wearer. It is preferable that an interval between the plane A and the plane B at this time is equal to or larger than 5 mm, and more preferably, equal to or larger than 10 mm.

Further, as illustrated in FIG. 4, from the viewpoint of a positional relationship between the display unit 300 and a temporal bone 51 that is a part of a skull bone of the wearer of the display device 10, the light guide member 100 and the display unit 300 are placed separately from each other due to the configuration of the housing frame 200 (the relay optical system 201), so that the display unit 300 is arranged such that a center CP of the image display element 301 overlaps with the temporal bone 51. With this configuration, the side surface of the housing of the display unit 300 in which the image display element 301 is fixed comes in close contact with the temporal area of the head, so that load of the display device 10 is distributed and load application to the nose is reduced. Furthermore, as illustrated in FIG. 4, the center CP of the image display element 301 is arranged posterior to (closer to the temple 500 than) at least the center of an interval between the light guide member 100 and the temple 500.

As described above, in the display device 10 according to the first embodiment as illustrated in FIG. 3 and FIG. 4, the light guide member 100 and the display unit 300 are arranged separately from each other and the plane B is arranged posterior to the plane A, so that the display unit 300 that accounts for most of the weight is arranged on the back side; therefore, it is possible to secure the actual visual field of the wearer (secure a visual field of 180 degrees or more) and reduce the feeling of pressure at the time of wearing the display device 10. In other words, it is possible to reduce load application to the nose at the time of wearing the device and secure left and right peripheral visual fields of the wearer. Further, as the interval between the plane A and the plane B (in other words, the interval between the light guide member 100 and the display unit 300) increases, a larger actual visual field is secured and the effect of reducing the feeling of pressure at the time of wearing the display device 10 is further reduced.

Furthermore, the display device 10 according to the first embodiment is configured to guide the image light emitted from the image display element 301 by the light guide member 100 and cause the image light to enter the eyes of a wearer, so that it is possible to increase the size of screen display in front of eyes.

First Modification

FIG. 5 is a diagram illustrating an example of a configuration of a display device according to a first modification of the first embodiment. FIG. 6 is a diagram illustrating a positional relationship between an eye and a relay-optical-system-side end surface of a display unit in the first modification of the first embodiment. A configuration of a display device 10a according to the first modification of the first embodiment and the position of the display unit 300 at the time of wearing the display device 10a will be described with reference to FIG. 5 and FIG. 6.

The display device 10a according to the first modification includes the housing frame 200 that houses a Hopkins relay lens group 202, instead of the housing frame 200 that houses the relay optical system 201 and that is included in the display device 10 according to the first embodiment.

The housing frame 200 is a part that corresponds to temples of normal glasses, and is a member that houses the Hopkins relay lens group 202 for relaying image light that is emitted from the image display element 301 of the display unit 300. In the display device 10a according to the first modification, the Hopkins relay lens group 202 of the housing frame 200 is interposed between the display unit 300 having the built-in image display element 301 and the light guide member 100, so that the display unit 300 and the light guide member 100 are placed separately from each other.

As illustrated in FIG. 5, the Hopkins relay lens group 202 is a relay lens group including two rod lenses (registered trademark) 251 and functions as a relay optical system that relays image light, for example. The rod lenses 251 are lenses formed in columnar shapes, and lens parts 251a and 251b are provided at both ends of the columnar shapes. The two rod lenses 251 are arranged such that axial directions overlap with an optical axis and the lens parts 251a having the same optical characteristics face each other.

The Hopkins relay lens group 202 receives image light emitted from the image display element 301 of the display unit 300, forms an intermediate image with the image light at least once on the optical path, and emits the image light to the light guide member 100 almost without degrading the image of the image light. For example, the intermediate image is generated between the two rod lenses 251 included in the Hopkins relay lens group 202.

As illustrated in FIG. 6, the display device 10a according to the first modification is configured to guide image light that is emitted from the image display element 301 to the light guide member 100 via the Hopkins relay lens group 202 that relays the image light as described above, instead of guiding the light emitted from the image display element 301 to the light guide member 100 via only an optical member, such as a collimator. Further, the Hopkins relay lens group 202 housed in the housing frame 200 has optical characteristics of receiving the image light emitted from the image display element 301, forming an intermediate image with the image light at least once on the optical path, and emitting the image light to the light guide member 100, so that the Hopkins relay lens group 202 inevitably has a predetermined length, and thus, the light guide member 100 and the display unit 300 are placed separately from each other.

Specifically, as illustrated in FIG. 6, in the state in which the light guide member 100 is worn by the wearer, the plane B, which is an incidence side (a side close to the image display element 301) of the Hopkins relay lens group 202, i.e., an end surface close to the Hopkins relay lens group 202, of the display unit 300, is located posterior to the plane A, which is in contact with both apexes of the corneas 902 that cover the pupils 901 of the both eyes 900 of the wearer, from the perspective of the wearer. It is preferable that an interval between the plane A and the plane B at this time is equal to or larger than 5 mm, and more preferably, equal to or larger than 10 mm.

As described above, in the display device 10a according to the first modification illustrated in FIG. 6, the light guide member 100 and the display unit 300 are arranged separately from each other and the plane B is arranged posterior to the plane A, so that the display unit 300 that accounts for most of the weight is arranged on the back side; therefore, it is possible to secure the actual visual field of the wearer (secure a visual field of 180 degrees or more) and reduce the feeling of pressure at the time of wearing the display device 10a. In other words, it is possible to reduce load application to the nose at the time of wearing the device and secure left and right peripheral visual fields of the wearer. The display device 10a according to the first modification has the same other effects as those of the display device 10 according to the first embodiment.

Second Modification

FIG. 7 is a diagram illustrating an example of a configuration of a display device according to a second modification of the first embodiment. FIG. 8 is a diagram illustrating a positional relationship between an eye and a relay-optical-system-side end surface of a display unit according to the second modification of the first embodiment. A configuration of a display device 10b according to the second modification of the first embodiment and the position of the display unit 300 at the time of wearing the display device 10b will be described with reference to FIG. 7 and FIG. 8.

The display device 10b according to the second modification includes the housing frame 200 that houses a graded-index lens 203, instead of the housing frame 200 that houses the relay optical system 201 and that is included in the display device 10 according to the first embodiment.

The housing frame 200 is a part that corresponds to temples of normal glasses, and is a member that houses the graded-index lens 203 for relaying image light that is emitted from the image display element 301 of the display unit 300. In the display device 10b according to the second modification, the graded-index lens 203 of the housing frame 200 is interposed between the display unit 300 having the built-in image display element 301 and the light guide member 100, so that the display unit 300 and the light guide member 100 are placed separately from each other.

The graded-index lens 203 is a rod-like lens that has a flat incidence surface and a flat emission surface, but is configured to have a light condensing function as a lens by sequentially changing a refractive index in a lens glass and functions as a relay optical system that relays image light. While it takes a long time to manufacture the graded-index lens 203 because a refractive index difference between a central portion and a peripheral portion is created by ion exchange in the glass, the graded-index lens 203 is able to propagate image light with a single rod-like lens as described above when compared to a relay optical system constituted of a combination of a plurality of lenses. With this configuration, it is not necessary to align the lenses, so that impact resistance is improved. Further, in the case of the graded-index lens 203, it is possible to transfer an image with a thin rod-like lens with a diameter of 2 mm or smaller.

The graded-index lens 203 receives image light emitted from the image display element 301 of the display unit 300, forms an intermediate image with the image light at least once on the optical path (inside the graded-index lens 203) and emits the image light to the light guide member 100 almost without degrading the image light.

As illustrated in FIG. 8, the display device 10b according to the second modification is configured to guide image light that is emitted from the image display element 301 to the light guide member 100 via the graded-index lens 203 that relays the image light as described above, instead of guiding the image light emitted from the image display element 301 to the light guide member 100 via only an optical member, such as a collimator. Further, the graded-index lens 203 housed in the housing frame 200 has optical characteristics of receiving the image light emitted from the image display element 301, forming an intermediate image with the image light at least once on the optical path (inside the graded-index lens 203), and emitting the image light to the light guide member 100, so that the graded-index lens 203 inevitably has a predetermined length, and thus, the light guide member 100 and the display unit 300 are placed separately from each other.

Specifically, as illustrated in FIG. 8, in the state in which the light guide member 100 is worn by the wearer, the plane B, which is an incidence side (a side close to the image display element 301) of the graded-index lens 203 on the incidence side, i.e., an end surface close to the graded-index lens 203, of the display unit 300, is located posterior to the plane A, which is in contact with both apexes of the corneas 902 that cover the pupils 901 of the both eyes 900 of the wearer, from the perspective of the wearer. It is preferable that an interval between the plane A and the plane B at this time is equal to or larger than 5 mm, and more preferably, equal to or larger than 10 mm.

As described above, in the display device 10b according to the second modification illustrated in FIG. 8, the light guide member 100 and the display unit 300 are arranged separately from each other and the plane B is arranged posterior to the plane A, so that the display unit 300 that accounts for most of the weight is arranged on the back side; therefore, it is possible to secure the actual visual field of the wearer (secure a visual field of 180 degrees or more) and reduce the feeling of pressure at the time of wearing the display device 10b. In other words, the load application to the nose at the time of wearing the display device 10b can be reduced. In other words, it is possible to reduce load application to the nose at the time of wearing the device and secure left and right peripheral visual fields of the wearer. The display device 10b according to the second modification has the same other effects as those of the display device 10 according to the first embodiment.

Third Modification

FIG. 9 is a diagram illustrating an example of a configuration of a display device according to a third modification of the first embodiment. FIG. 10 is a diagram illustrating a positional relationship between an eye and a relay-optical-system-side end surface of a display unit according to the third modification of the first embodiment. A configuration of a display device 10c according to the third modification of the first embodiment and the position of the display unit 300 at the time of wearing the display device 10c will be described with reference to FIG. 9 and FIG. 10.

The display device 10c according to the third modification includes the housing frame 200 that houses an image guide fiber 204, instead of the housing frame 200 that houses the relay optical system 201 and that is included in the display device 10 according to the first embodiment.

The housing frame 200 is a part that corresponds to temples of normal glasses, and is a member that houses the image guide fiber 204 for relaying image light that is emitted from the image display element 301 of the display unit 300. In the display device 10c according to the third modification, the image guide fiber 204 of the housing frame 200 is interposed between the display unit 300 having the built-in image display element 301 and the light guide member 100, so that the display unit 300 and the light guide member 100 are placed separately from each other.

The image guide fiber 204 is an optical system configured such that optical fibers each being constituted of a core layer and a cladding layer with diameters of a few μm are regularly bundled, and each of the optical fibers transfers image light of one pixel of the image display element 301, so that the image guide fiber 204 functions as a relay optical system that relays image light. There is an image guide fiber including more than one hundred thousand optical fibers, which is mainly used for a medical endoscope. The image guide fiber 204 may be manufactured using glass or plastic, but in particular, it is possible to achieve excellent flexibility using plastic. Further, if the number of internal optical fibers is excessively increased, the image guide fiber 204 becomes thick and heavy, and cost increases; therefore, it is desirable to set the number of optical fibers to be equal to or larger than ten thousand and equal to or smaller than one hundred thousand.

The image guide fiber 204 receives image light emitted from the image display element 301 of the display unit 300, does not form an intermediate image for the entire image with respect to the image light on the optical path, and emits the image light to the light guide member 100 almost without degrading the image light.

As illustrated in FIG. 10, the display device 10c according to the third modification is configured to guide image light that is emitted from the image display element 301 to the light guide member 100 via the image guide fiber 204 that relays the image light as described above, instead of guiding the image light emitted from the image display element 301 to the light guide member 100 via only an optical member, such as a collimator. Further, the image guide fiber 204 housed in the housing frame 200 has optical characteristics of functioning as an image transmission line between separated two points during a period from when the image light emitted by the image display element 301 is received to when the image light is output to the light guide member 100 as described above, so that the image guide fiber 204 inevitably has a predetermined length, and thus, the light guide member 100 and the display unit 300 are placed separately from each other.

Specifically, as illustrated in FIG. 10, in the state in which the light guide member 100 is worn by the wearer, the plane B, which is an incidence side (a side close to the image display element 301) of the image guide fiber 204, i.e., an end surface close to the image guide fiber 204, of the display unit 300, is located posterior to the plane A, which is in contact with both apexes of the corneas 902 that cover the pupils 901 of the both eyes 900 of the wearer, from the perspective of the wearer. It is preferable that an interval between the plane A and the plane B at this time is equal to or larger than 5 mm, and more preferably, equal to or larger than 10 mm.

As described above, in the display device 10c according to the third modification illustrated in FIG. 10, the light guide member 100 and the display unit 300 are arranged separately from each other and the plane B is arranged posterior to the plane A, so that the display unit 300 that accounts for most of the weight is arranged on the back side; therefore, it is possible to secure the actual visual field of the wearer (secure a visual field of 180 degrees or more) and reduce the feeling of pressure at the time of wearing the display device 10c. In other words, it is possible to reduce load application to the nose at the time of wearing the device and secure left and right peripheral visual fields of the wearer. The display device 10c according to the third modification has the same other effects as those of the display device 10 according to the first embodiment.

Second Embodiment

With regard to a display device according to a second embodiment, a difference from the display device 10 according to the first embodiment will be mainly described. In the second embodiment, a configuration in which a condenser lens is arranged between the image display element 301 and a relay optical system of the housing frame 200 will be described.

Configuration of Display Device

FIG. 11 is a diagram illustrating an example of a configuration of the display device according to the second embodiment. A configuration of a display device 10d according to the second embodiment will be described with reference to FIG. 11.

As illustrated in FIG. 11, the display device 10d according to the second embodiment includes the light guide member 100, the housing frame 200, a condenser lens 211 (condensing optical system), the display unit 300, and the temple 500. The display device 10d further includes the bridge 400 similarly to the display device 10 according to the first embodiment, although not illustrated in FIG. 11.

The housing frame 200 is a part that corresponds to temples of normal glasses, and is a member that houses the Hopkins relay lens group 202 for relaying image light that is emitted from the image display element 301 of the display unit 300. In the display device 10d according to the second embodiment, the Hopkins relay lens group 202 of the housing frame 200 is interposed between the display unit 300 having the built-in image display element 301 and the light guide member 100, so that the display unit 300 and the light guide member 100 are placed separately from each other. While FIG. 11 illustrates an example in which the Hopkins relay lens group 202 is housed in the housing frame 200, the embodiments are not limited to this example, and the relay optical system 201, the graded-index lens 203, or the image guide fiber 204 may be housed in the housing frame 200.

The condenser lens 211 is a lens group that is arranged between the image display element 301 and the Hopkins relay lens group 202, condenses image light emitted from the image display element 301, and causes the image light to enter the Hopkins relay lens group 202 as parallel light or telecentric light. For example, the condenser lens 211 may be constituted of a combination of at least two or more lenses among a concave lens, a convex lens, an achromatic lens, and a meniscus lens or may be constituted of a graded-index lens, for example. A material of the condenser lens 211 may be either glass or plastic.

Further, as illustrated in FIG. 11, when the relay optical system housed in the housing frame 200 is the Hopkins relay lens group 202, the condenser lens 211 may be constituted of, for example, a condenser lens group formed of a few lenses, and may be configured to form an intermediate image once before the light enters the Hopkins relay lens group 202 and emit parallel light or telecentric light on the emission side. Furthermore, when the relay optical system housed in the housing frame 200 is the graded-index lens 203, the condenser lens 211 may be configured to form an intermediate image once before the light enters the graded-index lens 203 in combination with another graded-index rod lens for example, and emit parallel light or telecentric light on the emission side. Moreover, when the relay optical system housed in the housing frame 200 is the image guide fiber 204, the condenser lens 211 may be configured to form an intermediate image once before the light enters the image guide fiber 204 in combination with a graded-index rod lens for example, and emit parallel light or telecentric light on the emission side.

Other configurations of the display device 10d are the same as those of the display device 10 according to the first embodiment.

As described above, in the display device 10d according to the second embodiment as illustrated in FIG. 11, the condenser lens 211 is arranged between the Hopkins relay lens group 202 (relay optical system) and the image display element 301, so that it is possible to effectively capture image light, improve light use efficiency, and reduce power consumption. The display device 10d according to the second embodiment has the same other effects as those of the display device 10 according to the first embodiment.

Third Embodiment

With regard to a display device according to a third embodiment, a difference from the display device 10d according to the second embodiment will be mainly described. In the third embodiment, a configuration in which a collimator lens is arranged between the relay optical system and the light guide member 100 will be described.

Configuration of Display Device

FIG. 12 is a diagram illustrating an example of the display device according to the third embodiment. A configuration of a display device 10e according to the third embodiment will be described with reference to FIG. 12.

As illustrated in FIG. 12, the display device 10e according to the third embodiment includes the light guide member 100, the housing frame 200, the condenser lens 211, a collimator lens 212 (collimator optical system), the display unit 300, and the temple 500. The display device 10e further includes the bridge 400 similarly to the display device 10 according to the first embodiment, although not illustrated in FIG. 12.

The housing frame 200 is a part that corresponds to temples of normal glasses, and is a member that houses the Hopkins relay lens group 202 for relaying image light that is emitted from the image display element 301 of the display unit 300. In the display device 10e according to the third embodiment, the Hopkins relay lens group 202 of the housing frame 200 is interposed between the display unit 300 having the built-in image display element 301 and the light guide member 100, so that the display unit 300 and the light guide member 100 are placed separately from each other. While FIG. 12 illustrates an example in which the Hopkins relay lens group 202 is housed in the housing frame 200, the embodiments are not limited to this example, and the relay optical system 201, the graded-index lens 203, or the image guide fiber 204 may be housed in the housing frame 200.

The collimator lens 212 is a lens group that is arranged between the Hopkins relay lens group 202 and the light guide member 100, and causes image light emitted from the Hopkins relay lens group 202 to enter the light guide member 100 as parallel light or telecentric light. While the image light emitted from the Hopkins relay lens group 202 is at least in the state of substantially parallel light or substantially telecentric light, the collimator lens 212 has a function to adjust orientation of the image light that is substantially parallel light or substantially telecentric light and cause the image light to enter the light guide member 100 at an optimal or preferable angle. The collimator lens 212 may be constituted of a single achromatic lens or an optical system (collimator optical system) including a combination of a convex lens, a concave lens, and an achromatic lens, for example. A material of the collimator lens 212 may be either glass or plastic.

Other configurations of the display device 10e are the same as those of the display device 10d according to the second embodiment.

As described above, in the display device 10e according to the third embodiment illustrated in FIG. 12, by arranging the collimator lens 212 between the Hopkins relay lens group 202 (relay optical system) and the light guide member 100, it is possible to transform image light emitted from the relay optical system into parallel light or telecentric light, prevent diffusion inside the light guide member 100, and contribute to improvement of image quality. The display device 10e according to the third embodiment have the same other effects as those of the display device 10d according to the second embodiment.

Fourth Embodiment

With regard to a display device according to a fourth embodiment, a difference from the display device 10 according to the first embodiment will be mainly described. In the fourth embodiment, a configuration in which a bendable image guide fiber is used as the relay optical system and the display unit 300 is arranged close to the occipital of a wearer will be described.

Overall Configuration of Display Device

FIG. 13 is a diagram illustrating an example of an overall configuration of the display device according to the fourth embodiment and a positional relationship between a display unit and an occipital bone. An overall configuration of a display device 10f according to the present embodiment will be described with reference to FIG. 13.

As illustrated in FIG. 13, the display device 10f according to the fourth embodiment includes the light guide members 100a and 100b, the housing frames 200a and 200b, condenser lenses 211a and 211b, collimator lenses 212a and 212b, the display units 300a and 300b, and the bridge 400.

The housing frames 200a and 200b are parts that correspond to temples of normal glasses, and are members that house image guide fibers 204a and 204b for relaying image light that is emitted from the image display elements 301a and 301b of the display units 300a and 300b. Further, as illustrated in FIG. 13, the housing frames 200a and 200b are bent and extended to the display units 300a and 300b that are placed on the occipital area of a wearer, and also serve as temples that rest on the ears of the wearer. In the display device 10f according to the fourth embodiment, the image guide fibers 204a and 204b of the housing frames 200a and 200b are interposed between the display units 300a and 300b having the built-in image display elements 301a and 301b and the light guide members 100a and 100b, and the display units 300a and 300b are arranged on the occipital area of the wearer, so that the display units 300a and 300b and the light guide members 100a and 100b are placed separately from each other.

When an arbitrary one or both of the image guide fibers 204a and 204b will be singly or collectively referred to, the one or both of them will be simply referred to as an "image guide fiber 204", and the same applies to the other embodiments to be described later.

The image guide fiber 204 is bent and extended based on the flexibility to the display unit 300 that is arranged on the occipital area of the wearer, in accordance with the shape of the housing frame 200. The image guide fiber 204 receives image light emitted from the image display element 301 of the display unit 300, does not form an intermediate image for the entire image with respect to the image light on the optical path, and emits the image light to the light guide member 100 almost without degrading the image light.

The condenser lenses 211a and 211b are lens groups that are arranged between the image display elements 301a and 301b and the image guide fibers 204a and 204b, respectively, condense image light emitted from the image display elements 301a and 301b, and cause the image light to enter the image guide fibers 204a and 204b as parallel light or telecentric light. The condenser lenses 211a and 211b may be configured to form intermediate images once before the light enters the image guide fibers 204a and 204b in combination of graded-index rod lenses for example, and emit parallel light or telecentric light on the emission side. When an arbitrary one or both of the condenser lenses 211a and 211b will be singly or collectively referred to, the one or both of them will be simply referred to as a "condenser lens 211", and the same applies to the other embodiments to be described later.

The collimator lenses 212a and 212b are lens groups that are arranged between the image guide fibers 204a and 204b and the light guide members 100a and 100b, respectively, and cause image light that is emitted from the image guide fibers 204a and 204b to enter the light guide members 100a and 100b as parallel light or telecentric light. While the image light emitted from the image guide fibers 204a and 204b is at least in a state of substantially parallel light or substantially telecentric light, the collimator lenses 212a and 212b have functions to adjust orientation of the image light that is substantially parallel light or substantially telecentric light and cause the image light to enter the light guide members 100a and 100b at an optimal or preferable angle. When an arbitrary one or both of the collimator lenses 212a and 212b will be singly or collectively referred to, the one or both of them will be simply referred to as a "collimator lens 212", and the same applies to the other embodiments to be described later.

The display units 300a and 300b are devices that emit image light toward the image guide fibers 204a and 204b of the housing frames 200a and 200b, and have the built-in image display elements 301a and 301b as illustrated in FIG. 13. Further, as illustrated in FIG. 13, the display units 300a and 300b are arranged at the position of the occipital area (in particular, an occipital bone 52) of the wearer, and the housing frames 200a and 200b that house the image guide fibers 204a and 204b are bent and extended to the display units 300a and 300b as described above. In other words, respective centers CPa and CPb of the display units 300a and 300b are located at positions overlapping with the occipital bone 52. With this configuration, the side surfaces of the housings of the display units 300a and 300b in which the image display elements 301a and 301b are fixed come in close contact with the occipital area, so that load of the display device 10f is distributed and load application to the nose is reduced.

Other configurations of the display device 10f are the same as those of the display device 10 according to the first embodiment.

As described above, in the display device 10f according to the fourth embodiment as illustrated in FIG. 13, the light guide member 100 and the display unit 300 are placed separately from each other and the display unit 300 that accounts for most of the weight is arranged on the occipital area of the wearer, so that it is possible to secure the actual visual field of the wearer (secure a visual field of 180 degrees or more) and reduce the feeling of pressure at the time of wearing the display device 10f. In other words, it is possible to reduce load application to the nose at the time of wearing the device and secure left and right peripheral visual fields of the wearer.

As described above with reference to FIG. 13, to arrange the display unit 300 on the occipital area of the wearer, it is necessary to bend the relay optical system, so that it is desirable to use the image guide fiber 204 as the relay optical system. However, as long as a bendable configuration is possible, the relay optical system 201, the Hopkins relay lens group 202, or the graded-index lens 203 as described above may be used instead of the image guide fiber 204.

Furthermore, the display device 10f illustrated in FIG. 13 includes the condenser lens 211 and the collimator lens 212, but the embodiments are not limited to this example, and it may be possible to omit at least one of the condenser lens 211 and the collimator lens 212.

Moreover, while FIG. 13 illustrates the example in which the display unit 300 is arranged on the occipital area, the embodiments are not limited to this example. For example, it may be possible to extend the display unit 300 to the position of the breast of the wearer by using the flexibility of the image guide fiber 204, and put the display unit 300 in a breast pocket. In this manner, by using the image guide fiber 204 as the relay optical system, it is possible to improve the design of the display device 10f including the housing frame 200.

Fifth Embodiment

With regard to a display device according to a fifth embodiment, a difference from the display device 10d according to the third embodiment will be mainly described. In the fifth embodiment, a configuration in which the size of the housing of the display unit 300 is reduced by bending image light using an optical system, such as a mirror, will be described.

Configuration of Display Device

FIG. 14 is a diagram illustrating an example of a configuration of the display device according to the fifth embodiment. A configuration of a display device 10g according to the fifth embodiment will be described with reference to FIG. 14.

As illustrated in FIG. 14, the display device 10g according to the fifth embodiment includes the light guide member 100, the housing frame 200, the condenser lens 211, the collimator lens 212, a display unit 300g, and the temple 500. The display device 10g further includes the bridge 400 similarly to the display device 10 according to the first embodiment, although not illustrated in FIG. 14.

The display unit 300g is a device that emits image light toward the Hopkins relay lens group 202 of the housing frame 200. The display unit 300g includes, inside a housing, an image display element 311 (image display unit), the control substrate 302, and a mirror 312 (one example of the optical member).

The image display element 311 is a micro display that emits image light that is to be a basis of an image (virtual image) that is displayed through the light guide member 100. The image display element 311 is a part that accounts for most of the weight of the display device 10g as compared to the other parts.

The control substrate 302 is a circuit substrate that controls display operation of the image display element 311.

The mirror 312 is an optical member that bends image light emitted from the image display element 311 by 90 degrees and causes the image light to enter the Hopkins relay lens group 202 (directly to the condenser lens 211 illustrated in FIG. 14). The optical system that bends the light emitted from the image display element 311 by 90 degrees is not limited to the mirror 312, but may be, for example, a prism or the like (one example of the optical member).

Other configurations of the display device 10g are the same as those of the display device 10d according to the third embodiment.

As described above, the mirror 312 is arranged between the image display element 311 and the condenser lens 211 to bend the image light by 90 degrees so as to realize arrangement in which the optical axis of the relay optical system (the Hopkins relay lens group 202 in the example in FIG. 14) and the surface of the image display element 311 become parallel to each other. Because the area of the image display element 311 is large, if the emission direction of the image light and the optical axis direction of the relay optical system become parallel to each other, it is necessary to increase the width of the display unit to prevent interference with the head of the wearer. However, as described above, in the display unit 300g of the fifth embodiment, it is possible to realize the arrangement in which the optical axis of the relay optical system (the Hopkins relay lens group 202 in the example in FIG. 14) and the surface of the image display element 311 become parallel to each other, so that it is possible to reduce the size of the housing of the display unit 300g. With this configuration, it is possible to reduce the weight of the entire display device 10g, so that it is possible to reduce load application to the nose at the time of wearing the device.

Further, as illustrated in FIG. 14, by realizing arrangement in which the surface of the image display element 311 and a substrate surface of the control substrate 302 are made parallel to each other, it is possible to further reduce the size of the housing of the display unit 300g. The display device 10g according to the fifth embodiment has the same other effects as those of the display device 10d according to the third embodiment.

Furthermore, while the display device 10g illustrated in FIG. 14 includes the condenser lens 211 and the collimator lens 212, the embodiments are not limited to this example, and it may be possible to omit at least one of the condenser lens 211 and the collimator lens 212.

First Modification

FIG. 15 is a diagram illustrating an example of a display device according to a first modification of the fifth embodiment. A configuration of a display device 10h according to the first modification of the fifth embodiment will be described with reference to FIG. 15.

As illustrated in FIG. 15, the display device 10h according to the first modification includes the light guide member 100, the housing frame 200, the condenser lens 211, the collimator lens 212, a display unit 300h, and the temple 500.

The display device 10h further includes the bridge 400 similarly to the display device 10 according to the first embodiment, although not illustrated in FIG. 15. The housing frame 200 according to the first modification houses the graded-index lens 203, instead of the Hopkins relay lens group 202 that is housed in the housing frame 200 of the display device 10g according to the fifth embodiment.

The display unit 300h is a device that emits image light toward the graded-index lens 203 of the housing frame 200. The display unit 300h includes, in a housing, the image display element 311, the control substrate 302, and the mirror 312. Operation of each of the units of the display unit 300h is the same as that of the fifth embodiment described above.

As described above, even in the display device 10h according to the first modification in which the graded-index lens 203 is used as the relay optical system instead of the Hopkins relay lens group 202, it is possible to achieve the same effects as those of the display device 10g according to the fifth embodiment as described above.

Second Modification

FIG. 16 is a diagram illustrating an example of a display device according to a second modification of the fifth embodiment. A configuration of a display device 10i according to the second modification of the fifth embodiment will be described with reference to FIG. 16.

As illustrated in FIG. 16, the display device 10i according to the second modification includes the light guide member 100, the housing frame 200, the condenser lens 211, the collimator lens 212, a display unit 300i, and the temple 500. The display device 10h further includes the bridge 400 similarly to the display device 10 according to the first embodiment, although not illustrated in FIG. 16. The housing frame 200 according to the second modification houses the image guide fiber 204, instead of the Hopkins relay lens group 202 that is housed in the housing frame 200 of the display device 10g according to the fifth embodiment.

The display unit 300i is a device that emits image light toward the image guide fiber 204 of the housing frame 200. The display unit 300i includes, in a housing, the image display element 311, the control substrate 302, and the mirror 312. Operation of each of the components of the display unit 300i is the same as that of the fifth embodiment described above.

As described above, even in the display device 10i according to the second modification in which the image guide fiber 204 is used as the relay optical system instead of the Hopkins relay lens group 202, it is possible to achieve the same effects as those of the display device 10g according to the fifth embodiment as described above.

Sixth Embodiment

With regard to a display device according to a sixth embodiment, a difference from the display device 10 according to the first embodiment will be mainly described. In the sixth embodiment, an example of a configuration of a relay optical system that is housed in the housing frame 200 and that relays image light that forms an intermediate image will be described.

Configuration of Main Part of Display Device

FIG. 17 is a diagram illustrating an example of a configuration of a main part of a display device according to the sixth embodiment. A configuration of a main part of a display device 10_1 according to the sixth embodiment will be described with reference to FIG. 17. FIG. 17 simply illustrates a configuration of the main part of the display device 10_1, and illustration of the housing frame 200 that houses the relay optical system and the display unit 300 that has the built-in image display element 301 is omitted.

As illustrated in FIG. 17, the display device 10_1 according to the sixth embodiment includes the light guide member 100, convex lenses 252a and 252b that are relay optical systems, a collimator lens 213, and the image display element 301.

The convex lenses 252a and 252b are, as described above, the relay optical systems that are housed in the housing frame 200 (not illustrated) and relay image light emitted from the image display element 301. In the display device 10_1 according to the sixth embodiment, the convex lenses 252a and 252b that are the relay optical systems are interposed between the display unit 300 (not illustrated in FIG. 17) having the built-in image display element 301 and the light guide member 100, so that the display unit 300 and the light guide member 100 are placed separately from each other.

Further, as illustrated in FIG. 17, the convex lenses 252a and 252b receive image light emitted from the image display element 301, and the image light is condensed to form an intermediate image 700 just after being emitted from the convex lens 252b and then enters the collimator lens 213 in the subsequent stage. In this manner, due to the optical characteristics of the relay optical systems for forming the intermediate image 700, it is inevitable that a distance between the display unit 300 and the light guide member 100 needs to be a predetermined length, so that the light guide member 100 and the display unit 300 are placed separately from each other. Furthermore, as described above, because the intermediate image 700 is formed on the optical path of the relay optical system, it is possible to emit image light for an image in a direction toward the light guide member 100 almost without degradation (aberration or the like) of the image.

The collimator lens 213 is a lens group that is arranged between the relay optical system (the convex lenses 252a and 252b) and the light guide member 100, and cause image light emitted from the relay optical system to enter the light guide member 100 as parallel light or telecentric light. Here, the "parallel light" is not limited to only perfect parallel light, but includes light that has a certain degree of parallelism and can be regarded as being parallel, and such light may be referred to as "substantially parallel light". Further, the "telecentric light" is not limited to only perfect telecentric light, but includes light that has a certain degree of telecentricity and can be regarded as being telecentric, and such light may be referred to as "substantially telecentric light". Furthermore, the collimator lens 212 has a function to adjust orientation of the image light that is substantially parallel light or substantially telecentric light and cause the image light to enter the light guide member 100 at an optimal or preferable angle. Moreover, the collimator lens 213 has a function to increase the size of an image without changing an aspect ratio of the intermediate image. With this configuration, the collimator lens 213 is able to cause image light with a large angle of view to enter the light guide member 100, so that it is possible to cause the light guide member 100 to display an image with a wide viewing angle. Meanwhile, the collimator lens 213 may be constituted of a single achromatic lens or an optical system (collimator optical system) including a combination of a convex lens, a concave lens, and an achromatic lens, for example. A material of the collimator lens 213 may be either glass or plastic.

Other configurations of the display device 10_1 are the same as those of the display device 10 according to the first embodiment.

As described above, in the display device 10_1 according to the sixth embodiment as illustrated in FIG. 17, the relay optical system (the convex lenses 252a and 252b) forms the intermediate image 700 on the optical path between the image display element 301 (the display unit 300) and the light guide member 100. With this configuration, due to the optical characteristics of the relay optical system for forming the intermediate image 700, it is inevitable that a distance between the display unit 300 and the light guide member 100 needs to be a predetermined length, so that the display unit 300 having the built-in image display element 301 that accounts for most of the weight is arranged posteriorly as described above in the first embodiment; therefore, it is possible to secure the actual visual field of the wearer and reduce the feeling of pressure (load application to the nose or the like) at the time of wearing the display device 10_1.

Furthermore, by arranging the collimator lens 213 between the relay optical system and the light guide member 100, it is possible to transform image light emitted from the relay optical system into parallel light or telecentric light, prevent diffusion inside the light guide member 100, and contribute to improvement of image quality. The display device 10_1 according to the sixth embodiment has the same other effects as those of the display device 10 according to the first embodiment.

First Modification

FIG. 18 is a diagram illustrating an example of a configuration of a main part of a display device according to a first modification of the sixth embodiment. A configuration of a display device 10_2 according to the first modification of the sixth embodiment will be described with reference to FIG. 18. FIG. 18 simply illustrates a configuration of a main part of the display device 10_2, and illustration of the housing frame 200 that houses the relay optical system and the display unit 300 that has the built-in image display element 301 is omitted.

As illustrated in FIG. 18, the display device 10_2 according to the first modification includes the light guide member 100, convex lenses 253a to 253d that are relay optical systems, the collimator lens 213, and the image display element 301. The display device 10_2 according to the first modification includes the convex lenses 253a to 253d, instead of the convex lenses 252a and 252b that are the relay optical systems included in the display device 10_1 according to the sixth embodiment.

The convex lenses 253a to 253d are, as described above, the relay optical systems that are housed in the housing frame 200 (not illustrated) and relay image light emitted from the image display element 301. In the display device 10_2 according to the first modification, the convex lenses 253a to 253d that are the relay optical systems are interposed between the display unit 300 (not illustrated in FIG. 18) having the built-in image display element 301 and the light guide member 100, so that the display unit 300 and the light guide member 100 are placed separately from each other.

Further, as illustrated in FIG. 18, the convex lenses 253a to 253d receive image light emitted from the image display element 301, and the image light is condensed to form an intermediate image 701a just after being emitted from the convex lens 253b and then enters the convex lens 253c in the subsequent stage. Furthermore, the image light is condensed again to form an intermediate image 701b just after being emitted from the convex lens 253d and then enters the collimator lens 213 in the subsequent stage. In this manner, due to the optical characteristics of the relay optical systems for forming the intermediate images 701a and 701b, it is inevitable that a distance between the display unit 300 and the light guide member 100 needs to be a predetermined length, so that the light guide member 100 and the display unit 300 are placed separately from each other. Moreover, as described above, because the intermediate images 701a and 701b are formed on the optical path of the relay optical systems, it is possible to emit image light for an image in a direction toward the light guide member 100 almost without degradation (aberration or the like) of the image.

As described above, even in the display device 10_2 according to the first modification in which the convex lenses 253a to 253d are used as the relay optical systems instead of the convex lenses 252a and 252b, it is possible to achieve the same effects as those of the display device 10_1 according to the sixth embodiment as described above.

Second Modification

FIG. 19 is a diagram illustrating an example of a configuration of a main part of a display device according to a second modification of the sixth embodiment. A configuration of a display device 10_3 according to the second modification of the sixth embodiment will be described with reference to FIG. 19. FIG. 19 simply illustrates a configuration of a main part of the display device 10_3, and illustration of the housing frame 200 that houses the relay optical system and the display unit 300 that has the built-in image display element 301 is omitted.

As illustrated in FIG. 19, the display device 10_3 according to the second modification includes the light guide member 100, a collimator lens 254 and a condenser lens 255 that are relay optical systems, the collimator lens 213, and the image display element 301. The display device 10_3 according to the second modification includes the collimator lens 254 and the condenser lens 255, instead of the convex lenses 252a and 252b that are the relay optical systems included in the display device 10_1 according to the sixth embodiment.

The collimator lens 254 and the condenser lens 255 are, as described above, the relay optical systems that are housed in the housing frame 200 (not illustrated) and relay image light emitted from the image display element 301. The collimator lens 254 emits image light, which is emitted from the image display element 301, as parallel light or telecentric light. The condenser lens 255 condenses image light, which is emitted as parallel light or telecentric light by the collimator lens 254, and forms an image with the image light, so that an intermediate image 702 is formed.

In this manner, in the display device 10_3 according to the second modification, the collimator lens 254 and the condenser lens 255 that are the relay optical systems are interposed between the display unit 300 (not illustrated in FIG. 19) having the built-in image display element 301 and the light guide member 100, so that the display unit 300 and the light guide member 100 are placed separately from each other.

Further, as illustrated in FIG. 19, the collimator lens 254 among the relay optical systems receives image light emitted from the image display element 301, and the image light is condensed to form the intermediate image 702 just after being emitted from the condenser lens 255 and thereafter enters the collimator lens 213. In this manner, due to the optical characteristics of the relay optical systems for forming the intermediate image 702, it is inevitable that a distance between the display unit 300 and the light guide member 100 needs to be a predetermined length, so that the light guide member 100 and the display unit 300 are placed separately from each other. Furthermore, as described above, because the intermediate image 702 is formed on the optical path of the relay optical systems, it is possible to emit image light for an image in a direction toward the light guide member 100 almost without degradation (aberration or the like) of the image.

As described above, even in the display device 10_3 according to the second modification in which the collimator lens 254 and the condenser lens 255 are used as the relay optical systems instead of the convex lenses 252*a* and 252*b*, it is possible to achieve the same effects as those of the display device 10_1 according to the sixth embodiment as described above.

Third Modification

FIG. 20 is a diagram illustrating an example of a configuration of a main part of a display device according to a third modification of the sixth embodiment. A configuration of a display device 10_4 according to the third modification of the sixth embodiment will be described with reference to FIG. 20. FIG. 20 simply illustrates a configuration of a main part of the display device 10_4, and illustration of the housing frame 200 that houses the relay optical system and the display unit 300 that has the built-in image display element 301 is omitted.

As illustrated in FIG. 20, the display device 10_4 according to the third modification includes the light guide member 100, a triplet achromatic lens 256 and a condenser lens 257 that are relay optical systems, the collimator lens 213, and the image display element 301. The display device 10_4 according to the third modification includes the triplet achromatic lens 256 and the condenser lens 257, instead of the convex lenses 252*a* and 252*b* that are the relay optical systems included in the display device 10_1 according to the sixth embodiment.

The triplet achromatic lens 256 and the condenser lens 257 are, as described above, the relay optical systems that are housed in the housing frame 200 (not illustrated) and relay image light emitted from the image display element 301. The triplet achromatic lens 256 emits image light, which is emitted from the image display element 301, as parallel light or telecentric light. The condenser lens 257 condenses image light, which is emitted as parallel light or telecentric light by the triplet achromatic lens 256, and forms an image with the image light, so that an intermediate image 703 is formed.

In this manner, in the display device 10_4 according to the third modification, the triplet achromatic lens 256 and the condenser lens 257 that are the relay optical systems are interposed between the display unit 300 (not illustrated in FIG. 20) having the built-in image display element 301 and the light guide member 100, so that the display unit 300 and the light guide member 100 are placed separately from each other.

Further, as illustrated in FIG. 20, the triplet achromatic lens 256 among the relay optical systems receives image light emitted from the image display element 301, and the image light is condensed to form the intermediate image 703 just after being emitted from the condenser lens 257 and thereafter enters the collimator lens 213. In this manner, due to the optical characteristics of the relay optical systems for forming the intermediate image 703, it is inevitable that a distance between the display unit 300 and the light guide member 100 needs to be a predetermined length, so that the light guide member 100 and the display unit 300 are placed separately from each other. Furthermore, as described above, because the intermediate image 703 is formed on the optical path of the relay optical systems, it is possible to emit image light for an image in a direction toward the light guide member 100 almost without degradation (aberration or the like) of the image.

As described above, even in the display device 10_4 according to the third modification in which the triplet achromatic lens 256 and the condenser lens 257 are used as the relay optical systems instead of the convex lenses 252*a* and 252*b*, it is possible to achieve the same effects as those of the display device 10_1 according to the sixth embodiment as described above.

Fourth Modification

FIG. 21 is a diagram illustrating an example of a configuration of a main part of a display device according to a fourth modification of the sixth embodiment. A configuration of a display device 10_5 according to the fourth modification of the sixth embodiment will be described with reference to FIG. 21. FIG. 21 simply illustrates a configuration of a main part of the display device 10_5, and illustration of the housing frame 200 that houses the relay optical system and the display unit 300 that has the built-in image display element 301 is omitted.

As illustrated in FIG. 21, the display device 10_5 according to the fourth modification includes the light guide member 100, a graded-index lens 258 that is a relay optical system, the collimator lens 213, and the image display element 301. The display device 10_5 according to the fourth modification includes the graded-index lens 258, instead of the convex lenses 252*a* and 252*b* that are the relay optical systems included in the display device 10_1 according to the sixth embodiment.

The graded-index lens 258 is, as described above, the relay optical system that is housed in the housing frame 200 (not illustrated) and relays image light emitted from the image display element 301. The graded-index lens 258 is a rod-like lens that has a flat incidence surface and a flat emission surface, but is configured to have a light condensing function as a lens by sequentially changing a refractive index in a lens glass. The graded-index lens 258 receives image light emitted from the image display element 301 and forms an image with the emission light using the bending effect as described above, so that an intermediate image 704 is formed.

In this manner, in the display device 10_5 according to the fourth modification, the graded-index lens 258 that is the relay optical system is interposed between the display unit 300 (not illustrated in FIG. 21) having the built-in image display element 301 and the light guide member 100, so that the display unit 300 and the light guide member 100 are placed separately from each other.

Further, as illustrated in FIG. 21, the graded-index lens 258 that is the relay optical system receives image light emitted from the image display element 301, and the image light is condensed to form the intermediate image 704 just after being emitted from the graded-index lens 258 and thereafter enters the collimator lens 213. In this manner, due to the optical characteristics of the relay optical system for forming the intermediate image 704, it is inevitable that a distance between the display unit 300 and the light guide member 100 needs to be a predetermined length, so that the light guide member 100 and the display unit 300 are placed separately from each other. Furthermore, as described above, because the intermediate image 704 is formed on the optical path of the relay optical system, it is possible to emit image light for an image in a direction toward the light guide member 100 almost without degradation (aberration or the like) of the image.

As described above, even in the display device 10_5 according to the fourth modification in which the graded-index lens 258 is used as the relay optical system instead of the convex lenses 252a and 252b, it is possible to achieve the same effects as those of the display device 10_1 according to the sixth embodiment as described above.

Fifth Modification

FIG. 22 is a diagram illustrating an example of a configuration of a main part of a display device according to a fifth modification of the sixth embodiment. A configuration of a display device 10_6 according to the fifth modification of the sixth embodiment will be described with reference to FIG. 22. FIG. 22 simply illustrates a configuration of a main part of the display device 10_6, and illustration of the housing frame 200 that houses the relay optical system and the display unit 300 that has the built-in image display element 301 is omitted.

As illustrated in FIG. 22, the display device 10_6 according to the fifth modification includes the light guide member 100, and an objective lens 259 an image guide fiber 260, a condenser lens 261 that are relay optical systems, and further includes the collimator lens 213 and the image display element 301. The display device 10_6 according to the fifth modification includes the objective lens 259, the image guide fiber 260, and the condenser lens 261, instead of the convex lenses 252a and 252b that are the relay optical systems included in the display device 10_1 according to the sixth embodiment.

The objective lens 259, the image guide fiber 260, and the condenser lens 261 are, as described above, the relay optical systems that are housed in the housing frame 200 (not illustrated) and relay image light emitted from the image display element 301. The objective lens 259 collects image light emitted from the image display element 301 and causes the image light to enter the image guide fiber 260. The image guide fiber 260 is an optical system configured such that optical fibers each being constituted of a core layer and a cladding layer with diameters of a few μm are regularly bundled, and each of the optical fibers transfers image light of one pixel of the image display element 301. The condenser lens 261 condenses image light emitted from the image guide fiber 260 and forms an image with the image light, so that an intermediate image 705 is formed.

In this manner, in the display device 10_6 according to the fifth modification, the objective lens 259, the image guide fiber 260, and the condenser lens 261 that are the relay optical systems are interposed between the display unit 300 (not illustrated in FIG. 22) having the built-in image display element 301 and the light guide member 100, so that the display unit 300 and the light guide member 100 are placed separately from each other.

Further, as illustrated in FIG. 22, the objective lens 259 among the relay optical systems receives image light emitted from the image display element 301, and, the image light is relayed by the image guide fiber 260, is condensed to form the intermediate image 705 just after being emitted from the condenser lens 261, and thereafter enters the collimator lens 213. In this manner, due to the optical characteristics of the relay optical systems for forming the intermediate image 705, it is inevitable that a distance between the display unit 300 and the light guide member 100 needs to be a predetermined length, so that the light guide member 100 and the display unit 300 are placed separately from each other. Furthermore, as described above, because the intermediate image 705 is formed on the optical path of the relay optical systems, it is possible to emit image light for an image in a direction toward the light guide member 100 almost without degradation (aberration or the like) of the image.

As described above, even in the display device 10_6 according to the fifth modification in which the objective lens 259, the image guide fiber 260, and the condenser lens 261 are used as the relay optical systems instead of the convex lenses 252a and 252b, it is possible to achieve the same effects as those of the display device 10_1 according to the sixth embodiment as described above.

Sixth Modification

FIG. 23 is a diagram illustrating an example of a configuration of a main part of a display device according to a sixth modification of the sixth embodiment. A configuration of a display device 10_7 according to the sixth modification of the sixth embodiment will be described with reference to FIG. 23. FIG. 23 simply illustrates a configuration of a main part of the display device 10_7, and illustration of the housing frame 200 that houses the relay optical system and the display unit 300 that has the built-in image display element 301 is omitted.

As illustrated in FIG. 23, the display device 10_7 according to the sixth modification includes the light guide member 100, rod lenses 262a and 262b that are relay optical systems, the collimator lens 213, and the image display element 301. The display device 10_7 according to the sixth modification includes the rod lenses 262a and 262b, instead of the convex lenses 252a and 252b that are the relay optical systems included in the display device 10_1 according to the sixth embodiment.

The rod lenses 262a and 262b are, as described above, the relay optical systems that are housed in the housing frame 200 (not illustrated) and relay image light emitted from the image display element 301. The rod lenses 262a and 262b are lenses formed in columnar shapes, arranged such that axial directions overlap with an optical axis, and have the same optical characteristics.

In this manner, in the display device 10_7 according to the sixth modification, the rod lenses 262a and 262b that are the relay optical systems are interposed between the display unit 300 (not illustrated in FIG. 23) having the built-in image display element 301 and the light guide member 100, so that the display unit 300 and the light guide member 100 are placed separately from each other.

Further, as illustrated in FIG. 23, the rod lenses 262a and 262b that are the relay optical systems receive image light emitted from the image display element 301, and the image light is condensed to form an intermediate image 706 just after being emitted from the rod lens 262b and thereafter enters the collimator lens 213. In this manner, due to the optical characteristics of the relay optical systems for forming the intermediate image 706, it is inevitable that a distance between the display unit 300 and the light guide member 100 needs to be a predetermined length, so that the light guide member 100 and the display unit 300 are placed separately from each other. Furthermore, as described above, because the intermediate image 706 is formed on the optical path of the relay optical systems, it is possible to emit image light for an image in a direction toward the light guide member 100 almost without degradation (aberration or the like) of the image.

As described above, even in the display device 10_7 according to the sixth modification in which the rod lenses 262a and 262b are used as the relay optical systems instead of the convex lenses 252a and 252b, it is possible to achieve the same effects as those of the display device 10_1 according to the sixth embodiment as described above.

Seventh Embodiment

With regard to a display device according to a seventh embodiment, a difference from the display device 10_1 according to the sixth embodiment will be mainly described. In the seventh embodiment, an example of a configuration in which image light condensed by a relay optical system is caused to enter a light guide member using a concave mirror will be described.

Configuration of Main Part of Display Device

FIG. 24 is a diagram illustrating an example of a configuration of a main part of the display device according to the seventh embodiment. A configuration of a main part of a display device 10a_1 according to the seventh embodiment will be described with reference to FIG. 24. FIG. 24 simply illustrates the configuration of the main part of the display device 10a_1, and illustration of the housing frame 200 that houses the relay optical system and the display unit 300 that has the built-in image display element 301 is omitted.

As illustrated in FIG. 24, the display device 10a_1 according to the seventh embodiment includes a light guide member 100_1, a housing frame 200_1, and the image display element 301.

The light guide member 100_1 is a light guide that guides image light, which is emitted from the image display element 301 and relayed by relay optical systems (the convex lenses 252a and 252b to be described later) inside the housing frame 200_1, and outputs the image light to eyes of a person. As illustrated in FIG. 24, the light guide member 100_1 does not include the reflection part 101 among the components of the light guide member 100 described in the first embodiment.

The housing frame 200_1 is a member that houses the convex lenses 252a and 252b, which are relay optical systems for relaying image light emitted from the image display element 301, and a concave mirror 214. As illustrated in FIG. 24, a bonding portion of a wall surface of the housing frame 200_1 bonded to the light guide member 100_1 is opened, and image light reflected by the concave mirror 214 enters from a side surface of the light guide member 100_1.

The convex lenses 252a and 252b are, as described above, the relay optical systems that are housed in the housing frame 200_1 and relay image light emitted from the image display element 301. In the display device 10a_1 according to the seventh embodiment, the convex lenses 252a and 252b that are the relay optical systems are interposed between the display unit 300 (not illustrated in FIG. 24) having the built-in image display element 301 and the light guide member 100_1, so that the display unit 300 and the light guide member 100_1 are placed separately from each other.

Further, as illustrated in FIG. 24, the convex lenses 252a and 252b receive image light emitted from the image display element 301, and the image light is condensed to form the intermediate image 700 just after being emitted from the convex lens 252b and then enters the concave mirror 214 in the subsequent stage. In this manner, due to the optical characteristics of the relay optical systems for forming the intermediate image 700, it is inevitable that a distance between the display unit 300 and the light guide member 100 needs to be a predetermined length, so that the light guide member 100_1 and the display unit 300 are placed separately from each other. Furthermore, as described above, because the intermediate image 700 is formed on the optical path of the relay optical systems, it is possible to emit image light for an image in a direction toward the light guide member 100_1 almost without degradation (aberration or the like) of the image.

The concave mirror 214 is an optical member that causes image light emitted from the relay optical systems to enter, as parallel light or telecentric light, from the side surface of the light guide member 100_1. Further, the concave mirror 214 has a function to adjust orientation of the image light that is substantially parallel light or substantially telecentric light and cause the image light to enter the light guide member 100_1 at an optimal or preferable angle. Furthermore, the concave mirror 214 has a function to increase the size of an image without changing an aspect ratio of the intermediate image. With this configuration, the concave mirror 214 is able to cause image light with a large angle of view to enter the light guide member 100_1, so that it is possible to cause the light guide member 100_1 to display an image with a wide viewing angle. Meanwhile, the optical member that causes light to enter the light guide member 100_1 is not limited to the concave mirror 214, and any optical member may be used as long as an optical member is able to cause image light emitted from an intermediate optical system to enter the light guide member 100_1 as parallel light or telecentric light.

Other configurations of the display device 10a_1 are the same as those of the display device 10_1 according to the sixth embodiment.

As described above, in the display device 10a_1 according to the seventh embodiment illustrated in FIG. 24, the relay optical systems (the convex lenses 252a and 252b) form the intermediate image 700 on the optical path between the image display element 301 (the display unit 300) and the light guide member 100_1. With this configuration, due to the optical characteristics of the relay optical systems for forming the intermediate image 700, it is inevitable that a distance between the display unit 300 and the light guide member 100_1 needs to be a predetermined length, so that the display unit 300 having the built-in image display element 301 that accounts for the most of the weight is arranged posteriorly as described in the first embodiment, and it is possible to secure the actual visual field of the wearer and reduce the feeling of pressure (load application to the nose or the like) at the time of wearing the display device 10a_1.

Furthermore, by causing image light emitted from the relay optical systems to enter the concave mirror 214, it is possible to transform the image light emitted from the relay optical system into parallel light or telecentric light, prevent diffusion inside the light guide member 100_1, and contribute to improvement of image quality. The display device 10a_1 according to the seventh embodiment has the same other effects as those of the display device 10_1 according to the sixth embodiment.

First Modification

FIG. 25 is a diagram illustrating an example of a configuration of a main part of a display device according to a first modification of the seventh embodiment. A configuration of a display device 10a_2 according to the first modification of the seventh embodiment will be described with reference to FIG. 25. FIG. 25 simply illustrates a configuration of a main part of the display device 10a_2, and illustration of the housing frame 200_1 that houses the relay optical system and the display unit 300 that has the built-in image display element 301 is omitted.

As illustrated in FIG. 25, the display device 10a_2 according to the first modification includes the light guide member 100_1, the convex lenses 253a to 253d that are relay optical systems, the concave mirror 214, and the image display element 301. The display device 10a_2 according to the first modification includes the convex lenses 253a to 253d, instead of the convex lenses 252a and 252b that are the relay optical systems included in the display device 10a_1 according to the seventh embodiment.

The convex lenses 253a to 253d are, as described above, the relay optical systems that are housed in the housing frame 200_1 (not illustrated) and relay image light emitted from the image display element 301. In the display device 10a_2 according to the first modification, the convex lenses 253a to 253d that are the relay optical systems are interposed between the display unit 300 (not illustrated in FIG. 25) having the built-in image display element 301 and the light guide member 100_1, so that the display unit 300 and the light guide member 100_1 are placed separately from each other.

Further, as illustrated in FIG. 25, the convex lenses 253a to 253d receive image light emitted from the image display element 301, and the image light is condensed to form the intermediate image 701a just after being emitted from the convex lens 253b and thereafter enters the convex lens 253c. Furthermore, the image light is condensed again to form an intermediate image 701b just after being emitted from the convex lens 253d and then enters the concave mirror 214 in the subsequent stage. In this manner, due to the optical characteristics of the relay optical systems for forming the intermediate images 701a and 701b, it is inevitable that a distance between the display unit 300 and the light guide member 100_1 needs to be a predetermined length, so that the light guide member 100_1 and the display unit 300 are placed separately from each other. Moreover, as described above, because the intermediate images 701a and 701b are formed on the optical path of the relay optical system, it is possible to emit image light for an image in a direction toward the light guide member 100_1 almost without degradation (aberration or the like) of the image.

As described above, even in the display device 10a_2 according to the first modification in which the convex lenses 253a to 253d are used as the relay optical systems instead of the convex lenses 252a and 252b, it is possible to achieve the same effects as those of the display device 10a_1 according to the seventh embodiment as described above.

Second Modification

FIG. 26 is a diagram illustrating an example of a configuration of a main part of a display device according to a second modification of the seventh embodiment. A configuration of a display device 10a_3 according to the second modification of the seventh embodiment will be described with reference to FIG. 26. FIG. 26 simply illustrates a configuration of a main part of the display device 10a_3, and illustration of the housing frame 200_1 that houses the relay optical system and the display unit 300 that has the built-in image display element 301 is omitted.

As illustrated in FIG. 26, the display device 10a_3 according to the second modification includes the light guide member 100_1, the collimator lens 254 and the condenser lens 255 that are relay optical systems, the concave mirror 214, and the image display element 301. The display device 10a_3 according to the second modification includes the collimator lens 254 and the condenser lens 255, instead of the convex lenses 252a and 252b that are the relay optical systems included in the display device 10a_1 according to the seventh embodiment.

The collimator lens 254 and the condenser lens 255 are, as described above, the relay optical systems that are housed in the housing frame 200_1 (not illustrated) and relay image light emitted from the image display element 301. The collimator lens 254 emits image light, which is emitted from the image display element 301, as parallel light or telecentric light. The condenser lens 255 condenses image light, which is emitted as parallel light or telecentric light by the collimator lens 254, and forms an image with the image light, so that the intermediate image 702 is formed.

In this manner, in the display device 10a3 according to the second modification, the collimator lens 254 and the condenser lens 255 that are the relay optical systems are interposed between the display unit 300 (not illustrated in FIG. 26) having the built-in image display element 301 and the light guide member 100_1, so that the display unit 300 and the light guide member 100_1 are placed separately from each other.

Further, as illustrated in FIG. 26, the collimator lens 254 among the relay optical systems receives image light emitted from the image display element 301, and the image light is condensed to form the intermediate image 702 just after being emitted from the condenser lens 255 and thereafter enters the concave mirror 214. In this manner, due to the optical characteristics of the relay optical systems for forming the intermediate image 702, it is inevitable that a distance between the display unit 300 and the light guide member 100_1 needs to be a predetermined length, so that the light guide member 100_1 and the display unit 300 are placed separately from each other. Furthermore, as described above, because the intermediate image 702 is formed on the optical path of the relay optical systems, it is possible to emit image light for an image in a direction toward the light guide member 100_1 almost without degradation (aberration or the like) of the image.

As described above, even in the display device 10a_3 according to the second modification in which the collimator lens 254 and the condenser lens 255 are used as the relay optical systems instead of the convex lenses 252a and 252b, it is possible to achieve the same effects as those of the display device 10a_1 according to the seventh embodiment as described above.

Third Modification

FIG. 27 is a diagram illustrating an example of a configuration of a main part of a display device according to a third modification of the seventh embodiment. A configuration of a display device 10a_4 according to the third modification of the seventh embodiment will be described with reference to FIG. 27. FIG. 27 simply illustrates a configuration of a main part of the display device 10a_4, and illustration of the housing frame 200_1 that houses the relay optical system and the display unit 300 that has the built-in image display element 301 is omitted.

As illustrated in FIG. 27, the display device 10a_4 according to the third modification includes the light guide member 100_1, the triplet achromatic lens 256 and the condenser lens 257 that are relay optical systems, the concave mirror 214, and the image display element 301. The display device 10a_4 according to the third modification includes the triplet achromatic lens 256 and the condenser lens 257, instead of the convex lenses 252a and 252b that are the relay optical systems included in the display device 10a_1 according to the seventh embodiment.

The triplet achromatic lens 256 and the condenser lens 257 are, as described above, the relay optical systems that are housed in the housing frame 200_1 (not illustrated) and relay image light emitted from the image display element

301. The triplet achromatic lens 256 emits image light, which is emitted from the image display element 301, as parallel light or telecentric light. The condenser lens 257 condenses image light, which is emitted as parallel light or telecentric light by the triplet achromatic lens 256, and forms an image with the image light, so that the intermediate image 703 is formed.

In this manner, in the display device 10a_4 according to the third modification, the triplet achromatic lens 256 and the condenser lens 257 that are the relay optical systems are interposed between the display unit 300 (not illustrated in FIG. 27) having the built-in image display element 301 and the light guide member 100_1, so that the display unit 300 and the light guide member 100_1 are placed separately from each other.

Further, as illustrated in FIG. 27, the triplet achromatic lens 256 among the relay optical systems receives image light emitted from the image display element 301, and the image light is condensed to form the intermediate image 703 just after being emitted from the condenser lens 257 and thereafter enters the concave mirror 214. In this manner, due to the optical characteristics of the relay optical systems for forming the intermediate image 703, it is inevitable that a distance between the display unit 300 and the light guide member 100_1 needs to be a predetermined length, so that the light guide member 100_1 and the display unit 300 are placed separately from each other. Furthermore, as described above, because the intermediate image 703 is formed on the optical path of the relay optical system, it is possible to emit image light for an image in a direction toward the light guide member 100_1 almost without degradation (aberration or the like) of the image.

As described above, even in the display device 10a_4 according to the third modification in which the triplet achromatic lens 256 and the condenser lens 257 are used as the relay optical systems instead of the convex lenses 252a and 252b, it is possible to achieve the same effects as those of the display device 10a_1 according to the seventh embodiment as described above.

Fourth Modification

FIG. 28 is a diagram illustrating an example of a configuration of a main part of a display device according to a fourth modification of the seventh embodiment. A configuration of a display device 10a_5 according to the fourth modification of the seventh embodiment will be described with reference to FIG. 28. FIG. 28 simply illustrates a configuration of a main part of the display device 10a_5, and illustration of the housing frame 200_1 that houses the relay optical system and the display unit 300 that has the built-in image display element 301 is omitted.

As illustrated in FIG. 28, the display device 10a_5 according to the fourth modification includes the light guide member 100_1, the graded-index lens 258 that is a relay optical system, the concave mirror 214, and the image display element 301. The display device 10a_5 according to the fourth modification includes the graded-index lens 258, instead of the convex lenses 252a and 252b that are the relay optical systems included in the display device 10a_1 according to the seventh embodiment.

The graded-index lens 258 is, as described above, the relay optical system that is housed in the housing frame 200_1 (not illustrated) and relays image light emitted from the image display element 301. The graded-index lens 258 is a rod-like lens that has a flat incidence surface and a flat emission surface, but is configured to have a light condensing function as a lens by sequentially changing a refractive index in a lens glass. The graded-index lens 258 receives image light emitted from the image display element 301 and forms an image with the emission light using the bending effect as described above, so that the intermediate image 704 is formed.

In this manner, in the display device 10a_5 according to the fourth modification, the graded-index lens 258 that is the relay optical system is interposed between the display unit 300 (not illustrated in FIG. 28) having the built-in image display element 301 and the light guide member 100_1, so that the display unit 300 and the light guide member 100_1 are placed separately from each other.

Further, as illustrated in FIG. 28, the graded-index lens 258 that is the relay optical system receives image light emitted from the image display element 301, and the image light is condensed to form the intermediate image 704 just after being emitted from the graded-index lens 258 and thereafter enters the concave mirror 214. In this manner, due to the optical characteristics of the relay optical system for forming the intermediate image 704, it is inevitable that a distance between the display unit 300 and the light guide member 100_1 needs to be a predetermined length, so that the light guide member 100_1 and the display unit 300 are placed separately from each other. Furthermore, as described above, because the intermediate image 704 is formed on the optical path of the relay optical system, it is possible to emit image light for an image in a direction toward the light guide member 100_1 almost without degradation (aberration or the like) of the image.

As described above, even in the display device 10a_5 according to the fourth modification in which the graded-index lens 258 is used as the relay optical system instead of the convex lenses 252a and 252b, it is possible to achieve the same effects as those of the display device 10a_1 according to the seventh embodiment as described above.

Fifth Modification

FIG. 29 is a diagram illustrating an example of a configuration of a main part of a display device according to a fifth modification of the seventh embodiment. A configuration of a display device 10a_6 according to the fifth modification of the seventh embodiment will be described with reference to FIG. 29. FIG. 29 simply illustrates a configuration of a main part of the display device 10a_6, and illustration of the housing frame 200_1 that houses the relay optical system and the display unit 300 that has the built-in image display element 301 is omitted.

As illustrated in FIG. 29, the display device 10a_6 according to the fifth modification includes the light guide member 100_1, and the objective lens 259, the image guide fiber 260, and the condenser lens 261 that are relay optical systems, and further includes the concave mirror 214 and the image display element 301. The display device 10a_6 according to the fifth modification includes the objective lens 259, the image guide fiber 260, and the condenser lens 261, instead of the convex lenses 252a and 252b that are the relay optical systems included in the display device 10a_1 according to the seventh embodiment.

The objective lens 259, the image guide fiber 260, and the condenser lens 261 are, as described above, the relay optical systems that are housed in the housing frame 200_1 (not illustrated) and relay image light emitted from the image display element 301. The objective lens 259 collects image light emitted from the image display element 301 and causes the image light to enter the image guide fiber 260. The image guide fiber 260 is an optical system configured such that optical fibers each being constituted of a core layer and a cladding layer with diameters of a few μm are regularly bundled, and each of the optical fibers transfers image light of one pixel of the image display element 301. The condenser lens 261 condenses image light emitted from the image guide fiber 260 and forms an image with the image light, so that the intermediate image 705 is formed.

In this manner, in the display device 10a_6 according to the fifth modification, the objective lens 259, the image guide fiber 260, and the condenser lens 261 that are the relay optical systems are interposed between the display unit 300 (not illustrated in FIG. 29) having the built-in image display element 301 and the light guide member 100_1, so that the display unit 300 and the light guide member 100_1 are placed separately from each other.

Further, as illustrated in FIG. 29, the objective lens 259 among the relay optical systems receives image light emitted from the image display element 301, and, the image light is relayed by the image guide fiber 260, is condensed to form the intermediate image 705 just after being emitted from the condenser lens 261, and thereafter enters the concave mirror 214. In this manner, due to the optical characteristics of the relay optical systems for forming the intermediate image 705, it is inevitable that a distance between the display unit 300 and the light guide member 100_1 needs to be a predetermined length, so that the light guide member 100_1 and the display unit 300 are placed separately from each other. Furthermore, as described above, because the intermediate image 705 is formed on the optical path of the relay optical system, it is possible to emit image light for an image in a direction toward the light guide member 100_1 almost without degradation (aberration or the like) of the image.

As described above, even in the display device 10a_6 according to the fifth modification in which the objective lens 259, the image guide fiber 260, and the condenser lens 261 are used as the relay optical systems instead of the convex lenses 252a and 252b, it is possible to achieve the same effects as those of the display device 10a_1 according to the seventh embodiment.

Sixth Modification

FIG. 30 is a diagram illustrating an example of a configuration of a main part of a display device according to a sixth modification of the seventh embodiment. A configuration of a display device 10a_7 according to the sixth modification of the seventh embodiment will be described with reference to FIG. 30. FIG. 30 simply illustrates a configuration of a main part of the display device 10a_7, and illustration of the housing frame 200_1 that houses the relay optical system and the display unit 300 that has the built-in image display element 301 is omitted.

As illustrated in FIG. 30, the display device 10a_7 according to the sixth modification includes the light guide member 100_1, the rod lenses 262a and 262b that are relay optical systems, the concave mirror 214, and the image display element 301. The display device 10a_7 according to the sixth modification includes the rod lenses 262a and 262b, instead of the convex lenses 252a and 252b that are the relay optical systems included in the display device 10a_1 according to the seventh embodiment.

The rod lenses 262a and 262b are, as described above, the relay optical systems that are housed in the housing frame 200_1 (not illustrated) and relay image light emitted from the image display element 301. The rod lenses 262a and 262b are lenses formed in columnar shapes, arranged such that axial directions overlap with an optical axis, and have the same optical characteristics.

In this manner, in the display device 10a_7 according to the sixth modification, the rod lenses 262a and 262b that are the relay optical systems are interposed between the display unit 300 (not illustrated in FIG. 30) having the built-in image display element 301 and the light guide member 100_1, so that the display unit 300 and the light guide member 100_1 are placed separately from each other.

Further, as illustrated in FIG. 30, the rod lenses 262a and 262b that are the relay optical systems receive image light emitted from the image display element 301, and the image light is condensed to form an intermediate image 706 just after being emitted from the rod lens 262b and thereafter enters the concave mirror 214. In this manner, due to the optical characteristics of the relay optical systems for forming the intermediate image 706, it is inevitable that a distance between the display unit 300 and the light guide member 100_1 needs to be a predetermined length, so that the light guide member 100_1 and the display unit 300 are placed separately from each other. Furthermore, as described above, because the intermediate image 706 is formed on the optical path of the relay optical system, it is possible to emit image light for an image in a direction toward the light guide member 100_1 almost without degradation (aberration or the like) of the image.

As described above, even in the display device 10a_7 according to the sixth modification in which the rod lenses 262a and 262b are used as the relay optical systems instead of the convex lenses 252a and 252b, it is possible to achieve the same effects as those of the display device 10a_1 according to the seventh embodiment as described above.

Eighth Embodiment

With regard to a display device according to an eighth embodiment, a difference from the display device 10 according to the first embodiment will be mainly described. In the eighth embodiment, a configuration that enables VR display by preventing external light from transmitting through the light guide member 100 and entering eyes of a wearer will be described.

Configuration of Display Device

FIGS. 31A and 31B are diagrams illustrating an example of a display device according to the eighth embodiment. A configuration of a display device 10j according to the eighth embodiment will be described with reference to FIGS. 31A and 31B.

The display device 10j according to the eighth embodiment has the same configuration as the display device 10 according to the first embodiment, and, as illustrated in FIGS. 31A and 31B, further includes hinge units 111a and 111b that are provided in the upper part of a frame that supports the light guide members 100a and 100b, and light shielding members 110a and 110b (one example of a light shielding mechanism) that are rotatably supported by the hinge units 111a and 111b.

The light shielding members 110a and 110b are members that shield the light guide members 100a and 100b from outside (an opposite side of eyes of a wearer) to thereby prevent external light from transmitting through the light guide members 100a and 100b and entering eyes of a wearer. The light shielding members 110a and 110b are freely rotatable about the hinge units 111a and 111b, and switch between a light-shielded state and a light-shielding-released state with respect to the light guide members 100a and 100b.

FIG. 31A indicates the light-shielding-released state in which the light shielding members 110a and 110b are opened with respect to the light guide members 100a and 100b. In the state illustrated in FIG. 31A, the light guide members 100a and 100b are not light-shielded, but are in a transparent state or a semi-transparent state against the outside, so that they can be used for AR display.

In contrast, FIG. 31B illustrates the light-shielded state in which the light shielding members 110a and 110b covers outer sides of the light guide members 100a and 100b to block light. In the state illustrated in FIG. 31B, the light guide members 100a and 100b are light-shielded and in a non-transparent state against the outside, so that they can be used for VR display.

As described above, the display device 10j according to the eighth embodiment includes a mechanism (the light shielding members 110a and 110b in the example illustrated in FIGS. 31A and 31 B) that switches between a transparent state or a semi-transparent state and a non-transparent state at least in a direction from the light guide member 100 to the eyes of the wearer. With this configuration, it is possible to easily switch between AR display and VR display by a single device (the display device 10j), so that it is possible to increase versatility. The display device 10j according to the eighth embodiment has the same other effects as those of the display device 10 according to the first embodiment.

While the example illustrated in FIGS. 31A and 31B indicates a configuration in which the light shielding members 110a and 110b are able to freely rotate with the aid of the hinge units 111a and 111b that are attached to the frame of the light guide members 100a and 100b, the embodiments are not limited to this example. For example, the light shielding members 110a and 110b may be configured to slide to the left and the right with respect to the light guide members 100a and 100b, or the light shielding members 110a and 110b may be configured to be removably attached to the light guide members 100a and 100b.

Further, the light shielding members 110a and 110b need not always be used to shield the light guide members 100a and 100b from light. For example, a dimmer element (one example of the light shielding mechanism) that is able to switch between a transparent state and a non-transparent state using electrical conduction and non-conduction may be provided on or attached to the light guide members 100a and 100b. As the dimmer element, for example, it is sufficient to use a liquid crystal element or an electrochromic element. In particular, the electrochromic element has a large contrast between the transparent state and the non-transparent state, and is able to clearly switch between immersive VR display in the non-transparent state and AR display in the transparent state with high visibility of the real world. In this case, a member for blocking light, such as the light shielding members 110a and 110b and the hinge units 111a and 111b, are not needed.

Ninth Embodiment

With regard to a display system according to a ninth embodiment, a configuration using the display device 10 according to the first embodiment will be described. In the ninth embodiment, a configuration for receiving image data, which is for causing the image display element 301 to emit image light, from an external apparatus will be described.

Configuration of Display System

FIG. 32 is a diagram illustrating an example of a configuration of a display system according to the ninth embodiment. A configuration of a display system 1 according to the ninth embodiment will be described with reference to FIG. 32.

As illustrated in FIG. 32, the display system 1 according to the ninth embodiment includes a display device 10 and an external device 20.

The display device 10 is, for example, the display device 10 according to the first embodiment and is a head-mounted display device that causes image light projected by an image display element to enter eyes of a wearer via a relay optical system and the light guide member 100.

The external device 20 is an information processing apparatus that transmits image data (including video data) to the display unit 300 of the display device 10 (the display units 300a and 300b illustrated in FIG. 32) via a cable 2. The external device 20 is, for example, a smartphone, a mobile phone, a tablet, a notebook personal computer (PC), a desktop PC, or the like.

Hardware Configuration of Display Unit of Display Device

FIG. 33 is a diagram illustrating an example of a hardware configuration of a main part of the display unit of the ninth embodiment. A hardware configuration of a display unit 300 of the display device 10 according to the ninth embodiment will be described with reference to FIG. 33.

As illustrated in FIG. 33, the display unit 300 of the display device 10 according to the ninth embodiment includes the image display element 301, the driving IC 303, and a high-definition multimedia interface (HDMI) (registered trademark) receiver 321 (one example of a receiving unit). The image display element 301 and the driving IC 303 are the same as those described in the first embodiment, and a power circuit (for example, the power circuit 305 illustrated in FIG. 2) that supplies a voltage to each of the units is included, although not illustrated in FIG. 33.

As illustrated in FIG. 33, the HDMI receiver 321 is a device that is connected to the external device 20 via the cable 2 that is an HDMI cable, and receives an HDMI signal that includes image data and that is output from the external device 20. The HDMI receiver 321 transmits the received HDMI signal including the image data to the driving IC 303. The HDMI receiver 321 may temporarily store, as image information, image data that is the received HDMI signal in a memory, and in this case, the driving IC 303 reads image signals accumulated in the memory and causes the image display element 301 to perform display in accordance with the image signals.

The cable 2 that is the HDMI cable is a general-purpose cable for a video, and can be easily connected to various external apparatuses, such as a PC. It is possible to supply power of +5V from the external device 20 to the display unit 300 through the HDMI cable, and the above-described power circuit converts a voltage (+5V) input from the HDMI cable to a voltage corresponding to drive of each device and supplies the converted voltage. Meanwhile, as described above in the first embodiment, the power circuit may convert a voltage input from a battery to a voltage corresponding to drive of each device and supplies the converted voltage.

For example, if the display device 10 includes an image output destination as an image source, there is a problem in that the weight of the display device 10 itself increases. However, as in the display system 1 according to the ninth embodiment, the external device 20 that is an image output destination as an image source is constructed as a unit separated from the display device 10. With this configuration, it is possible to reduce the weight of the display device 10 itself, so that it is possible to largely reduce load application to the nose of a wearer. The display device 10 of the display system 1 according to the ninth embodiment has the same other effects as those of the display device 10 according to the first embodiment.

First Modification

FIG. 34 is a diagram illustrating an example of a hardware configuration of a main part of a display unit according to a first modification of the ninth embodiment. A hardware configuration of a display unit 300k according to the first modification of the ninth embodiment will be described with reference to FIG. 34.

As illustrated in FIG. 34, the display unit 300k of a display device according to the first modification (for example, the display device 10 according to the first embodiment) includes the image display element 301, the driving IC 303, and a mobile high-definition link (MHL) (registered trademark)/HDMI converter 322 (one example of the receiving unit). The image display element 301 and the driving IC 303 are the same as those described in the first embodiment, and a power circuit (for example, the power circuit 305 illustrated in FIG. 2) that supplies a voltage to each of the units is included, although not illustrated in FIG. 34.

As illustrated in FIG. 34, the MHL/HDMI converter 322 is a device that is connected to the external device 20 via a cable 2a that is an MHL cable, and receives an MHL signal that includes image data and that is output from the external device 20. In other words, the display unit 300k and the external device 20 illustrated in FIG. 34 are communicably connected to each other by an MHL system. The MHL/HDMI converter 322 converts the received MHL signal to an HDMI signal that can be processed by the driving IC 303, and transmits the HDMI signal to the driving IC 303.

Here, the MHL cable is a communication cable compatible with the MHL system, and is a cable that enables transmission of images by substantially five communication lines using micro universal serial bus (USB) terminals. Therefore, it is possible to reduce a cable diameter of the MHL cable as compared to the above-described HDMI cable that is constituted of 19 communication lines, so that it is possible to easily handle the cable and connect the display unit 300k of the display device and the external device 20 without the feeling of resistance.

Meanwhile, the MHL/HDMI converter 322 may temporarily store image data, which is the converted HDMI signal, in a memory as image information, and in this case, the driving IC 303 reads image signals accumulated in the memory and causes the image display element 301 to perform display in accordance with the image signals.

Further, in the example illustrated in FIG. 34, the driving IC 303 uses the HDMI signal converted by the MHL/HDMI converter 322, but in the case of a driving IC using a 24-bit RGB signal, it is sufficient to use an MHL/24RGB converter instead of the MHL/HDMI converter 322.

The cable 2a that is the MHL cable is a general-purpose cable for a video, and can be easily connected to various external apparatuses, such as smartphones, which are compatible with the MHL system. It is possible to supply power from the external device 20 to the display unit 300k through the MHL cable, and the above-described power circuit converts a voltage input from the MHL cable to a voltage corresponding to drive of each device and supplies the converted voltage. Meanwhile, as described above in the first embodiment, the power circuit may convert a voltage input from a battery to a voltage corresponding to drive of each device and supplies the converted voltage.

As described above, by constructing the external device 20, which is an image output destination as an image source, as a unit separated from the display device and by using an MHL cable as a cable for connecting the display unit 300k and the external device 20, it is possible to reduce the weight of the display device itself, reduce the weight of the cable, and largely reduce load application to the nose of a wearer. The display device according to the first modification has the same other effects as those of the display device 10 according to the first embodiment.

Second Modification

FIG. 35 is a diagram illustrating an example of a hardware configuration of a main part of a display unit according to a second modification of the ninth embodiment. A hardware configuration of a display unit 300l according to the second modification of the ninth embodiment will be described with reference to FIG. 35.

As illustrated in FIG. 35, the display unit 300l of the display device according to the second modification (for example, the display device 10 according to the first embodiment) includes the image display element 301, the driving IC 303, and a V-by-One (registered trademark) HS converter 323 (one example of the receiving unit). The image display element 301 and the driving IC 303 are the same as those described in the first embodiment, and a power circuit (for example, the power circuit 305 illustrated in FIG. 2) that supplies a voltage to each of the units is included, although not illustrated in FIG. 35.

As illustrated in FIG. 35, the V-by-One HS converter 323 is a device that is connected to the external device 20 via a cable 2b that is a V-by-One HS cable, and receives a V-by-One HS signal that includes image data and that is output from the external device 20. In other words, the display unit 300l and the external device 20 illustrated in FIG. 35 are communicably connected to each other by a V-by-One HS system. The V-by-One HS converter 323 converts the received V-by-One HS signal to an HDMI signal, an RGB signal, or the like that can be processed by the driving IC 303, and transmits the converted signal to the driving IC 303.

Here, the V-by-One HS cable is a communication cable compatible with the V-by-One HS system, and is a cable that is constituted of two communication lines and two power lines as twisted pairs and enables transmission of images. Therefore, it is possible to reduce a cable diameter of the V-by-One cable as compared to the above-described HDMI cable that is constituted of 19 communication lines, so that it is possible to easily handle the cable and connect the display unit 300l of the display device and the external device 20 without the feeling of resistance.

Meanwhile, the V-by-One HS converter 323 may temporarily store image data, which is the converted HDMI signal, RGB signal, or the like, in a memory as image information, and in this case, the driving IC 303 reads image signals accumulated in the memory and causes the image display element 301 to perform display in accordance with the image signals.

The cable 2b that is the V-by-One HS cable is a general-purpose cable for a video, and can be easily connected to various external apparatuses, such as smartphones, which are compatible with the V-by-One HS system. It is possible to supply power from the external device 20 to the display unit 300l through power lines included in the V-by-One HS cable, and the above-described power circuit converts a voltage input from the V-by-One cable to a voltage corresponding to drive of each device and supplies the converted voltage. Meanwhile, as described above in the first embodiment, the power circuit may convert a voltage input from a battery to a voltage corresponding to drive of each device and supplies the converted voltage.

As described above, by constructing the external device 20, which is an image output destination as an image source, as a unit separated from the display device and by using a V-by-One HS cable as a cable for connecting the display unit 300*l* and the external device 2, it is possible to reduce the weight of the display device itself, reduce the weight of the cable, and largely reduce load application to the nose of a wearer. The display device according to the second modification has the same other effects as those of the display device 10 according to the first embodiment.

Tenth Embodiment

With regard to a display system according to a tenth embodiment, a difference from the display system 1 according to the ninth embodiment will be mainly described. In the tenth embodiment, a configuration in which a display device and an external device are connected to each other via a USB/MHL converter that converts a USB signal to an MHL signal will be described.

Hardware Configuration of Display System

FIG. 36 is a diagram illustrating an example of a hardware configuration of the display system according to the tenth embodiment. A hardware configuration of a display system 1*m* according to the tenth embodiment will be described with reference to FIG. 36.

As illustrated in FIG. 36, the display system 1*m* according to the tenth embodiment includes a display device 10*m*, the external device 20, and a USB/MHL converter 30 (converter).

The display device 10*m* includes the image display elements 301*a* and 301*b*, driving ICs 303*a* and 303*b*, MHL/HDMI converters 322*a* and 322*b* (one example of the receiving unit), a camera 331, and a nine-axis sensor 332. The image display elements 301*a* and 301*b* and the driving ICs 303*a* and 303*b* are the same as those described in the first embodiment, and a power circuit (for example, the power circuit 305 illustrated in FIG. 2) that supplies a voltage to each of the units is included, although not illustrated in FIG. 36.

The MHL/HDMI converters 322*a* and 322*b* are devices that are connected to the USB/MHL converter 30 via MHL cables for transferring MHL signals, and receive MHL signals that include image data and that are output from the USB/MHL converter 30. The MHL/HDMI converters 322*a* and 322*b* convert the received MHL signals to HDMI signals to enable the driving ICs 303*a* and 303*b* to perform processes, and transmit the converted signals to the driving ICs 303*a* and 303*b*.

The camera 331 is, for example, an imaging device that is arranged on a bridge (not illustrated) or the like in the display device 10*m*, and captures an image of an object that is located ahead. The camera 331 transmits the captured image data as a USB signal to the external device 20 via the USB/MHL converter 30.

The nine-axis sensor 332 is a sensor that is provided in a display unit of the display device 10*m* (for example, the display unit 300 of the first embodiment or the like), and detects a posture, a moving direction, orientation, and the like of the wearer. The nine-axis sensor 332 transmits the detected signal as a USB signal to the external device 20 via the USB/MHL converter 30.

The USB/MHL converter 30 is a converter that converts an USB signal that includes image data and that is output from the external device 20 to an HDMI signal, and further converts the HDMI signal to an MHL signal. The USB/MHL converter 30 transmits the converted MHL signal (including the image data) to the display device 10*m* (the MHL/HDMI converters 322*a* and 322*b*) via the above-described MHL cables. Further, with the MHL cables, it is possible to supply power to the display device 10*m*, and the above-described power circuit converts voltages input from the MHL cables to voltages corresponding to drive of each device and supplies the converted voltages. Meanwhile, as described above in the first embodiment, the power circuit may convert a voltage input from a battery to a voltage corresponding to drive of each device and supplies the converted voltage. The USB/MHL converter 30 includes a USB/HDMI converter 31, an HDMI distributor 32, HDMI/MHL converters 33*a* and 33*b*, and a USB hub 34.

The USB/HDMI converter 31 is a converter that converts an USB signal that includes image data and that is output from the external device 20 to an HDMI signal. Further, the USB/HDMI converter 31 transmits detection signals (USB signals) from various sensors (for example, the camera 331 and the nine-axis sensor 332) of the display device 10*m* to the external device 20 without converting them to other signal formats.

The HDMI distributor 32 is a device that distributes the HDMI signal output from the USB/HDMI converter 31 to an HDMI signal for the right eye of the wearer and an HDMI signal for the left eye of the wearer.

The HDMI/MHL converters 33*a* and 33*b* are converters that convert each of the HDMI signals that have been converted by the USB/HDMI converter 31, that have been distributed by the HDMI distributor 32, and that include image data to MHL signals.

The USB hub 34 is a hub that has a plurality of USB ports. USB signals output from the camera 331 and the nine-axis sensor 332 are transmitted to the USB/HDMI converter 31 via the USB hub 34.

The USB is a transmission standard that is generally used for a smartphone, a mobile phone, a tablet, a notebook PC, a desktop PC, and the like. With use of the USB/MHL converter 30 (in particular, the USB/HDMI converter 31 inside thereof) that converts a USB signal to an HDMI signal, it becomes possible to use, as the external device 20, a device that is compatible with a general-purpose USB, instead of a special dedicated terminal, such as a device compatible with HDMI.

As described above, in the display system 1*m* according to the tenth embodiment, the external device 20 that is compatible with the USB standard and the display device 10*m* that is compatible with MHL are connected via the USB/MHL converter 30 that converts a USB signal to an MHL signal. As described above, the external device 20, such as a smartphone, a mobile phone, a tablet, a notebook PC, or a desktop PC, is generally compatible with the USB standard, and it is desirable to use a small number of MHL cables to connect the external device 20 and the display device 10*m*. In this regard, it is possible to address the situations at once by connecting the external device 20 and the display device 10*m* via the USB/MHL converter 30. Further, the USB/MHL converter 30 also has a function to output the input USB signal to the external device 20 without changing a signal format; therefore, as illustrated in FIG. 36, it is possible to connect various devices, such as sensors, that are compatible with the USB standard.

Furthermore, the external device 20 that is an image output destination as an image source is constructed as a unit separated from the display device 10*m*, and the MHL cable is used as a cable for connecting the USB/MHL converter 30 and the external device 20, so that it is possible to reduce the weight of the display device 10*m* itself, reduce the weight of the cable, and largely reduce load application to the nose of a wearer.

Moreover, as illustrated in FIG. 36, the display device 10*m* includes the nine-axis sensor 332, so that it is possible to recognize, in real time, a direction, an inclination, or the like of the head of a wearer who is wearing the display device 10*m*, and it is possible to display or delete an object depending on the direction or the inclination of the head, for example. Meanwhile, as in an eleventh embodiment to be described below, it may be possible to transmit detection signals of the camera 331 and the nine-axis sensor 332 illustrated in FIG. 36 to the external device 20 through wireless communication using a wireless circuit.

The display device 10*m* according to the tenth embodiment has the same other effects as those of the display device 10 according to the first embodiment.

Modification

FIG. 37 is a diagram illustrating an example of a hardware configuration of a display system according to a modification of the tenth embodiment. A hardware configuration of a display system 1*t* according to the modification will be described with reference to FIG. 37.

As illustrated in FIG. 37, the display system 1*t* according to the modification includes a display device 10*t*, the external device 20, and a USB/V-by-One HS converter 30*a* (converter).

The display device 10*t* includes the image display elements 301*a* and 301*b*, the driving ICs 303*a* and 303*b*, V-by-One HS/HDMI converters 324*a* and 324*b* (one example of a receiving unit), the camera 331, and the nine-axis sensor 332. The image display elements 301*a* and 301*b* and the driving ICs 303*a* and 303*b* are the same as those described in the first embodiment, and a power circuit (for example, the power circuit 305 illustrated in FIG. 2) that supplies a voltage to each of the units is included, although not illustrated in FIG. 37.

The V-by-One HS/HDMI converters 324*a* and 324*b* are devices that are connected to the USB/V-by-One HS converter 30*a* via V-by-One HS cables for transferring V-by-One HS signals, and receive V-by-One HS signals that include image data and that are output from the USB/V-by-One HS converter 30*a*. The V-by-One HS/HDMI converters 324*a* and 324*b* convert the received V-by-One HS signals to HDMI signals to enable the driving ICs 303*a* and 303*b* to perform processes, and transmit the HDMI signals to the driving ICs 303*a* and 303*b*.

The camera 331 is, for example, an imaging device that is arranged on a bridge (not illustrated) or the like in the display device 10*t*, and captures an image of an object that is located ahead. The camera 331 transmits the captured image data as a USB signal to the external device 20 via the USB/V-by-One HS converter 30*a*.

The nine-axis sensor 332 is a sensor that is provided in a display unit of the display device 10*t* (for example, the display unit 300 of the first embodiment or the like), and detects a posture, a moving direction, orientation, and the like of the wearer. The nine-axis sensor 332 transmits the detected signal as a USB signal to the external device 20 via the USB/V-by-One HS converter 30*a*.

The USB/V-by-One HS converter 30*a* is a converter that converts an USB signal that includes image data and that is output from the external device 20 to an HDMI signal, and further converts the HDMI signal to a V-by-One HS signal. The USB/V-by-One HS converter 30*a* transmits the converted V-by-One HS signal (including the image data) to the display device 10*t* (the V-by-One HS/HDMI converters 324*a* and 324*b*) via the above-described V-by-One HS cables. Further, with the V-by-One HS cables, it is possible to supply power to the display device 10*t*, and the above-described power circuit converts voltages input from the V-by-One HS cables to voltages corresponding to drive of each device and supplies the converted voltages. Meanwhile, as described above in the first embodiment, the power circuit may convert a voltage input from a battery to a voltage corresponding to drive of each device and supplies the converted voltage. The USB/V-by-One HS converter 30*a* includes the USB/HDMI converter 31, the HDMI distributor 32, HDMI/V-by-One HS converters 35*a* and 35*b*, and the USB hub 34. The functions of the USB/HDMI converter 31, the HDMI distributor 32, and the USB hub 34 are the same as those described above with reference to FIG. 36.

The HDMI/V-by-One HS converters 35*a* and 35*b* are converters that convert each of the HDMI signals that have been converted by the USB/HDMI converter 31, that have been distributed by the HDMI distributor 32, and that include image data to V-by-One HS signals.

As described above, the USB is a transmission standard that is generally used for a smartphone, a mobile phone, a tablet, a notebook PC, a desktop PC, and the like. With use of the USB/V-by-One HS converter 30*a* (in particular, the USB/HDMI converter 31 inside thereof), it becomes possible to use, as the external device 20, a device that is compatible with a general-purpose USB, instead of a special dedicated terminal, such as a device compatible with HDMI.

As described above, in the display system 1*t* according to the modification, the external device 20 that is compatible with the USB standard and the display device 10*t* that is compatible with V-by-One HS are connected via the USB/V-by-One HS converter 30*a* that converts a USB signal to a V-by-One HS signal. As described above, the external device 20, such as a smartphone, a mobile phone, a tablet, a notebook PC, or a desktop PC, is generally compatible with the USB standard, and it is desirable to use a small number of V-by-One HS cables to connect the external device 20 and the display device 10*t*. In this regard, it is possible to address the situations at once by connecting the external device 20 and the display device 10*t* via the USB/V-by-One HS converter 30*a*. Further, the USB/V-by-One HS converter 30*a* also has a function to output the input USB signal to the external device 20 without changing a signal format; therefore, as illustrated in FIG. 37, it is possible to connect various devices, such as sensors, that are compatible with the USB standard.

Furthermore, the external device 20 that is an image output destination as an image source is constructed as a unit separated from the display device 10*t*, and the V-by-One HS cable is used as a cable for connecting the USB/V-by-One HS converter 30*a* and the external device 20, so that it is possible to reduce the weight of the display device 10*t* itself, reduce the weight of the cable, and largely reduce load application to the nose of a wearer.

Moreover, as illustrated in FIG. 37, the display device 10*t* includes the nine-axis sensor 332, so that it is possible to recognize, in real time, a direction, an inclination, or the like of the head of a wearer who is wearing the display device 10*t*, and it is possible to display or delete an object depending on the direction or the inclination of the head, for example. Meanwhile, as in the eleventh embodiment to be described below, it may be possible to transmit detection signals of the camera 331 and the nine-axis sensor 332 illustrated in FIG. 37 to the external device 20 through wireless communication using a wireless circuit.

The display device 10*t* according to the modification has the same other effects as those of the display device 10 according to the first embodiment.

Eleventh Embodiment

With regard to a display system according to the eleventh embodiment, a difference from the display system 1 according to the ninth embodiment will be mainly described. In the eleventh embodiment, a configuration in which the display device and the external device perform wireless communication with each other will be described.

Configuration of Display System

FIG. 38 is a diagram illustrating an example of a configuration of a display system according to the eleventh embodiment. A configuration of a display system 1n according to the eleventh embodiment will be described with reference to FIG. 38.

As illustrated in FIG. 38, the display system 1n according to the eleventh embodiment includes a display device 10n and the external device 20.

The display device 10n is a head-mounted display device that causes image light projected by an image display element to enter eyes of a wearer via a relay optical system and the light guide member 100. The display device 10n receives image data for causing the image display element to emit image light, from the external device 20 through wireless communication. The display device 10n includes the light guide members 100a and 100b, the housing frames 200a and 200b, display units 300na and 300nb, the bridge 400, and the temples 500a and 500b.

The display units 300na and 300nb are devices that wirelessly receive image data from the external device 20, and emit image light based on the image data toward relay optical systems (for example, the relay optical systems 201a and 201b illustrated in FIG. 1) of the housing frames 200a and 200b. A wireless method used by the display units 300na and 300nb and the external device 20 is, for example, Bluetooth (registered trademark), a wireless local area network (LAN), or the like.

When Bluetooth (registered trademark) is used, the maximum transfer rate is 24 Mbps, so that it is possible to transfer images at 18.9 Mbps in the case of a video of 1024×768×24 (full color) and it is possible to transfer one or more images per second. Further, when a wireless LAN (for example, IEEE802.11n) is used, the maximum transfer rate is 300 Mbps, so that it is possible to transfer images at about 15 fps in the case of an image of 1024×768×24.

When an arbitrary one or both of the display units 300na and 300nb will be singly or collectively referred to, the one or both of them will be simply referred to as a "display unit 300n".

Other configurations of the display device 10n are the same as those of the display device 10 according to the first embodiment.

Hardware Configuration of Display Unit of Display Device

FIG. 39 is a diagram illustrating an example of a hardware configuration of the display unit according to the eleventh embodiment. A hardware configuration of the display unit 300n of the display device 10n according to the eleventh embodiment will be described with reference to FIG. 39.

As illustrated in FIG. 39, the display unit 300n of the display device 10n according to the eleventh embodiment includes the image display element 301, the driving IC 303, the memory 304, the power circuit 305, the battery 306, and a wireless circuit 307 (one example of the receiving unit).

The memory 304 is a storage device that accumulates image data that is transmitted from the external device 20 and received by the wireless circuit 307.

The power circuit 305 is a circuit that converts a voltage input from the battery 306 to a voltage that corresponds to drive of each device and supplies the converted voltage. The power circuit 305 supplies, as illustrated in FIG. 39, power (voltage) to each of the image display element 301, the driving IC 303, the memory 304, and the wireless circuit 307.

The wireless circuit 307 is a circuit that receives image data from the external device 20 through the wireless communication in accordance with the above-described wireless method.

Other components of the display unit 300n are the same as those of the display unit 300 according to the first embodiment.

As described above, in the display system 1n according to the eleventh embodiment, it is possible to connect the display device 10n (the display unit 300n) and the external device 20 that is an image source without a cable, so that it is possible to use the display system without concerning about complex cable handling. The display device 10n according to the eleventh embodiment has the same other effects as those of the display device 10 according to the first embodiment.

In the eleventh embodiment, the example has been described in which information, such as image data, is transferred through wireless communication between the display unit 300n and the external device 20, but it may be possible to enable non-contact power supply between the display unit 300n (the battery 306) and the external device 20, for example. In this case, it is possible to supply power to the display unit 300n using electric power of the external device 20, without using a cable.

Twelfth Embodiment

With regard to a display device according to a twelfth embodiment, a difference from the display device 10 according to the first embodiment will be mainly described. In the twelfth embodiment, a configuration of a display device mounted with a camera will be described.

Configuration of Display Device

FIG. 40 is a diagram illustrating an example of the display device according to the twelfth embodiment. A configuration of a display device 10p according to the twelfth embodiment will be described with reference to FIG. 40.

As illustrated in FIG. 40, the display device 10p according to the twelfth embodiment includes the light guide members 100a and 100b, the housing frames 200a and 200b, the display units 300a and 300b, the bridge 400, the temples (not illustrated), cameras 333a and 333b, and a camera 334.

The cameras 333a and 333b are imaging apparatuses that are attached to front surface sides of the housing frames 200a and 200b and function as what is called stereo cameras. It is possible to calculate a distance to an object that appears in a captured image, on the basis of a disparity of captured images obtained by the cameras 333a and 333b. For example, captured image data obtained by the cameras 333a and 333b is transmitted to an external device through wireless communication or wired communication, and the external device calculates a distance to the object based on a disparity of the captured image data. Then, the external device generates, for example, image data in which a virtual object is displayed at the calculated distance and transmits the image data to the display device 10p. The display device 10p displays, as a virtual image, an image of the received image data, in which the object is displayed, for the wearer, to thereby allow the wearer to recognize that the object is present at the above-described distance.

The camera 334 is an imaging apparatus that captures an image of a background in front of the wearer. The captured image data obtained by the camera 334 is transmitted to the external device through wireless communication or wired communication, and the external device is able to store image data that is obtained by superimposing the above-described object on the received captured image data, for example.

Meanwhile, while it is explained that the external device that is separated from the display device 10p performs processes on the captured image data obtained by the cameras 333a and 333b and the camera 334, the embodiments are not limited to this example. For example, it may be possible to mount an arithmetic device on the display unit (for example, the display units 300a and 300b illustrated in FIG. 1) of the display device 10p, and cause the arithmetic device to perform processes on the above-described captured image data.

Other configurations of the display device 10p are the same as those of the display device 10 according to the first embodiment.

As described above, the display device 10p according to the twelfth embodiment includes the stereo cameras, so that it is possible to calculate a distance to an object that the wearer views in front of the wearer, and it is possible to display a virtual object corresponding to the distance as a virtual image. With this configuration, the wearer can appreciate the immersive feeling by AR display using object display corresponding to an actual distance. The display device 10p according to the twelfth embodiment has the same other effects as those of the display device 10 according to the first embodiment.

Thirteenth Embodiment

With regard to a display device according to a thirteenth embodiment, a difference from the display device 10 according to the first embodiment will be mainly described. In the thirteenth embodiment, a configuration of a display device mounted with what is called a depth sensor will be described.

Configuration of Display Device

FIG. 41 is a diagram illustrating an example of the display device according to the thirteenth embodiment. A configuration of a display device 10q according to the thirteenth embodiment will be described with reference to FIG. 41.

As illustrated in FIG. 41, the display device 10q according to the thirteenth embodiment includes the light guide members 100a and 100b, the housing frames 200a and 200b, the display units 300a and 300b, the bridge 400, the temples (not illustrated), an infrared scanner 335, and an infrared camera 336.

The infrared scanner 335 and the infrared camera 336 constitute what is called a depth sensor. First, after the infrared scanner 335 emits infrared light, the infrared camera 336 performs imaging, so that a time lag occurs, due to a distance to an object, between the time at which the emitted infrared light is reflected (time of flight (ToF)) and an image of each of points captured by the infrared camera 336, and it becomes possible to calculate a distance (depth) of each of the points on the image by triangulation with respect to the time lag. The calculation of the distance may be performed by the display unit of the display device 10q or the external device as described in the twelfth embodiment. In this manner, it is possible to recognize the distance (depth) of the object in a plane, so that it is possible to perform recording as a three-dimensional space. Further, because information on the three-dimensional space detected once by the depth sensor is already recorded, even when a person wearing the display device 10q moves, it is possible to recognize the position of the person (self-location estimation).

Other configurations of the display device 10q are the same as those of the display device 10 according to the first embodiment.

As described above, in the display device 10q according to the thirteenth embodiment, the depth sensor is mounted and it is possible to recognize the position of the wearer in the three-dimensional space, so that it is possible to freely arrange or fix an object to be displayed as an image by the display device 10q. For example, even when the wearer wearing the display device 10q moves, because the real space is already recognized, it is possible to display a fixed object without moving the object to a different position. The display device 10q according to the thirteenth embodiment has the same other effects as those of the display device 10 according to the first embodiment.

Fourteenth Embodiment

With regard to a display device according to a fourteenth embodiment, a difference from the display device 10 according to the first embodiment will be mainly described. In the fourteenth embodiment, a configuration of a display device mounted with an eye tracker will be described.

Configuration of Display Device

FIG. 42 is a diagram illustrating an example of the display device according to the fourteenth embodiment. A configuration of a display device 10r according to the fourteenth embodiment will be described with reference to FIG. 42.

As illustrated in FIG. 42, the display device 10r according to the fourteenth embodiment includes the light guide members 100a and 100b, the housing frames 200a and 200b, the display units 300a and 300b, the bridge 400, pads 401a and 401b, the temples (not illustrated), a near-infrared LED 337, and a near-infrared camera 338. Further, a configuration diagram of the display device 10r is a view viewed from the wearer side.

The pads 401a and 401b are members that sandwich the nose of a wearer from both sides and support the display device 10r.

The near-infrared LED 337 and the near-infrared camera 338 constitute what is called an eye tracker. First, the near-infrared LED 337 emits near-infrared light toward eyes of a wearer. Subsequently, the near-infrared camera 338 captures an image of the eyes of the wearer, so that the positions of the pupils of the eyes of the wearer and the positions of points of reflection of the near-infrared light, which is emitted by the near-infrared LED 337, on the corneas are identified. Then, it is possible to calculate a point of regard of the wearer based on the above-described positions. The point of regard may be calculated by the display unit of the display device 10r or the external device as described in the twelfth embodiment. Here, the reason why the near-infrared light is used to calculate the point of regard of the wearer is to accurately recognize the positions of eye balls even in a dark place. While the near-infrared LED 337 and the near-infrared camera 338 are arranged about the right eye of the wearer in the example illustrated in FIG. 42, the embodiments are not limited to this example, and they may be arranged about the left eye.

Other configurations of the display device 10r are the same as those of the display device 10 according to the first embodiment.

As described above, in the display device 10r according to the thirteenth embodiment, it is possible to mount the eye tracker and calculate the point of regard of the wearer, in other words, it is possible to recognize the direction of the line of sight of the wearer, so that it is possible to recognize an object (character, things, or the like) viewed by the wearer and it is possible to display an image of an object (for example, additional information related to the object using pop-up) corresponding to the object by the display device 10r.

Fifteenth Embodiment

With regard to a display device according to a fifteenth embodiment, a difference from the display device 10 according to the first embodiment will be mainly described. In the fifteenth embodiment, a configuration of a display device mounted with a bone-conduction speaker will be described.

Configuration of Display Device

FIG. 43 is a diagram illustrating an example of the display device according to the fifteenth embodiment. A configuration of a display device 10s according to the fifteenth embodiment will be described with reference to FIG. 43.

As illustrated in FIG. 43, the display device 10s according to the fifteenth embodiment includes the light guide member 100, the housing frame 200, a display unit 300s, the bridge (not illustrated), and the temple 500.

The display unit 300s is a device that receives image data from an external device and emits image light based on the image data toward a relay optical system (for example, the relay optical system 201 of the first embodiment or the like) of the housing frame 200. The display unit 300s includes, in a housing, a data receiving means, such as the HDMI receiver 321 illustrated in FIG. 33, the MHL/HDMI converter 322 illustrated in FIG. 34, or the wireless circuit 307 illustrated in FIG. 39, and a bone-conduction speaker 339, in addition to the hardware components of the display unit 300 illustrated in FIG. 2. Further, it is assumed that the display unit 300s is arranged near the temporal bone 51 of the wearer as described above with reference to FIG. 4.

The data receiving means is the same as described above, and, in this example, receives voice data and the like in addition to image data.

The bone-conduction speaker 339 is a speaker device that causes the bone of the wearer to vibrate based on voice data received by the data receiving means and transfers sound to ears of the wearer. It is desirable to arrange the bone-conduction speaker 339 on an inner wall of the housing of the display unit 300s on the side that is in close contact with the wearer in order to easily transfer vibration to the bone of the wearer. Further, because the display unit 300s is arranged near the temporal bone 51 of the wearer and the bone-conduction speaker 339 can easily transfer sound due to bone conduction as described above, it is not necessary to newly arrange the display unit 300s at a different position.

Other configurations of the display device 10s are the same as those of the display device 10 according to the first embodiment.

As described above, in the display device 10s according to the fifteenth embodiment, the bone-conduction speaker 339 is mounted on the display unit 300s, so that it is possible to transfer sound corresponding to the contents of an image displayed by the display device 10s to the wearer. For example, it is possible to transfer an instruction or guidance about operation to the wearer by the bone-conduction speaker 339, and in this case, the ears of the wearer are not covered, and the wearer can also hear ambient sound and can perform operation safely.

Sixteenth Embodiment

With regard to a display device according to a sixteenth embodiment, a difference from the display device 10g according to the fourth embodiment will be mainly described. In the sixteenth embodiment, a configuration in which a housing for housing a relay optical system and a frame by which the wearer wears the display device are separated from each other will be described.

Configuration of Display Device

FIGS. 44A to 44C is diagrams illustrating an example of the display device according to the sixteenth embodiment. A configuration of a display device 10b_1 according to the sixteenth embodiment will be described with reference to FIGS. 44A to 44C.

As illustrated in FIG. 44A, the display device 10b_1 according to the sixteenth embodiment includes housings 220a and 220b, frames 221a and 221b, temples 222a and 222b, and the bridge 400.

The housing 220a is a housing of an integrated member for housing the light guide member 100a, the collimator lens 212a, a Hopkins relay lens group 202a that is a relay optical system, the condenser lens 211a, a mirror 312a, an image display element 311a (image display unit), and the control substrate 302a. Here, an arrangement relationship among the light guide member 100a, the collimator lens 212a, the Hopkins relay lens group 202a, the condenser lens 211a, the mirror 312a, the image display element 311a, and the control substrate 302a that are housed in the housing 220a is the same as the arrangement relationship in the display device 10g according to the fourth embodiment as described above. Further, a portion of the housing 220a that covers the light guide member 100a is made of a light transmissive member.

The housing 220b is a housing of an integrated member for housing the light guide member 100b, the collimator lens 212b, a Hopkins relay lens group 202b that is a relay optical system, the condenser lens 211b, a mirror 312b, an image display element 311b (image display unit), and a control substrate 302b. Here, an arrangement relationship among the light guide member 100b, the collimator lens 212b, the Hopkins relay lens group 202b, the condenser lens 211b, the mirror 312b, the image display element 311b, and the control substrate 302b housed in the housing 220b is the same as the arrangement relationship in the display device 10g according to the fourth embodiment as described above. Further, a portion of the housing 220b that covers the light guide member 100b is made of a light transmissive member. The housing 220b is connected to the housing 220a by the bridge 400. The housing 220a and the housing 220b need not always be connected by the bridge 400, but may be formed in an integrated manner.

The housings 220a and 220b are made of, for example, a rigid material with low specific gravity, such as magnesium alloy, aluminum alloy, or a hard engineering plastic material. It is desirable that the specific gravity is equal to or smaller than 3 mg/cm$^3$ and bending stress is equal to or larger than 90 MPa. Further, it is desirable to set the thicknesses of the housings 220a and 220b to be equal to or smaller than 1 mm at a maximum in order to reduce weight. Furthermore, as the hard engineering plastic material as described above, polyacetal, polyamide, polycarbonate, polyphenylene ether, polyethylene terephthalate, high-density polyethylene, polyether ether ketone, polyphenylene sulfide, liquid crystal polymer, or the like is appropriate. Moreover, it is desirable to fill the housings with filler, such as fiberglass. Furthermore, as the method of fixing the light guide members 100a and 100b in the respective housings 220a and 220b, screwing, engaging, adhesive bonding, or the like is appropriate.

Meanwhile, the housings 220a and 220b need not always be formed as integrated members, but, for example, may be constituted of a plurality of housing members such that the housing members are integrated by being fixed with screws, adhesive, or the like. For example, a housing that houses the light guide member 100 (100a, 100b), a housing that houses an optical system, such as the relay optical system, and a housing that houses the control substrate 302 (302a, 302b), the image display element 311 (311a, 311b), and the mirror 312 (312a, 312b) may be independently assembled, and these housings may be integrated by screwing, engaging, adhesive bonding, or the like. Furthermore, each of the optical members and the components housed in the housings 220a and 220b have the same functions as each of the corresponding optical members and components of the display device 10g according to the fourth embodiment as described above.

Here, in the display device 10g according to the fourth embodiment as described above, the relay optical system (the Hopkins relay lens group 202) is arranged between the light guide member 100 and the image display element 311, so that the light guide member 100 and the image display element 311 are placed separately from each other. Therefore, if an external force is applied to the display device 10g, the moment increases around a bonding portion 600 as illustrated in FIG. 14 at which the light guide member 100 and the housing frame 200 housing the relay optical system are bonded together, and the light guide member 100, the housing frame 200, and the like may be deformed. In this case, when the display device 10g is worn on the head, the optical axis may be bent and positions of videos viewed by the right eye and the left eye may be deviated from each other, so that the videos may be viewed in a duplicated manner or in a distorted manner. To cope with this situation, for example, if rigidity is increased by increasing the thickness of the housing frame 200 and using a metal or the like with high specific gravity, it is possible to prevent occurrence of distortion but the weight of the housing frame 200 extremely increases and load on the head portion, such as the nose, increases.

Therefore, in the display device 10b_1 according to the sixteenth embodiment, as illustrated in FIG. 44A, the housing (the housings 220a and 220b) that houses the relay optical system (the Hopkins relay lens groups 202a and 202b) and the frame (the frames 221a and 221b) that is worn on the head portion are constructed independently from each other. Furthermore, an axial direction of the frame 221a is approximately parallel to an optical axis of the relay optical system housed in the housing 220a as illustrated in FIG. 44B, and the frame 221a is connected (bonded) at a connecting portion 230a with respect to a housing portion of the housing 220a that houses the light guide member 100a as illustrated in FIG. 44A to FIG. 44C. The housing portion in which the light guide member 100a is housed and the connecting portion 230a are connected by any of screwing, engaging, and adhesive bonding, for example. With this configuration, load is not applied to a housing portion of the housing 220a that houses the image display element 311a, so that the moment around a bonding portion 601 corresponding to the bonding portion 600 illustrated in FIG. 14 can be reduced and occurrence of distortion of the housing 220a can be prevented; therefore, it is possible to prevent videos from being viewed in a duplicated manner or in a distorted manner. Furthermore, as described above, the axial direction of the frame 221a is approximately parallel to the optical axis of the relay optical system housed in the housing 220a and the height of the frame 221a is the same as the height of the housing 220a, so that it is possible to improve the sense of unity of the frame 221a and the housing 220a. Meanwhile, the configuration of the frame 221b is the same as the frame 221a, in particular, an axial direction of the frame 221b is approximately parallel to an optical axis of the relay optical system housed in the housing 220b and a connecting portion 230b is connected (bonded) to a housing portion of the housing 220b in which the light guide member 100b is housed in as illustrated in FIG. 44A and FIG. 44C.

Furthermore, the frames 221a and 221b are made of a material with elasticity, such as metal or resin. Meanwhile, it is desirable that a material for constructing the frames 221a and 221b has superelasticity, low Young's modulus (80 GPa or lower), excellent corrosion resistance against grease and salt, fitting flexibility for fitting to the shape of the head, and bending durability. Moreover, it is desirable to use, as a specific material of the members of the frames 221a and 221b, titanium, titanium alloy (titanium-nickel alloy, β-titanium alloy, rubber metal, or the like), magnesium alloy, aluminum alloy, stainless alloy, triacetate, carbon resin, polyamide resin, or the like.

Furthermore, as illustrated in FIG. 44A, the frames 221a and 221b include the temples 222a and 222b on the end sides opposite to the connecting portions 230a and 230b, and further include hinges 223a and 223b that enable bending. Meanwhile, it is not always necessary to provide the hinges 223a and 223b, but it may be possible to omit them.

As described above, the display device 10b_1 according to the sixteenth embodiment has a structure in which the housing (the housings 220a and 220b) that houses the relay optical system (the Hopkins relay lens groups 202a and 202b) and the frame (the frames 221a and 221b) that is worn on the head portion are constructed independently from each other. Furthermore, the frames 221a and 221b are connected (bonded) at the connecting portions 230a and 230b with respect to the housing portions in which the light guide members 100a and 100b are housed in the housings 220a and 220b. With this configuration, load is not applied to the housing portions in which the image display elements 311a and 311b are housed in the housings 220a and 220b and the moment around the bonding portion 601 can be reduced, so that it is possible to prevent occurrence of distortion of the housings 220a and 220b and prevent videos from being viewed in a duplicated manner or a distorted manner.

Meanwhile, while the Hopkins relay lens groups 202a and 202b are housed as the relay optical systems in the housings 220a and 220b as described above, the embodiments are not limited to this example, and it is of course possible to adopt other relay optical systems as described above in the other embodiments.

First Modification

FIGS. 45A to 45C are diagrams illustrating an example of a display device according to a first modification of the sixteenth embodiment. A configuration of a display device 10b_2 according to the first modification of the sixteenth embodiment will be described with reference to FIGS. 45A to 45C.

As illustrated in FIG. 45A, the display device 10b_1 according to the present embodiment includes the housings 220a and 220b, a front frame 231, frames 221a and 221b, the temples 222a and 222b, and the bridge 400. Meanwhile, configurations of the housings 220a and 220b and each of the optical systems and devices housed in the housings 220a and 220b are the same as those of the display device 10b_1 according to the sixteenth embodiment described above with reference to FIGS. 44A to 44C.

In the display device 10b_2 according to the first modification, as illustrated in FIG. 45A, similarly to the display device 10b_1 according to the sixteenth embodiment as described above, the housing (the housings 220a and 220b) that houses the relay optical system (the Hopkins relay lens groups 202a and 202b) and the frame (the frames 221a and 221b) that is worn on the head portion are constructed independently from each other. Furthermore, the frame 221a and the frame 221b are connected by the front frame 231 that is extended approximately parallel to the longitudinal direction of the light guide members 100a and 100b. A central portion of the front frame 231 is bonded to a central portion, i.e., the bridge 400, between the housings 220a and 220b that house the light guide members 100a and 100b, by a connecting portion 232. The bridge 400 and the connecting portion 232 may be bonded by any of screwing, engaging, and adhesive bonding, for example. The central portion (the bridge 400), which is located between the housings 220a and 220b housing the light guide members 100a and 100b and to which the connecting portion 232 is bonded, is a portion that is least likely to be deformed or distorted with respect to the housings 220a and 220b even when an external force is applied. With this configuration, load is not applied to the housing portions that house the image display elements 311a and 311b in the housings 220a and 220b and it is possible to prevent occurrence of distortion of the housings 220a and 220b, so that it is possible to prevent videos from being viewed in a duplicated manner or in a distorted manner. Meanwhile, the connecting portion 232 need not always be bonded to the bridge 400, but may be bonded to housing portions where the light guide members 100a and 100b are housed and that are near the nose of the wearer, of the housings 220a and 220b.

Moreover, as illustrated in FIG. 45A to FIG. 45C, the axial directions of the frames 221a and 221b are approximately parallel to the optical axes of the relay optical systems housed in the housings 220a and 220b and the heights of the frames 221a and 221b are the same as the heights of the housings 220a and 220b, so that it is possible to improve the sense of unity of the frames 221a and 221b and the housings 220a and 220b.

Second Modification

FIGS. 46A to 46C are diagrams illustrating an example of a display device according to a second modification of the sixteenth embodiment. A configuration of a display device 10b_3 according to the second modification of the sixteenth embodiment will be described with reference to FIGS. 46A to 46C.

As illustrated in FIG. 46A, the display device 10b_3 according to the present embodiment includes the housings 220a and 220b, a front frame 233, the frames 221a and 221b, the temples 222a and 222b, and the bridge 400. Meanwhile, configurations of the housings 220a and 220b and each of the optical systems and devices housed in the housings 220a and 220b are the same as those of the display device 10b_1 according to the sixteenth embodiment described above with reference to FIGS. 44A to 44C.

As illustrated in FIG. 46A, in the display device 10b_3 according to the second modification, similarly to the display device 10b_1 according to the sixteenth embodiment as described above, the housing (the housings 220a and 220b) that houses the relay optical system (the Hopkins relay lens groups 202a and 202b) and the frame (the frames 221a and 221b) that is worn on the head portion are constructed independently from each other. Furthermore, the frame 221a and the frame 221b are connected by the front frame 233 that is extended approximately parallel to the longitudinal direction of the light guide members 100a and 100b. A central portion of the front frame 233 is bonded to the central portion, i.e., the bridge 400, between the housings 220a and 220b that house the light guide members 100a and 100b, by a connecting portion 234. The bridge 400 and the connecting portion 234 may be bonded by any of screwing, engaging, and adhesive bonding, for example. The connecting portion 234 need not always be bonded to the bridge 400, but may be bonded to the housing portions where the light guide members 100a and 100b are housed and that are near the nose of the wearer, of the housings 220a and 220b.

Meanwhile, in the configuration of the display device 10b_2 according to the first modification as described above, for example, when a person having a large head wears the device, the frames 221a and 221b may be largely extended outward and interfere with the housings 220a and 220b that house the relay optical systems. To prevent this interference, in the second modification, as illustrated in FIG. 46B and FIG. 46C, the height position of the front frame 233 is located above the housings 220a and 220b that house the light guide members 100a and 100b. With this configuration, the height positions of the frames 221a and 221b bonded to the front frame 233 are also located above the housings 220a and 220b. With this configuration, when the device is worn on the head, and even if the frames 221a and 221b are largely extended outward, the frames 221a and 221b do not interfere with and do not apply forces to the housings 220a and 220b that house the relay optical systems, so that an arbitrary person can wear the device.

Furthermore, a central portion (the bridge 400), which is located between the housings 220a and 220b housing the light guide members 100a and 100b and to which the connecting portion 234 is bonded, is a portion that is least likely to be deformed or distorted with respect to the housings 220a and 220b even when an external force is applied. With this configuration, load is not applied to the housing portions that house the image display elements 311a and 311b in the housings 220a and 220b and it is possible to prevent occurrence of distortion of the housings 220a and 220b, so that it is possible to prevent videos from being viewed in a duplicated manner or in a distorted manner.

Third Modification

FIGS. 47A to 47C are diagrams illustrating an example of a configuration of a display device according to a third modification of the sixteenth embodiment. A configuration of a display device 10b_4 according to the third modification of the sixteenth embodiment will be described with reference to FIGS. 47A to 47C.

As illustrated in FIG. 47A, the display device 10b_4 according to the present embodiment includes the housings 220a and 220b, frame housings 224a and 224b (one example of the frame), and the bridge 400. Meanwhile, configurations of the housings 220a and 220b and each of the optical systems and devices housed in the housings 220a and 220b are the same as those of the display device 10b_1 according to the sixteenth embodiment described above with reference to FIGS. 44A to 44C.

In the display device 10b_4 according to the third modification, as illustrated in FIG. 47A, similarly to the display device 10b_1 according to the sixteenth embodiment as described above, the housing (the housings 220a and 220b)

that houses the relay optical system (the Hopkins relay lens groups 202a and 202b) and the frame (the frame housings 224a and 224b) that is worn on the head portion are constructed independently from each other. As illustrated in FIG. 47A to FIG. 47C, the frame housing 224a is a member that is formed so as to house an upper portion of the housing 220a, and also has a function as a frame (temple) to be worn on the head of a wearer. Similarly, the frame housing 224b is a member that is formed so as to house an upper portion of the housing 220b, and also has a function as a frame (temple) to be worn on the head of the wearer. As the material of the frame housings 224a and 224b, any of metal and resin is applicable, but it is desirable to use a material with low Young's modulus of 70 GPa or lower to improve the feeling of fitting to the head. Meanwhile, the frame housings 224a and 224b need not always be configured to house the upper portions of the housings 220a and 220b, but may be configured to, for example, house lower portions or at least parts of the housings 220a and 220b.

Furthermore, in the frame housing 224a and the frame housing 224b, the housing portion of the housing 220a that houses the light guide member 100a and the housing portion of the housing 220b that houses the light guide member 100b are bonded by a connecting portion 236. Moreover, the connecting portion 236 is bonded to a central portion, i.e., the bridge 400, between the housings 220a and 220b housing the light guide members 100a and 100b. The bridge 400 and the connecting portion 236 may be connected by, for example, any of screwing, engaging, and adhesive bonding. Meanwhile, the connecting portion 236 need not always be bonded to the bridge 400, but may be bonded to housing portions where the light guide members 100a and 100b are housed and that are near the nose of the wearer, of the housings 220a and 220b.

In the configurations of the display devices 10b_1 to 10b_3 as described above, for example, when the devices are worn on the head portion, the hands or the head portion of the wearer may touch the portions of the housings 220a and 220b housing the relay optical systems, and the housings 220a and 220b may be deformed. Therefore, the display device 10b_4 according to the third modification includes the frame housings 224a and 224b that cover the housings 220a and 220b as described above, and bond the connecting portion 236 to the bridge 400. With this configuration, when the devices are worn on the head portion, and even if the frame housings 224a and 224b that are in contact with the head portion are deformed, a force is not applied to the housings 220a and 220b housing the relay optical systems and the housings 220a and 220b are not touched by the hand or the head portion of the wearer, so that it is possible to prevent occurrence of distortion of the housings 220a and 220b and it is possible to prevent videos from being viewed in a duplicated manner or in a distorted manner.

Moreover, as illustrated in FIG. 47B and FIG. 47C, axial directions of the frame housings 224a and 224b are approximately parallel to the optical axes of the relay optical systems housed in the housings 220a and 220b, and heights of the frame housings 224a and 224b are the same as those of the housings 220a and 220b, so that it is possible to improve the sense of unity of the frame housings 224a and 224b and the housings 220a and 220b.

First Example

Configuration of Head-Mounted Display Device A head-mounted display device according to a first example was configured to include an image display element, a relay optical system, and a light guide member as described in detail below.

A light guide member was made of acrylic resin, had a thickness of 10 mm, a length of 50 mm, and a height of 10 mm, and was provided with half mirrors at 45 degrees at both ends thereof.

A relay optical system was constructed of two groups, each including two biconvex lenses (with a lens interval described below). A curvature radius was 7 mm/−7 mm, a thickness was 4 mm, a refractive index nd was 1.728 (material: N-SF10). Five types of relay optical systems were used with diameters of 6 mm, 7 mm, 8 mm, 9 mm, and 12 mm. The four biconvex lenses were fixed using a stainless pipe member with a thickness of 0.1 mm depending on each diameter, and constituted a housing frame. An image display element was VGA-LVS manufactured by KOPIN Corporation, which had a display surface of 7.2 mm×5.4 mm and element housing dimensions of 20 mm×15 mm.

The relay lenses, the light guide member, and the image display element were arranged as illustrated in FIG. 1. In particular, an interval A between the display surface of the image display element and the biconvex lens was 6 mm, an interval B between the biconvex lenses was 10 mm, an interval C between the biconvex lenses was 12 mm, an interval D between the biconvex lenses was 10 mm, an interval E between the biconvex lens and a light incident portion of the light guide member was 5 mm, and a distance from the display surface of the image display element to the light incident portion of the light guide member was 43 mm.

The image display element was fixed inside a housing (25 mm×30 mm×20 mm) together with a control substrate (20 mm×25 mm).

The housing frame to which the light guide member and the relay optical system were fixed and the housing in which the image display element and the control substrate were fixed were fixed together, and plastic temples and elastic resin end covers were attached to construct a binocular head-mounted display device.

The positions of the biconvex lenses located close to the display surface of the image display element were located posterior, by 28 mm, to a plane that was in contact with apexes of the corneas of both eyes.

Result of Example

With regard to video visibility, securement of an actual visual field, and load on the nose in the relay optical systems with the respective diameters, a result of the example was obtained as illustrated in Table 1 below.

TABLE 1

| Lens Diameter (Width of Relay Optical System) | Video Visibility | Securement of Actual Visual Field | Load on Nose |
|---|---|---|---|
| 6 mm | Good | Good without feeling of pressure | No load was felt |
| 7 mm | Good | Good without feeling of pressure | No load was felt |
| 8 mm | Good | No feeling of pressure, but visual field was slightly blocked | No load was felt |

TABLE 1-continued

| Lens Diameter (Width of Relay Optical System) | Video Visibility | Securement of Actual Visual Field | Load on Nose |
|---|---|---|---|
| 9 mm | Good | Visual field was blocked with feeling of pressure | Load was felt |
| 12 mm | Good | Visual field was blocked with feeling of pressure | Load was felt |
| Comparative Example (image display element was directly arranged near light guide plate without relay optical system) | Good | Visual field was blocked with large feeling of pressure | Large load was felt |

As illustrated in Table 1, it was confirmed that if the width of the relay optical system was equal to or smaller than 8 mm, it was possible to display the same video as obtained at a position at which the image display element was in contact with the light guide member, and it was also possible to adequately secure the actual visual field without the feeling of pressure and remarkably reduce load on the nose.

Second Example

Configuration of Head-Mounted Display Device A head-mounted display device according to a second example was configured to include a Hopkins relay lens group as a relay optical system as described in detail below.

A light guide member was made of acrylic resin, had a thickness of 10 mm, a length of 50 mm, and a height of 10 mm, and was provided with half mirrors at 45 degrees at both ends thereof.

A relay optical system was constructed of two Hopkins relay lens groups. A curvature radius was 7 mm/−7 mm, a length was 15 mm, a refractive index nd was 1.728 (material: N-SF10) and 1.512 (material: BK-7). Five types of relay optical systems were used with diameters of 6 mm, 7 mm, 8 mm, 9 mm, and 12 mm. The Hopkins relay lenses were fixed using a stainless pipe member with thickness of 0.1 mm depending on each diameter, and constituted a housing frame.

An image display element was VGA-LVS manufactured by KOPIN Corporation, which had a display surface of 7.2 mm×5.4 mm and element housing dimensions of 20 mm×15 mm.

The relay lenses, the light guide member, and the image display element were arranged as illustrated in FIG. 5. In particular, an interval A between the display surface of the image display element and the relay lens was 5 mm, relay lens lengths B and D were 15 mm, an interval C between the relay lenses was 10 mm, an interval E between the relay lens and a light incident portion of the light guide member was 5 mm, and a distance from the display surface of the image display element to the light incident portion of the light guide member was 50 mm.

The image display element is fixed inside a housing (25 mm×30 mm×20 mm) together with the control substrate (20 mm×25 mm).

The housing frame to which the light guide member and the relay optical system were fixed and the housing in which the image display element and the control substrate were fixed were fixed together as illustrated in FIG. 5, and plastic temples and elastic resin end covers were attached to construct a binocular head-mounted display device. The positions of the relay lenses located close to the display surface of the image display element were located posterior, by 35 mm, to a plane that was in contact with the apexes of the corneas of both eyes.

Result of Example

With regard to video visibility, securement of an actual visual field, and load on the nose in the relay optical systems with the respective diameters, a result of the example was obtained as illustrated in Table 2 below.

TABLE 2

| Lens Diameter (Width of Relay Optical System) | Video Visibility | Securement of Actual Visual Field | Load on Nose |
|---|---|---|---|
| 6 mm | Good | Good without feeling of pressure | No load was felt |
| 7 mm | Good | Good without feeling of pressure | No load was felt |
| 8 mm | Good | No feeling of pressure, but visual field was slightly blocked | No load was felt |
| 9 mm | Good | Visual field was blocked with feeling of pressure | Load was felt |
| 12 mm | Good | Visual field was blocked with feeling of pressure | Load was felt |
| Comparative Example (image display element was directly arranged near light guide plate without relay optical system) | Good | Visual field was blocked with large feeling of pressure | Large load was felt |

As illustrated in Table 2, it was confirmed that if the width of the relay optical system was equal to or smaller than 8 mm, it was possible to display the same video as obtained at a position at which the image display element was in contact with the light guide member, and it was also possible to adequately secure the actual visual field without the feeling of pressure and remarkably reduce load on the nose. Furthermore, with use of the Hopkins relay lens groups, it was possible to reduce the number of lenses and simplify aligning of optical systems at the time of installation into the housing.

Third Example

Configuration of Head-Mounted Display Device A head-mounted display device according to a third example was configured to include an image display element, a relay optical system, and a light guide member as described in detail below.

A light guide member was made of acrylic resin, had a thickness of 10 mm, a length of 50 mm, a height of 10 mm, and was provided with half mirrors at 45 degrees at both ends thereof.

A relay optical system was constructed of a single graded-index lens (rod lens), in particular, Endoscope Rod Lens System Design of 2.0-0.75 (three times larger than 0.25 pitch) manufactured by GRINTECH GmbH was used. The rod lens had a length of 82 mm and a diameter of 2 mm. The rod lens was fixed using a stainless pipe member with thickness of 0.1 mm, and constituted a housing frame.

An image display element was VGA-LVS manufactured by KOPIN Corporation, which had a display surface of 7.2 mm×5.4 mm and element housing dimensions of 20 mm×15 mm.

The rod lens, the light guide member, and the image display element were arranged as follows: an interval A between the display surface of the image display element and the relay lens was 5 mm, an interval B between the rod lens and a light incidence portion of the light guide member was 5 mm, and a distance from the display surface of the image display element and the light incidence portion of the light guide member was 92 mm.

The image display element was fixed inside a housing (25 mm×30 mm×20 mm) together with the control substrate (20 mm×25 mm).

The housing frame to which the light guide member and the relay optical system were fixed and the housing in which the image display element and the control substrate were fixed were fixed together as illustrated in FIG. 7, and plastic temples and elastic resin end covers were attached to construct a binocular head-mounted display device. The position of the end portion of the rod lens located close to the element surface of the image display element was located posterior, by 77 mm, to a plane that was in contact with the apexes of the corneas of both eyes.

Result of Example

With regard to video visibility, securement of an actual visual field, and load on the nose in the relay optical system as described above, a result of the example was obtained as illustrated in Table 3 below.

With use of the graded-index lens, the width of the relay optical system was reduced and the weight was reduced, so that it was possible to largely reduce the number of lenses and extremely simplify aligning of the optical system at the time of installation into the housing.

Fourth Example

Configuration of Head-Mounted Display Device A head-mounted display device according to a fourth example was configured to include an image guide fiber as a relay optical system as described in detail below.

A light guide member was made of acrylic resin, had a thickness of 10 mm, a length of 50 mm, and a height of 10 mm, and was provided with half mirrors at 45 degrees at both ends thereof.

A relay optical system was constructed of a single image guide fiber (see FIG. 9 for configuration, see FIG. 9 and below for lens intervals), in particular, FIGH-100-1500N (100000 pixels) manufactured by Fujikura Ltd was used. The length was 40 mm and the diameter was 1.5 mm. The image guide fiber was fixed using a stainless pipe member with thickness of 0.1 mm, and constituted a housing frame.

An image display element was VGA-LVS manufactured by KOPIN Corporation, which had a display surface of 7.2 mm×5.4 mm and element housing dimensions of 20 mm×15 mm.

The image guide fiber, the light guide member, and the image display element were arranged as illustrated in FIG. 9. In particular, an interval A between the display surface of the image display element and the relay lens was 5 mm, an interval B between the image guide fiber and a light incidence portion of the light guide member was 5 mm, and a distance from the display surface of the image display element and the light incidence portion of the light guide member was 50 mm.

The image display element was fixed inside a housing (25 mm×30 mm×20 mm) together with the control substrate (20 mm×25 mm).

The housing frame to which the light guide member and the relay optical system were fixed and the housing in which the image display element and the control substrate were fixed were fixed together, and plastic temples and elastic resin end covers were attached to construct a binocular head-mounted display device.

The position of the end portion of the image guide fiber located close to the display surface of the image display element is located posterior, by 35 mm, to a plane that was in contact with the apexes of the corneas of both eyes.

Result of Example

With regard to video visibility, securement of an actual visual field, and load on the nose in the relay optical system as described above, a result of the example was obtained as illustrated in Table 4 below.

TABLE 3

| Lens Diameter (Width of Relay Optical System) | Video Visibility | Securement of Actual Visual Field | Load in Nose |
|---|---|---|---|
| 2 mm | Good | Extremely good without feeling of pressure | No load was felt |

TABLE 4

| Lens Diameter (Width of Relay Optical System) | Video Visibility | Securement of Actual Visual Field | Load on Nose |
| --- | --- | --- | --- |
| 1.5 mm | Good | Extremely good without feeling of pressure | No load was felt |

With use of the image guide fiber, the width of the relay optical system was reduced and the weight was reduced, so that it was possible to largely reduce the number of lenses and extremely simplify aligning of the optical system at the time of installation into the housing.

Fifth Example

Configuration of Head-Mounted Display Device

A head-mounted display device according to a fifth example was configured to include a condensing optical system between an image display element and a relay optical system as described in detail below.

A light guide member was made of acrylic resin, had a thickness of 10 mm, a length of 50 mm, and a height of 10 mm, and was provided with half mirrors at 45 degrees at both ends thereof.

A relay optical system was constructed of two Hopkins relay lens groups (see below for lens intervals). A curvature radius was 7 mm/−7 mm, a length was 15 mm, a refractive index nd was 1.728 (material: N-SF10) and 1.512 (material: BK-7), and a diameter was 2.5 mm.

The Hopkins relay lenses were fixed using a stainless pipe member with thickness of 0.1 mm depending on each diameter, and constructed a housing frame.

A condensing optical system was constructed of three lens elements of a biconvex lens, a plane concave lens, and a plane convex lens in a single group. The biconvex lens had a thickness of 1.8 mm, a curvature radius of 3.6 mm/−1.75 mm, a refractive index nd of 1.639, and a diameter of 4 mm. The plane concave lens had a thickness of 1.0 mm, a curvature radius of ∞/0.8 mm, a refractive index nd of 1.788, and a diameter of 3 mm. The plane convex lens had a thickness of 2.3 mm, a curvature radius of ∞/−2.5 mm, a refractive index nd of 1.788, and a diameter of 2.5 mm.

An image display element was VGA-LVS manufactured by KOPIN Corporation, which had a display surface of 7.2 mm×5.4 mm and element housing dimensions of 20 mm×15 mm.

The relay lens, the light guide member, the condensing optical system, and the image display element were arranged as illustrated in FIG. 11. Intervals A to I of portions illustrated in FIGS. 47A to 47C (corresponding to the display device 10d illustrated in FIG. 11) were set as follows: A was 15 mm, B was 11 mm, C was 15 mm, D was 5 mm, E was 7 mm, F was 4.15 mm, G was 3 mm, H was 2.3 mm, and I was 10 mm. A distance from the display surface of the image display element to a light incident portion of the light guide member was 72.45 mm.

The image display element was fixed inside a housing (25 mm×30 mm×20 mm) together with the control substrate (20 mm×25 mm).

The housing frame to which the light guide member and the relay optical system were fixed and the housing in which the image display element and the control substrate were fixed were fixed together as illustrated in FIG. 11, and plastic temples and elastic resin end covers were attached to construct a binocular head-mounted display device. The positions of the end portions of the relay lenses located close to the display surface of the image display element was located posterior, by 31 mm, to a plane that was in contact with the apexes of the corneas of both eyes.

Result of Example

With regard to video visibility, securement of an actual visual field, and load on the nose in the relay optical system as described above, a result of the example was obtained as illustrated in Table 5 below.

TABLE 5

| Lens Diameter (Width of Relay Optical System) | Video Visibility | Securement of Actual Visual Field | Load on Nose |
| --- | --- | --- | --- |
| 2.5 mm | Video was made brighter, and video of wider region was well viewed | Extremely good without feeling of pressure | No load was felt |

With the addition of the condensing optical system, it was possible to increase the brightness of a video and view a video of a wider region.

Sixth Example

Configuration of Head-Mounted Display Device

A head-mounted display device according to a sixth example was configured to include a condensing optical system between an image display element and a relay optical system and further includes a collimator optical system between the relay optical system and a light guide member as described in detail below.

A light guide member was made of acrylic resin, had a thickness of 10 mm, a length of 50 mm, and a height of 10 mm, and was provided with half mirrors at 45 degrees at both ends thereof.

A relay optical system was constructed of two Hopkins relay lens groups (see FIG. 12 for a configuration and see FIG. 12 and below for lens intervals). A curvature radius was 7 mm/−7 mm, a length was 15 mm, a refractive index nd was 1.728 (material: N-SF10) and 1.512 (material: BK-7), and a diameter was 2.5 mm. The Hopkins relay lenses were fixed using a stainless pipe member with a thickness of 0.1 mm depending on each diameter, and constituted a housing frame.

A condensing optical system was constructed of three lens elements of a biconvex lens, a plane concave lens, and a plane convex lens in a single group. The biconvex lens had a thickness of 1.8 mm, a curvature radius of 3.6 mm/−1.75 mm, a refractive index nd of 1.639, and a diameter of 4 mm. The plane concave lens had a thickness of 1.0 mm, a curvature radius of ∞/0.8 mm, a refractive index nd of 1.788, and a diameter of 3 mm. The plane convex lens had a thickness of 2.3 mm, a curvature radius of ∞/−2.5 mm, a refractive index nd of 1.788, and a diameter of 2.5 mm.

A collimator optical system was constructed of two lens elements of a meniscus lens and a convex lens in a single group. The meniscus lens had a thickness of 0.5 mm, a curvature radius of −5 mm/−6 mm, a refractive index nd of 1.728, and a diameter of 4 mm. The convex lens had a thickness of 1 mm, a curvature radius of 2.35 mm/−6 mm, a refractive index nd of 1.639, and a diameter of 4 mm.

An image display element was VGA-LVS manufactured by KOPIN corporation, which had a display surface of 7.2 mm×5.4 mm and element housing dimensions of 20 mm×15 mm.

The relay lens, the light guide member, the condensing optical system, and the collimator optical system, and the image display element were arranged as illustrated in FIG. 12. Intervals J and K of portions illustrated in FIG. 49 (corresponding to the display device 10e illustrated in FIG. 12) were set as follows: J was 10 mm, K was 2 mm, and other intervals were the same as those of the fifth example. A distance from the display surface of the image display element to the light incident portion of the light guide member was 85.5 mm.

The image display element was fixed inside a housing (25 mm×30 mm×20 mm) together with the control substrate (20 mm×25 mm).

The housing frame to which the light guide member and the relay optical system were fixed and the housing in which the image display element and the control substrate were fixed were fixed together as illustrated in FIG. 12, and plastic temples and elastic resin end covers were attached to construct a binocular head-mounted display device. The positions of the end portions of the relay lenses located close to the display surface of the image display element was located posterior, by 48.5 mm, to a plane that was in contact with the apexes of the corneas of both eyes.

Result of Example

With regard to video visibility, securement of an actual visual field, and load on the nose in the relay optical system as described above, a result of the example was obtained as illustrated in Table 6 below.

TABLE 6

| Lens Diameter (Width of Relay Optical System) | Video Visibility | Securement of Actual Visual Field | Load on Nose |
| --- | --- | --- | --- |
| 2.5 mm | Video was made brighter, and video of much wider region was well viewed | Extremely good without feeling of pressure | No load was felt |

With the addition of the collimator optical system, it was possible to increase the brightness of a video and view a video of a wider region.

Seventh Example

Configuration of Head-Mounted Display Device

A head-mounted display device according to a seventh example was configured such that a surface of an end portion close to an image display element, of a relay optical system was located posterior to the position of a plane that was in contact with the apexes of the corneas of both eyes.

A light guide member was made of acrylic resin, had a thickness of 10 mm, a length of 50 mm, and a height of 10 mm, and was provided with half mirrors at 45 degrees at both ends thereof.

A relay optical system was constructed of a single image guide fiber (see FIG. 10 for a configuration and see FIG. 10 and below for lens intervals), in particular, FIGH-100-1500N (10,000 pixels) manufactured by Fujikura Ltd. was used. The lengths were 40 mm, 6.5 mm, and 1 mm and the diameters was 1.5 mm. Each of the image guide fibers was fixed using a stainless pipe member with thickness of 0.1 mm, and constituted a housing frame.

A condensing optical system was constructed of three lens elements of a biconvex lens, a plane concave lens, and a plane convex lens in a single group. The biconvex lens had a thickness of 1.8 mm, a curvature radius of 3.6 mm/−1.75 mm, a refractive index nd of 1.639, and a diameter of 4 mm. The planar concave lens had a thickness of 1.0 mm, a curvature radius of ∞/0.8 mm, a refractive index nd of 1.788, and a diameter of 3 mm. The planar convex lens had a thickness of 2.3 mm, a curvature radius of ∞/−2.5 mm, a refractive index nd of 1.788, and a diameter of 2.5 mm.

A collimator optical system was constructed of a lens constituted of two lens elements of a meniscus lens and a convex lens in a single group. The meniscus lens had a thickness of 0.5 mm, a curvature radius of −5 mm/−6 mm, a refractive index nd of 1.728, and a diameter of 4 mm. The convex lens had a thickness of 1 mm, a curvature radius of 2.35 mm/−6 mm, a refractive index nd of 1.639, and a diameter of 4 mm. An image display element was VGA-LVS manufactured by KOPIN Corporation, which had a display surface of 7.2 mm×5.4 mm and element housing dimensions of 20 mm×15 mm.

The relay lens, the light guide member, the condensing optical system, the collimator optical system, and the image display element were arranged. An interval J was 10 mm, an interval K was 2 mm, and other dimensions are the same as those of the fifth example. A distance from the display surface of the image display element to a light incident portion of the light guide member was set to three different distances of 40.9 mm, 46.45 mm, and 79.95 mm depending on the respective lengths of the image guide fibers.

The image display element was housed inside a housing (25 mm×30 mm×20 mm) together with the control substrate (20 mm×25 mm).

The housing frame to which the light guide member and the relay optical system were fixed and the housing in which the image display element and the control substrate were fixed were fixed together, and plastic temples and elastic resin end covers were attached to construct a binocular head-mounted display device.

The position of the end portion of the relay lens located close to the element surface of the image display element was located anterior, by 0.5 mm, posterior, by 5 mm, and posterior, by 38.5 mm, depending on the lengths of the respective image guide fibers, to a plane that was in contact with the apexes of the corneas of both eyes.

Result of Example

With regard to video visibility, securement of an actual visual field, and load on the nose in the relay optical systems with the respective diameters, a result of the example was obtained as illustrated in Table 7 below.

TABLE 7

| Interval between end surface of relayoptical system and surfaces of eye balls | Video Visibility | Securement of Actual Visual Field | Load to Nose |
|---|---|---|---|
| Anterior by 0.5 mm | Well viewed | Visual field was reduced with feeling of pressure | Load was slightly felt |
| Posterior by 5 mm | Well viewed | Certain degree of visual field was secured with little feeling of pressure | No load was felt |
| Posterior by 38.5 mm | Well viewed | Visual field was adequately secured without feeling of pressure | No load was felt |

With the configuration in which the surface of the end portion closer to the image display element, of the optical relay system was located posterior to the light guide member relative to a plane that was in contact with the apexes of the corneas of the both eyes, it was confirmed that it was possible to secure an actual visual field and reduce load on the nose.

Eighth Example

Configuration of Head-Mounted Display Device

In a head-mounted display device according to an eighth example, a condensing optical system, a relay optical system, a collimator optical system, and an image display element were the same as those of the sixth example, an image display element was arranged parallel to an optical axis of the relay optical system, and an optical mirror (manufactured by Edmund Optics) that was inclined by 45 degrees with respect to a display surface of an image display element and which had dimensions of 12.5 mm×12.5 mm was arranged as illustrated in FIG. 14.

Result of Example

While the width of a housing, in which the image display element was fixed, was 30 mm in the sixth example, the width of the housing was reduced to 20 mm by arranging the image display element in a parallel manner, so that it was possible to reduce the volume of the housing, reduce the weight by 5 g, and reduce the load on ears.

Ninth Example

Configuration of Head-Mounted Display Device A head-mounted display device according to a ninth example had the same configuration as the display device 10a_3 according to the second modification of the seventh embodiment illustrated in FIG. 26, which will be described in detail below.

A concave mirror (adjustable optical system) had a curvature radius of 40 mm.

A condenser lens was constructed of a convex lens (a refractive index nd of 1.516, a central thickness of 3 mm, a curvature radius of 36.65 mm/−36.65 mm, a diameter of 7 mm).

A collimator lens was constructed of three lens elements of a meniscus lens (a refractive index nd of 1.6, a central thickness of 4.9 mm, a curvature radius of 9.2 mm/24.9 mm), a plano-concave lens (a refractive index nd of 1.6, a central thickness of 1.2 mm, a curvature radius of 14.5 mm), and a convex lens (a refractive index nd of 1.6, a central thickness of 4.2 mm, a curvature radius of 34.3 mm/−17.3 mm) in a single group (diameters of all of the lenses are 7 mm).

An image display element was VGA-LVS manufactured by KOPIN Corporation, which had a display surface of 7.2 mm×5.4 mm.

A length from the image display element to the concave mirror was 81 mm.

A length from the concave mirror to the intermediate image was 18 mm.

A light guide member was made of acrylic resin, had a thickness of 10 mm, a length of 50 mm, and a height of 10 mm, and was provided with a half mirror at 31 degrees at one end thereof.

A housing frame to which the light guide member and the relay optical system were fixed and a housing in which the image display element and the control substrate were fixed were fixed together, and plastic temples and elastic resin end covers were attached to construct a binocular head-mounted display device.

The position of the condenser lens was located posterior, by 20 mm, to a plane that was in contact with the apexes of the corneas of eyes.

Result of Example

It was confirmed that, by arranging the concave mirror after the intermediate image, it was possible to display a video with a horizontal viewing angle of about 30 degrees at the similar position at which the image display element come in contact with the light guide member, and it was possible to adequately secure an actual visual field without the feeling of pressure and remarkably reduce load on the nose. When the concave mirror was not provided after the intermediate image, the horizontal viewing angle was about 11 degrees.

Tenth Example

Configuration of Head-Mounted Display Device

A head-mounted display device according to a tenth example had the same configuration as the display device 10_4 according to the third modification of the sixth embodiment illustrated in FIG. 20, which will be described in detail below.

A collimator lens (adjustable optical system) was constructed of three lens elements of a meniscus lens (a refractive index nd of 1.6, a central thickness of 4.9 mm, a curvature radius of 9.2 mm/24.9 mm), a plano-concave lens (a refractive index nd of 1.6, a central thickness of 1.2 mm, a curvature radius of 14.5 mm), a convex lens (a refractive index nd of 1.6, a central thickness of 4.2 mm, a curvature radius of 34.3 mm/−17.3 mm) in a single group (diameters of all of the lenses are 7 mm).

A condenser lens was constructed of a convex lens (a refractive index nd of 1.516, a central thickness of 3 mm, a curvature radius of 45.99 mm/−45.99 mm, a diameter of 7 mm) A triplet achromatic lens was constructed of three lens elements of a meniscus lens (refractive index nd of 1.62, a central thickness of 1.1 mm, a curvature radius of 14.95 mm/7.34 mm), a convex lens (a refractive index nd of 1.516, a central thickness of 8 mm, a curvature radius of 7.34 mm/−7.34 mm), and a meniscus lens (a refractive index nd of 1.62, a central thickness of 1.1 mm, a curvature radius of −7.34 mm/−14.95 mm) in a single group (diameters of all of the lenses are 7 mm).

An image display element was VGA-LVS manufactured by KOPIN Corporation, which had a display surface of 7.2 mm×5.4 mm.

A length from the image display element to the mirror was 86 mm.

A length from the mirror to the intermediate image was 18 mm.

A light guide member was made of acrylic resin, had a thickness of 10 mm, a length of 50 mm, a height of 10 mm, and was provided with a half mirror at an angle of 31 degrees on one end side thereof.

A housing frame to which the light guide member and the relay optical system were fixed and a housing in which the image display element and the control substrate were fixed were fixed together, and plastic temples and elastic resin end covers were attached to construct a binocular head-mounted display device.

The position of the condenser lens was located posterior, by 20 mm, to a plane that was in contact with the apexes of the corneas of eyes.

Result of Example

It was confirmed that, by arranging the collimator lens posterior to the intermediate image, it was possible to display a video with a horizontal viewing angle of about 29 degrees at the similar position at which the image display element come in contact with the light guide member, and it was possible to adequately secure an actual visual field without the feeling of pressure and remarkably reduce load on the nose. When the collimator lens was not provided posterior to the intermediate image, the horizontal viewing angle was about 10 degrees.

REFERENCE SIGNS LIST 1, 1m, 1n, 1t Display system
2, 2a, 2b Cable
10, 10a to 10j, 10m, 10n, 10p to 10s Display device
10_1 to 10_7 Display device
10a_1 to 10a_7 Display device
10b_1 to 10b_4 Display device
20 External device
30 USB/MHL converter
30a USB/V-by-One HS converter
31 USB/HDMI converter
32 HDMI distributor
33a, 33b HDMI/MHL converter
34 USB hub
35a, 35b HDMI/V-by-One HS converter
51 Temporal bone
52 Occipital bone
100, 100a, 100b Light guide member
100_1 Light guide member
101, 101a, 101b Reflection part
102, 102a, 102b Light guide part
103, 103a, 103b Extraction part
104, 104a, 104b Emission part
110a, 110b Light shielding member
111a, 111b Hinge unit
200, 200a, 200b Housing frame
200_1 Housing frame
201, 201a, 201b Relay optical system
202, 202a, 202b Hopkins relay lens group
203 Graded-index lens
204, 204a, 204b Image guide fiber
211, 211a, 211b Condenser lens
212, 212a, 212b Collimator lens
213 Collimator lens
214 Concave mirror
220a, 220b Casing
221a, 221b Frame
222a, 222b Temple
223a, 223b Hinge
224a, 224b Frame housing
230a, 230b Connecting portion
231 Front frame
232 Connecting portion
233 Front frame
234 Connecting portion
236 Connecting portion
251 Rod lens
251a, 251b Lens part
252a, 252b Convex lens
253a to 253d Convex lens
254 Collimator lens
255 Condenser lens
256 Triplet achromatic lens
257 Condenser lens
258 Graded-index lens
259 Objective lens
260 Image guide fiber
261 Condenser lens
262a, 262b Rod lens
300, 300a, 300b, 300g, 300h, 300i, 300k Display unit
300l, 300n, 300na, 300nb Display unit
300s Display unit
301, 301a, 301b Image display element
302, 302a, 302b Control substrate
303, 303a, 303b Driving IC
304 Memory
305 Power circuit
306 Battery
307 Wireless circuit
311, 311a, 311b Image display element
312, 312a, 312b Mirror
321 HDMI receiver
322, 322a, 322b MHL/HDMI converter
323 V-by-One HS converter
324a, 324b V-by-One HS/HDMI converter 331 Camera
332 Nine-axis sensor
333a, 333b, 334 Camera
335 Infrared scanner
336 Infrared camera
337 Near-infrared LED
338 Near-infrared camera
339 Bone-conduction speaker
400 Bridge
401a, 401b Pad
500, 500a, 500b Temple
600, 601 Bonding portion
700, 701a, 701b, 702 to 706 Intermediate image 900, 900a, 900b Eye
901 Pupil
902 Cornea
CP, CPa, CPb Center

CITATION LIST

Patent Literature

PTL 1: International Publication No. 2015/137165
PTL 2: Japanese Patent Application Laid-open No. 2015-219405
PTL 3: Japanese Patent Application Laid-open No. 2013-200553

The invention claimed is:

1. A head-mounted display device comprising:
an image display located posterior to a plane that is in contact with both eyeballs of the wearer to emit image light;
a light guide plate to guide the image light and emit the image light to an eye of a wearer who wears the head-mounted display device, the light guide plate including a reflection structure and a light guide structure to reflect the image light to outside of the light guide plate toward the eye of the wearer;
a relay optical structure arranged between the image display and the light guide plate to relay the image light from the image display to the light guide plate;
an optical structure located between the relay optical structure and the light guide plate to transform the image light to one of parallel light and telecentric light; and
a control substrate disposed at a side of an optical axis of the image light, which is from the image display to the light guide plate, opposite from the eye,
wherein the optical structure comprises a collimator optical structure,
a first intermediate image is formed after the image light is emitted from the relay optical structure and before the image light enters the collimator optical structure,
the relay optical structure is a relay lens group that includes a plurality of lenses each having a diameter in a range of equal to or larger than 2 mm and equal to or smaller than 8 mm and arranged inside a housing frame,
the housing frame is disposed at a side of the wearer's head and connects the image display to the light guide plate, and
a longitudinal direction of the control substrate is orthogonal to a light emitting surface of the image display.

2. The head-mounted display device according to claim 1, further comprising:
a temple to rest on an ear of the wearer to support the head-mounted display device, wherein
a center of the image display is located posterior to at least a center of an interval between the light guide and the temple.

3. The head-mounted display device according to claim 1, wherein a center of the image display is arranged so as to overlap with a temporal bone of the wearer.

4. The head-mounted display device according to claim 1, wherein a display housing that houses the image display is located at a position of an occipital bone of the wearer.

5. The head-mounted display device according to claim 1, wherein the relay optical structure includes at least a graded-index lens.

6. The head-mounted display device according to claim 1, wherein the relay optical structure includes at least an image guide fiber.

7. The head-mounted display device according to claim 1, further comprising a condensing optical structure arranged between the image display and the relay optical structure to condense the image light emitted from the image display.

8. The head-mounted display device according to claim 1, further comprising an optical structure to bend the image light emitted from the image display and cause the image light to enter the relay optical structure.

9. The head-mounted display device according to claim 1, further comprising:
a light shield to switch the light guide plate between a non-transparent state and one of a transparent state and a semi-transparent state at least in a direction from the light guide plate to the eyes of the wearer.

10. The head-mounted display device according to claim 1, further comprising a bone-conduction speaker provided in a display housing that houses the image display to cause a bone of the wearer to vibrate to transfer sound.

11. The head-mounted display device according to claim 1, further comprising:
a housing that houses at least the light guide plate and the relay optical structure; and
a frame to fix the head-mounted display device to a head of the wearer, wherein
the frame is connected to the housing at a position of any portion where the light guide plate is housed, of the housing.

12. The head-mounted display device according to claim 11, wherein the frame is connected to the housing at a position close to a nose of the wearer when the wearer wears the head-mounted display device, in a portion where the light guide plate is housed, of the housing.

13. The head-mounted display device according to claim 11, wherein the frame houses at least a part of the housing.

14. The head-mounted display device according to claim 1, further comprising a receiver to receive image data from an external device, wherein
the image display emits the image light based on the image data.

15. The head-mounted display device according to claim 14, wherein the receiver receives at least one of the image data and voice data from the external device based on a V-by-One HS system.

16. A display system comprising:
the head-mounted display device according to claim 14, and
a converter to convert the image data as a universal serial bus (USB) signal output from the external device to a signal of a mobile high-definition link (MHL) system, and transmit the converted image data to the receiver.

17. The head-mounted display device according to claim 1, wherein the relay optical structure arranged between the image display and the light guide plate to relay the image light from the image display to the light guide plate, and form an intermediate image at least twice before the image light enters the light guide plate.

18. A head-mounted display device comprising:
an image display located posterior to a plane that is in contact with both eyeballs of the wearer to emit image light;
a light guide plate to guide the image light and emit the image light to an eye of a wearer who wears the head-mounted display device, the light guide plate including a reflection structure and a light guide structure to reflect the image light to outside of the light guide plate toward the eye of the wearer;
a relay optical structure arranged between the image display and the light guide plate to relay the image light from the image display to the light guide plate;
an optical structure located between the relay optical structure and the light guide plate to transform the image light to one of parallel light and telecentric light; and
a control substrate disposed at a side of an optical axis of the image light, which is from the image display to the light guide plate, opposite from the eye,
wherein the optical structure comprises a collimator optical structure,
a first intermediate image is formed after the image light is emitted from the relay optical structure and before the image light enters the collimator optical structure, and
a longitudinal direction of the control substrate is orthogonal to a light emitting surface of the image display.

* * * * *